US008261256B1

(12) United States Patent
Adler et al.

(10) Patent No.: US 8,261,256 B1
(45) Date of Patent: Sep. 4, 2012

(54) SYSTEM AND METHOD FOR AUTOMATICALLY UPDATING THE SOFTWARE OF A NETWORKED PERSONAL AUDIOVISUAL DEVICE

(75) Inventors: Steven M. Adler, San Diego, CA (US); Joseph B. Grand, San Diego, CA (US); Andrew S. Huang, Cardiff-by-the-Sea, CA (US); Duane S. Maxwell, San Diego, CA (US); Kenneth E. Steele, San Diego, CA (US); Stephen L. Tomlin, San Diego, CA (US)

(73) Assignee: BBY Solutions, Inc., Richfield, MN (US)

( * ) Notice: Subject to any disclaimer, the term of this patent is extended or adjusted under 35 U.S.C. 154(b) by 1316 days.

(21) Appl. No.: 11/845,027

(22) Filed: Aug. 24, 2007

Related U.S. Application Data

(60) Provisional application No. 60/805,830, filed on Sep. 5, 2006, provisional application No. 60/823,491, filed on Aug. 24, 2006, provisional application No. 60/823,493, filed on Aug. 24, 2006, provisional application No. 60/823,496, filed on Aug. 24, 2006, provisional application No. 60/945,900, filed on Jun. 22, 2007, provisional application No. 60/869,297, filed on Dec. 8, 2006.

(51) Int. Cl.
*G06F 9/445* (2006.01)
(52) U.S. Cl. .......................................... 717/173; 717/178
(58) Field of Classification Search .................... None
See application file for complete search history.

(56) References Cited

U.S. PATENT DOCUMENTS

| 7,181,731 B2 * | 2/2007 | Pace et al. ..................... 717/136 |
| 2004/0098715 A1 * | 5/2004 | Aghera et al. ................. 717/173 |
| 2008/0010372 A1 * | 1/2008 | Khedouri et al. ............. 709/224 |

* cited by examiner

*Primary Examiner* — Chuck Kendall
(74) *Attorney, Agent, or Firm* — Schwegman Lundberg & Woessner, P.A.

(57) ABSTRACT

A method for automatically updating software executed by an electronic device is disclosed herein. The method includes receiving, at the electronic device, an update indication from a server that updated software is available for the electronic device. The method further includes modifying, in response to the update indication, a boot state of the electronic device and initiating operation of the electronic device in an update mode. The updated software is received, at the electronic device, during operation in the update mode. The method further includes initiating, upon determining the updated software has been correctly received, operation of the electronic device in a normal mode.

15 Claims, 61 Drawing Sheets

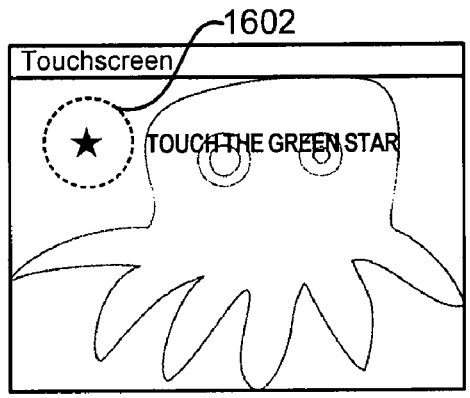
FIG. 16A
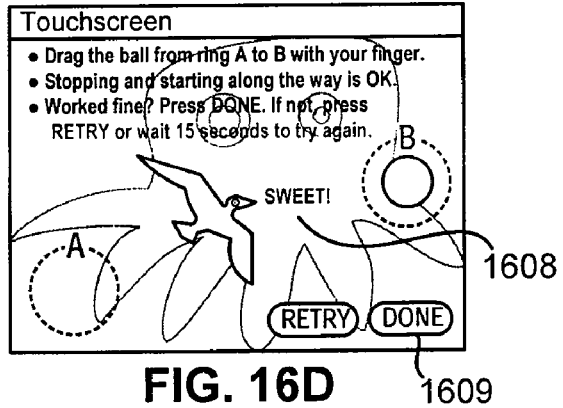
FIG. 16D
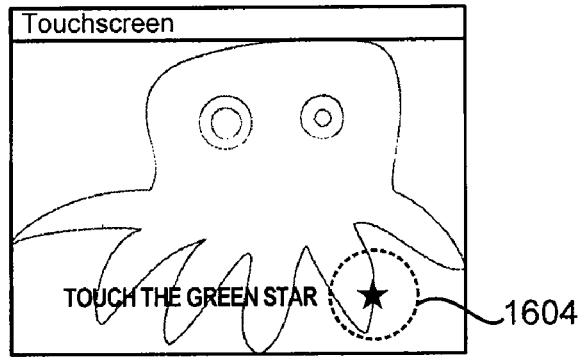
FIG. 16B
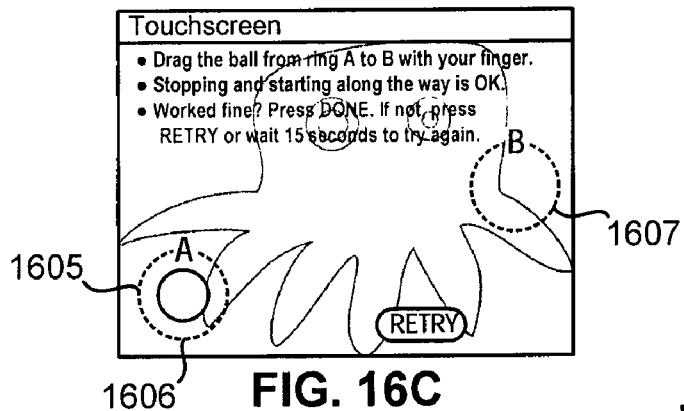
FIG. 16C
FIG. 16

Chumby Network Schema:

User:

| Field | Type | Null | Key | Default | Extra | |
|---|---|---|---|---|---|---|
| id | char(36) | NO | PRI | NULL | | unique GUID for this user |
| parent_id | varchar(36) | YES | | NULL | | GUID of "parent" account |
| username | varchar(32) | NO | UNI | | | unique username of the user |
| password | varchar(32) | NO | | | | secret password for the user |
| account_type | varchar(20) | NO | | regular | | regular, employee, admin, etc |
| account_status | varchar(20) | NO | | normal | | normal, banned, etc |
| pin | varchar(10) | YES | | NULL | | security code used for secure transactions |
| created_at | datetime | YES | | NULL | | when the user record was created |
| updated_at | datetime | YES | | NULL | | when the user record was last modified |
| expires_at | datetime | YES | | NULL | | if subscription, when it expires |
| name_first | varchar(32) | YES | | NULL | | user's first name |
| name_last | varchar(32) | YES | | NULL | | user's surname |
| language_code | varchar(5) | NO | | en-US | | native language of the user |
| email | varchar(100) | YES | | NULL | | validated email address of the user |
| developer | tinyint(1) | YES | | 0 | | true if user has accepted the developer EULA |
| eula | tinyint(1) | YES | | 0 | | true if the user has accepted the terms of service |
| birthdate | date | YES | | NULL | | birth date of the user |
| opt_in | tinyint(1) | YES | | 0 | | whether the user has opted in to email |
| secret_question | varchar(255) | YES | | NULL | | question the user must answer to retrieve password |
| secret_answer | varchar(255) | YES | | NULL | | the answer to the question |
| address_guid | varchar(36) | YES | | NULL | | unique GUID for the user's address |
| street1 | varchar(32) | YES | | NULL | | user address street address, line 1 |
| street2 | varchar(32) | YES | | NULL | | user address street address, line 2 |
| city | varchar(32) | YES | | NULL | | user city |
| state | varchar(32) | YES | | NULL | | user state/province |
| country | varchar(32) | YES | | NULL | | user country |
| zip | varchar(32) | YES | | NULL | | user zip/postal code |
| phone | varchar(32) | YES | | NULL | | user phone number |
| unverified | varchar(42) | YES | | NULL | | code for email verification of the account |
| education_history | varchar(255) | YES | | NULL | | education level of the user |
| gender | varchar(255) | YES | | NULL | | gender of the user |
| access_id | varchar(36) | YES | | NULL | | alternative GUID for this account |
| buddy_acceptance | varchar(10) | YES | | NULL | | default acceptance of buddies |

Profile:

| Field | Type | Null | Key | Default | Extra | |
|---|---|---|---|---|---|---|
| id | char(36) | NO | PRI | | | unique GUID for the profile |
| user_id | varchar(36) | NO | MUL | | | GUID of the user that owns this profile |
| skin_id | varchar(36) | NO | MUL | | | GUID of the skin this profile uses |
| name | varchar(32) | NO | | | | name of the profile |
| access | varchar(10) | NO | | private | | private, protected (buddies), public |
| access_id | varchar(36) | YES | | NULL | | alternative GUID for this profile |
| email | varchar(100) | YES | | NULL | | email address for this profile |
| master | tinyint(1) | YES | | 0 | | true if the is the "Default" profile for the account |
| description | text | YES | | NULL | | a brief description of the profile |
| created_at | datetime | YES | | NULL | | when the profile was created |
| updated_at | datetime | YES | | NULL | | when the profile was last changed |

Chumby:

| Field | Type | Null | Key | Default | Extra | |
|---|---|---|---|---|---|---|
| id | char(36) | NO | PRI | | | unique GUID for this chumby |
| user_id | varchar(36) | NO | MUL | | | GUID of the user that owns this chumby |
| profile_id | varchar(36) | NO | MUL | | | GUID of the profile this chumby should display |
| name | varchar(32) | YES | | NULL | | the name of the this chumby |
| created_at | datetime | YES | | NULL | | when the chumby was registered |
| updated_at | datetime | YES | | NULL | | when the chumby was last changed |
| authorized_at | datetime | YES | | NULL | | when the chumby was last authorized |
| control_panel | varchar(200) | YES | | NULL | | the name of the Control Panel it should use |

Category:

| Field | Type | Null | Key | Default | Extra | |
|---|---|---|---|---|---|---|
| id | char(36) | NO | PRI | | | unique GUID for the category |
| name | varchar(32) | NO | UNI | | | name of the category |
| description | text | YES | | NULL | | description of the category |
| created_at | datetime | YES | | NULL | | when the category was created |
| updated_at | datetime | YES | | NULL | | when the category was last changed |
| slug | varchar(255) | YES | | NULL | | URL-friendly name of the category |

Skin:

| Field | Type | Null | Key | Default | Extra | |
|---|---|---|---|---|---|---|
| id | char(36) | NO | PRI | | | unique GUID of the skin |
| name | varchar(32) | NO | UNI | | | name of the skin |
| description | text | YES | | NULL | | description of the skin |
| created_at | datetime | YES | | NULL | | when the skin was created |
| updated_at | datetime | YES | | NULL | | when the skin was last changed |
| data | mediumblob | YES | | NULL | | the data encapsulating the skin |

Widget:

| Field | Type | Null | Key | Default | Extra | |
|---|---|---|---|---|---|---|
| id | char(36) | NO | PRI | | | unique GUID of this widget |
| category_id | varchar(36) | NO | MUL | | | GUID for the category for this widget |
| user_id | varchar(36) | NO | MUL | | | GUID for the author/owner of this widget |
| name | varchar(32) | NO | UNI | | | name of the widget |
| description | text | YES | | NULL | | description of the widget |
| version | varchar(32) | NO | | 1.0 | | version of the widget |
| protection | varchar(10) | NO | | none | | encryption used by this widget |
| access | varchar(10) | NO | | public | | private, protected (buddies), public |
| approval_status | varchar(32) | NO | | pending | | approval status of the widget for public use |
| fee_model | varchar(32) | NO | | free | | free, subscription, etc |
| fee_code | varchar(32) | YES | | none | | paramter for the fee (weekly, once, etc) |
| fee_price | varchar(32) | NO | | 0.00 | | the fee price |
| play_mode | varchar(12) | NO | | default | | default, timeout, cooperative |
| play_time | int(11) | NO | | 15 | | how long the widget should play if timeout |
| created_at | datetime | YES | | NULL | | when the widget was created |
| updated_at | datetime | YES | | NULL | | when the widget was lat changed |
| make_public | int(1) | NO | | 0 | | request by author to make widget public |
| average_rating | float | NO | | 0 | | cached rating of the widget |
| rating_count | int(11) | NO | | 0 | | how many ratings have been submitted |
| slug | varchar(255) | YES | | NULL | | URL-friendly name of the widget |
| sendable | tinyint(1) | YES | | 1 | | true if the widget be sent to another user |
| deleteable | tinyint(1) | YES | | 1 | | true if user can delete the widget from the profile |
| virtualable | tinyint(1) | YES | | 1 | | true if the widget supports virtual chumby |
| allowed_email | int(11) | YES | | 0 | | true if the widget is allowed to send email |
| request_email | int(11) | YES | | 0 | | true if the author requests email privileges |
| enabled | int(11) | YES | | 1 | | true if the widget is enabled |
| access_id | varchar(36) | YES | | NULL | | alternative GUID for the widget |

Widget Instance:

| Field | Type | Null | Key | Default | Extra |
|---|---|---|---|---|---|
| id | char(36) | NO | PRI | | |
| profile_id | varchar(36) | NO | MUL | | |
| widget_id | varchar(36) | NO | MUL | | |
| access | varchar(10) | NO | | private | |
| created_at | datetime | YES | | NULL | |
| updated_at | datetime | YES | | NULL | |
| secure | varchar(255) | YES | | NULL | |
| play_mode | varchar(12) | NO | | default | |
| play_time | int(11) | NO | | 15 | |
| position | int(11) | YES | | NULL | |
| buddy_id | varchar(36) | YES | | NULL | |
| accepted | tinyint(1) | YES | | 1 | |
| forward | tinyint(1) | YES | | 1 | |

- id: the unique GUID of the widget instance
- profile_id: the profile owning this widget intance
- widget_id: the widget this widget instance uses
- access: private, protected, public
- created_at: when the instance was created
- updated_at: when the instance was last changed
- secure: a special "secure" parameter string
- play_mode: default, timeout, cooperative
- play_time: how long the widget should play
- position: index of the instance within the profile
- buddy_id: who sent the widget
- accepted: true if the widget was accepted by the receiver
- forward: true if the widget can be forwarded to another user

Widget Parameter:

| Field | Type | Null | Key | Default | Extra |
|---|---|---|---|---|---|
| id | char(36) | NO | PRI | | |
| widget_instance_id | varchar(36) | NO | MUL | | |
| name | varchar(32) | NO | | | |
| value | text | YES | | NULL | |
| created_at | datetime | YES | | NULL | |
| updated_at | datetime | YES | | NULL | |

- id: unique GUID of the parameter
- widget_instance_id: the GUID of the owning widget instance
- name: the name of the parameter
- value: the value of the parameter
- created_at: when the parameter was created
- updated_at: when the parameter was last changed

FIG. 36E

Widget Rating:

| Field | Type | Null | Key | Default | Extra |
|---|---|---|---|---|---|
| id | int(11) | NO | PRI | NULL | auto_increment |
| widget_id | varchar(36) | NO | MUL | | |
| user_id | varchar(36) | NO | MUL | | |
| rating | int(11) | NO | | 0 | |
| version | varchar(32) | NO | | 1.0 | |
| created_at | datetime | YES | | NULL | |
| updated_at | datetime | YES | | NULL | |

- id: unique id for this rating
- widget_id: the GUID of the widget being rated
- user_id: the GUID of the user making the rating
- rating: the value of the rating
- version: the version of the widget being rated
- created_at: when the rating was created
- updated_at: when the rating was last changed

Buddy:

| Field | Type | Null | Key | Default | Extra |
|---|---|---|---|---|---|
| id | char(36) | NO | PRI | | |
| profile_id | varchar(36) | NO | MUL | | |
| user_id | varchar(36) | NO | MUL | | |
| acceptance | varchar(36) | NO | | ask | |
| created_at | datetime | YES | | NULL | |
| updated_at | datetime | YES | | NULL | |
| hide | tinyint(1) | YES | | 0 | |
| accepted | tinyint(1) | YES | | 1 | |

- id: the unique GUID of the buddy record
- profile_id: the GUID of profile for which this user is a buddy
- user_id: the GUID of the buddy
- acceptance: how received widget instances shold be handled
- created_at: when this buddy record was created
- updated_at: when this buddy record was last modified
- hide: true to hide the relationship from the buddy
- accepted: true if the relationship has been accepted

Chumby Authorization:

| Field | Type | Null | Key | Default | Extra |
|---|---|---|---|---|---|
| id | int(11) | NO | PRI | NULL | auto_increment |
| chumby_id | varchar(36) | NO | MUL | | |
| created_at | datetime | YES | | NULL | |
| hw | varchar(50) | YES | | NULL | |
| sw | varchar(50) | YES | | NULL | |
| fw | varchar(50) | YES | | NULL | |

- id: unique id of this authorization
- chumby_id: GUID of the chumby that is authorizing
- created_at: when the chumby authorized
- hw: version of the chumby hardware
- sw: version of the chumby software
- fw: version of the chumby firmware

FIG. 36F

Movie:

| Field | Type | Null | Key | Default | Extra | |
|---|---|---|---|---|---|---|
| id | varchar(36) | NO | PRI | NULL | | GUID of the movie record |
| content_type | varchar(60) | YES | | NULL | | mimetype of the movie |
| name | varchar(200) | YES | | NULL | | the original filename of the movie |
| data | mediumblob | YES | | NULL | | the raw data |
| created_on | datetime | YES | | NULL | | when the record was created |
| updated_on | datetime | YES | | NULL | | when the record was last changed |
| widget_id | varchar(36) | YES | MUL | NULL | | the GUID of the widget this movie belongs to |
| flash_version | int(11) | YES | | NULL | | the version of Flash this movie uses |

Template (aka Configuration Movie):

| Field | Type | Null | Key | Default | Extra | |
|---|---|---|---|---|---|---|
| id | varchar(36) | NO | PRI | NULL | | GUID of the configuration movie record |
| content_type | varchar(60) | YES | | NULL | | mimetype of the movie |
| name | varchar(200) | YES | | NULL | | the original filename of the movie |
| data | mediumblob | YES | | NULL | | the raw data |
| created_on | datetime | YES | | NULL | | when the record was created |
| updated_on | datetime | YES | | NULL | | when the record was last changed |
| widget_id | varchar(36) | YES | MUL | NULL | | the GUID of the widget this template belongs to |
| flash_version | int(11) | YES | | 0 | | the version of Flash this movie uses |

Thumbnails:

| Field | Type | Null | Key | Default | Extra | |
|---|---|---|---|---|---|---|
| id | varchar(36) | NO | PRI | NULL | | GUID of the thumbnail record |
| content_type | varchar(60) | YES | | NULL | | mimetype of the thumbnail image |
| name | varchar(200) | YES | | NULL | | original filename of the thumbnail |
| data | mediumblob | YES | | NULL | | raw data |
| created_on | datetime | YES | | NULL | | when the record was created |
| updated_on | datetime | YES | | NULL | | when the recors was last changed |
| widget_id | varchar(36) | YES | MUL | NULL | | the GUID of the widget this thumbnail belongs to |

Chumby Registration:

| Field | Type | Null | Key | Default | Extra | |
|---|---|---|---|---|---|---|
| id | int(11) | NO | PRI | NULL | auto_increment | the unique ID for this registration record |
| token | int(11) | YES | UNI | NULL | | the integer token for this registration |
| user_id | varchar(36) | YES | | NULL | | the user this chumby is trying to register to |
| chumby_id | varchar(36) | YES | | NULL | | the chumby being registered |
| created_at | datetime | YES | | NULL | | when the registration record was created |

SYSTEM AND METHOD FOR AUTOMATICALLY UPDATING THE SOFTWARE OF A NETWORKED PERSONAL AUDIOVISUAL DEVICE

CROSS-REFERENCE TO RELATED APPLICATIONS

This application claims priority under 35 U.S.C. §119(e) to U.S. Provisional Application Ser. No. 60/805,830 filed Sep. 5, 2006, entitled CONFIGURABLE PERSONAL AUDIOVISUAL DEVICE FOR USE IN NETWORKED APPLICATION SHARING SYSTEM, to U.S. Provisional Application Ser. No. 60/823,491 filed Aug. 24, 2006, entitled SYSTEM AND METHOD FOR TRANSFERRING ELECTRONIC CONTENT TO NETWORKED PERSONAL AUDIOVISUAL DEVICES, to U.S. Provisional Application Ser. No. 60/823,493 filed Aug. 24, 2006, entitled NETWORKED PERSONAL AUDIOVISUAL DEVICE HAVING FLEXIBLE HOUSING, to U.S. Provisional Application Ser. No. 60/823,496 filed Aug. 24, 2006, entitled SYSTEM AND METHOD FOR AUTOMATICALLY UPDATING THE SOFTWARE OF A NETWORKED PERSONAL AUDIOVISUAL DEVICE, to U.S. Provisional Application Ser. No. 60/945,900 filed Jun. 22, 2007, entitled REGISTRATION SYSTEMS AND METHODS FOR PERSONALIZED PORTABLE DEVICES, and to U.S. Provisional Application Ser. No. 60/869,297 filed Dec. 8, 2006, entitled SYSTEM AND METHODS FOR LOCATION, MOTION, AND CONTACT DETECTION AND TRACKING IN A NETWORKED AUDIOVISUAL DEVICE, each of which is incorporated herein by reference in its entirety. This application is related to U.S. patent application Ser. No. 11/845,018, entitled CONFIGURABLE PERSONAL AUDIOVISUAL DEVICE FOR USE IN NETWORKED APPLICATION SHARING SYSTEM, filed on even date herewith, to U.S. patent application Ser. No. 11/845,026, entitled SYSTEM AND METHOD FOR TRANSFERRING ELECTRONIC CONTENT TO NETWORKED PERSONAL AUDIOVISUAL DEVICES, filed on even date herewith, and to U.S. patent application Ser. No. 11/845,021, entitled NETWORKED PERSONAL AUDIOVISUAL DEVICE HAVING FLEXIBLE HOUSING, filed on even date herewith, all of which are incorporated by reference in their entirety.

BACKGROUND OF THE INVENTION

It is well known that broadband Internet connectivity is becoming substantially more pervasive among consumers as a result of competition among service providers utilizing various different technologies (e.g., cable, digital subscriber line (DSL), satellite). In many households personal computers (PCs) constitute the primary users of the bandwidth furnished by these broadband connections. In order to facilitate sharing of the Internet connection among PCs in a given household, a variety of "wired" and "wireless" home networking technologies have been utilized.

As a result of the impracticality of installing Ethernet cable throughout a residence, RF-based wireless networking technology is becoming increasingly commonplace among consumers. Although systems based upon the 802.11b, or "Wi-Fi", wireless networking standard may currently be the most pervasive, versions of the 802.11 standard offering increased bandwidth have been introduced and yet higher-bandwidth approaches have been proposed.

The increased bandwidth available within the home has increased the usage of a number of different services, such as Internet-based delivery of digital audio, video and graphic content. However, since many of these services are facilitated by a desktop or notebook PC capable of communication over a broadband Internet connection, users are forced to remain proximate to their respective computers in order to utilize such services. Although other strategies to leverage the availability of broadband Internet connectivity within the home are currently being developed, many of these approaches involve creation of a relatively powerful, costly centralized communications "hub" (e.g., a PC with enhanced media capabilities, or a multi-purpose cable set-top box). Unfortunately, this typically requires either the purchase of an expensive hardware device or extended subscription plan, and constrains the extent to which Internet-enabled entertainment or other services are enjoyed outside of the immediate vicinity of the centralized hub device.

Accordingly, the increasing availability of wireless bandwidth within the home and elsewhere creates an opportunity for economically leveraging this bandwidth in a flexible, consumer-friendly manner.

SUMMARY OF THE INVENTION

In summary, one aspect of the present invention relates to a method for automatically updating software executed by an electronic device. The method includes receiving, at the electronic device, an update indication from a server that updated software is available for the electronic device. The method further includes modifying, in response to the update indication, a boot state of the electronic device and initiating operation of the electronic device in an update mode. The updated software is received, at the electronic device, during operation in the update mode. The method further includes initiating, upon determining the updated software has been correctly received, operation of the electronic device in a normal mode.

In another aspect the present invention relates to a machine-readable medium having instructions stored thereon for execution by a processor to perform a method. The method includes receiving, at the electronic device, an update indication from a server that updated software is available for the electronic device. The method further includes modifying, in response to the update indication, a boot state of the electronic device. Following initiation of operation of the electronic device in an update mode, the updated software is received at the electronic device. The method includes initiating, upon determining the updated software has been correctly received, operation of the electronic device in a normal mode.

Yet another aspect of the invention relates to a method which involves initially operating an electronic device in a normal mode. The method includes rebooting the electronic device into an update mode following unintended termination of the operation of the electronic device in the normal mode. The method further includes receiving, during operation of the electronic device in the update mode, updated software for the electronic device.

BRIEF DESCRIPTION OF THE DRAWINGS

For a better understanding of the nature of the features of the invention, reference should be made to the following detailed description taken in conjunction with the accompanying drawings, in which:

FIGS. 16A-16D provide a set of screen shots of the user interface of a CHUMBY™ device being calibrated pursuant to the routine of FIG. 15.

FIGS. 36A-36H provide a more comprehensive tabular representation of an exemplary object-oriented database schema capable of being utilized by the system database.

DETAILED DESCRIPTION OF EMBODIMENTS OF THE INVENTION

Overview

Figure 1:
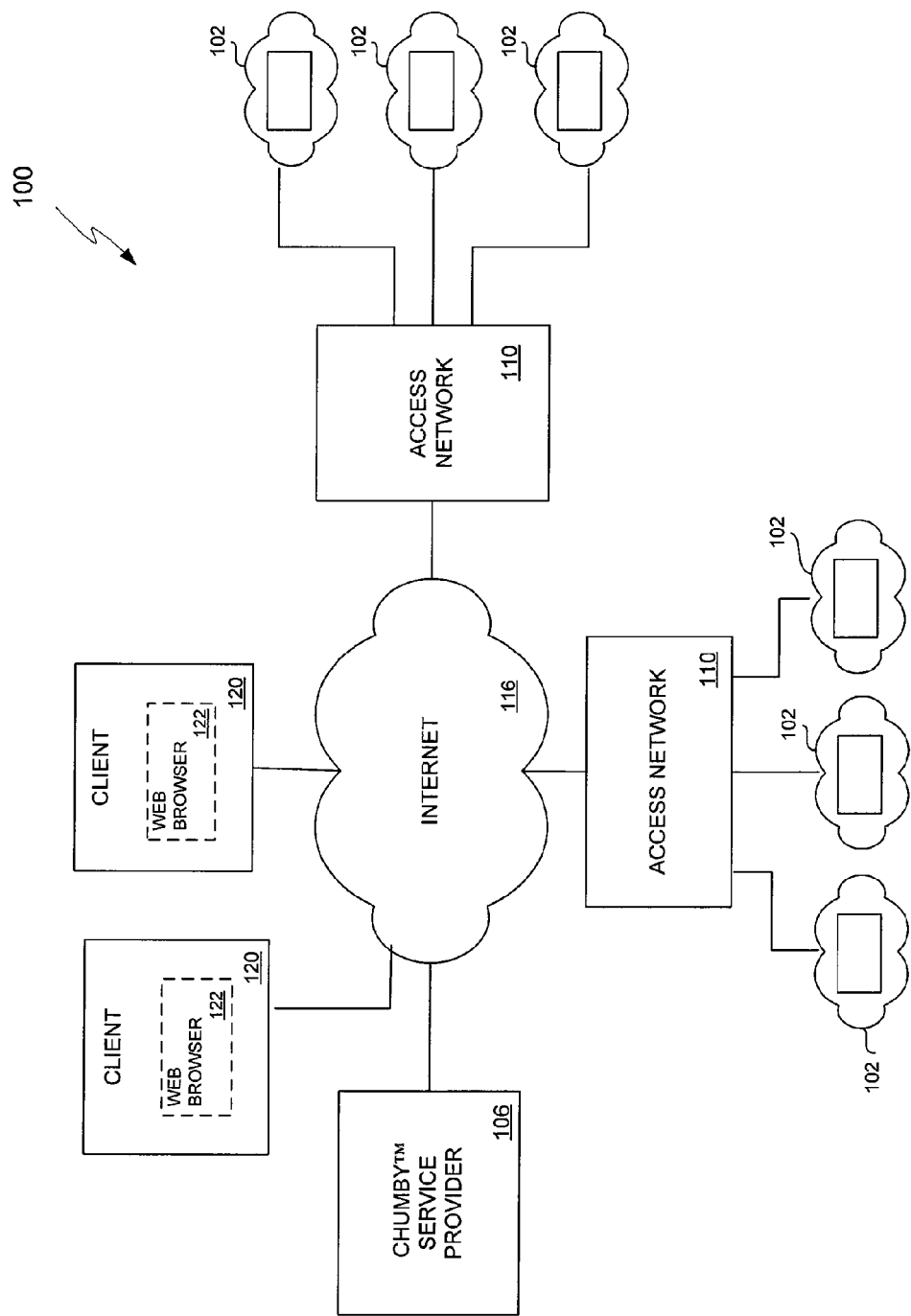
FIG. 1 is a block diagram illustrating a set of networked components comprising an exemplary embodiment of the system of the invention.

The present invention generally relates a system comprised of a set of personalized audiovisual devices in Internet-based communication with a service provider. It is anticipated that the personalized audiovisual devices will be commercially distributed under the trademark CHUMBY™, and may also be referred to herein as "CHUMBY™ devices". During communication with the service provider, each CHUMBY™ device periodically receives a set of application programs, or "widgets", which are sequentially executed by the CHUMBY™ device after being received from the service provider or locally from a personal computer (e.g., via a USB connection). Since each CHUMBY™ device is typically Internet-enabled, each may also be remotely configured and otherwise personalized via the CHUMBY™ service provider through a Web browser executed by a remote terminal (e.g., a PC or wireless handset). Such personalization may include, for example, specifying the set of widgets provided to a given CHUMBY™ device as well as their sequence and priority of execution.

As is described hereinafter, it is a feature of embodiments of the invention that a user configuring a CHUMBY™ device via an interface provided by the CHUMBY™ service provider may "drag and drop" icons representative of various widgets onto a rectangular or other portion of the interface representative of the screen of the CHUMBY™ device being configured. Alternatively, a user may select textual and/or graphical representations of widgets and select a button or other graphical representation of a user interface (UI) control to "add" the widget to the CHUMBY™ device being configured. In these ways the "layout" of the screen of the CHUMBY™ device may be remotely configured by the owner of the device. Although each CHUMBY™ device will preferably be capable of being configured in this manner, in certain embodiments each may also come "loaded" with a default set of widgets (e.g., an "alarm clock" widget) disposed to be executed by the CHUMBY™ device upon its registration with the CHUMBY™ service provider. Once a CHUMBY™ device has been configured (i.e., with either a "default" or user-specified configuration), it may execute the widgets defined by the configuration without user intervention. Alternatively, users may opt to "stay" on a given widget by explicitly instantiating the system interface on the device and selecting a "stay" UI control. If a user has explicitly selected a widget to "stay", the sequential execution of widgets can be continued by terminating the "stay" command via the system interface. If a user interacts with a widget which presents user interface controls to the user through one of a number of alternative input methods, such as via a touch-screen or accelerometer, the currently active widget will continue to execute on the device until some timeout period expires following the cessation of user interaction with the widget.

The configuration of a CHUMBY™ device may also specify the events or conditions under which the sequence of execution of widgets is to be altered or interrupted, and allows certain widgets to be accorded the highest available priority with respect to execution. For example, an "alarm clock" widget could be granted such priority in order to ensure that its alarm function would not be prevented from being actuated at the scheduled time due to contemporaneous execution of another widget. In one embodiment the Web interface provided by the CHUMBY™ service provider is in the form of a "timeline" enabling the sequence of execution of the widgets associated with a given CHUMBY™ device to be controlled in an intuitive manner. In an exemplary implementation the timeline defines the order in which the widgets are to be played in a constantly repeating sequence; that is, the timeline is representative of the complete set of widgets played by a given CHUMBY™ device as well as their relative order and duration of execution. However, certain widgets (e.g., the "alarm clock" widget) can be specified to be actuated at a given time by appropriately setting the applicable configuration element of such widgets.

Although in exemplary embodiments it is not contemplated that more than a single "content-related" widget be operative at any given time, a system configuration widget may be utilized to run concurrently with each such content-related widget in order to, for example, control the relative priority of execution of such content-related widgets and system settings such as loudness, brightness, navigation, and the like.

In one embodiment CHUMBY™ devices are each capable of wireless communication in accordance with an accepted wireless networking standard, such as the 802.11b or 802.11g standard. Accordingly, in homes or other environments containing one or more wireless access points, multiple CHUMBY™ devices may be distributed throughout the coverage area of the access points. Alternatively, a CHUMBY™ device may use a wired connection as a backup to, or in lieu of, a wireless connection to the extent convenient or necessary.

Among the features of the invention is the capability of the interface presented by each CHUMBY™ device to change in accordance with the nature of the widget currently being executed by the device. For example, a "clock radio" widget could be employed to produce audio and visual imagery consistent with a conventional alarm clock at an appointed time in the morning. In exemplary embodiments the clock radio widget would allow for the selection of a standard "wake up" chime or choice of several different audio programs. Later in the day the device interface could be devoted to a rotating selection of several standard information screens such as news headlines, local weather, sports scores, stock market updates, horoscope and the like.

In accordance with another aspect of the invention, users of CHUMBY™ devices may optionally participate in a "CHUMBY™ Network" along with other users by logging on to a Web site (e.g., www.chumby.com) hosted by the CHUMBY™ service provider. At this site (also referred to hereinafter as the "CHUMBY™ site") a user will be able to register with the CHUMBY™ Network and access services enabling the basic capabilities of the user's CHUMBY™ device. Basic capabilities may comprise, for example, the opportunity to send/receive widgets and other content to/from other CHUMBY™ users, for improved personalization of the device's generic information features, more detailed alarm-setting capabilities, and better selection and configuration of audio capabilities.

Registration with the CHUMBY™ Network, which would potentially require payment of a periodic subscription fee, enables members of the Network to access a wide array of widgets. It is contemplated that certain of such widgets would be developed by the entity operating the CHUMBY™ Network while other widgets would be developed by independent developers. In addition, members of the "CHUMBY™ Network would also be able to communicate with the CHUMBY™ devices of other members, provided that permission for such communication has been authorized by the other members. Such communication could entail, for example, the sending of a widget and corresponding data from the CHUMBY™ service provider to a member of the CHUMBY™ Network (the "receiving member") in response to a request sent to the CHUMBY™ service provider by another member (the "sending member"). For example, a sending member could, after receiving permission from a receiving member, request the CHUMBY™ service provider to send a "photo-viewer" widget to the receiving member. In addition, the sending member could specify that a link be established between the photo-viewer widget and pictures uploaded by the sending member to the CHUMBY™ service provider. In this way the receiving member could, without any effort other than providing authorization to the sending member, enable their CHUMBY™ device to essentially automatically receive and display a sequence of photos provided by the sending member. Similarly, while traveling a sending member could send a personalized "wake up" message to the CHUMBY™ device of a consenting receiving member. Finally, a sending member could send widgets to a group of receiving members included on a "buddy list" of the sending member, which could be established after the receipt of suitable permissions from those proposed to be included on the list.

In an exemplary embodiment members of the CHUMBY™ Network are enabled to completely configure, through any Web browser, their respective CHUMBY™ devices by specifying a set of "premium" widget programs or content to play or be shown rotationally (or in some other user-defined sequence) on their respective CHUMBY™ devices. Such premium widgets and content may include, for example, webcam shots, RSS readers, filtered news reports, personalized stock performance data, short animations or movies, podcasts or audio files to function as the audio sources for alarms or reminders scheduled to be triggered at different times throughout the day.

As is discussed further below, one exemplary implementation of a CHUMBY™ device is comprised of a malleable housing attached to a rigid "core" structure supporting a display screen and the electrical components of the device. The malleable housing would generally encompass all of the electrical components of the CHUMBY™ device, and will preferably be filled with an appropriate material or otherwise constructed to enable it to be "squeezed" or otherwise deformed by a user. Moreover, the core structure is designed to be capable of being removed from the housing and mated in to a different housing. A set of "squeeze sensors" are enclosed by the malleable housing in order to permit the detection of such a squeezing or similar action by a user. In this way a user is afforded the opportunity of conveying information through physical deformation of the CHUMBY™ device in addition to the more conventional textual and other modes of communication facilitated by the display screen. For example, in one exemplary system a user could initiate the conveying of a "hug" to another user by squeezing the housing of the user's CHUMBY™ device in a particular manner. The electrical signals generated by the sensor array in response to this squeeze would be appropriately interpreted and the user's CHUMBY™ device would communicate, via the CHUMBY™ service provider, a "hug" message to the intended recipient user. At this point the recipient's CHUMBY™ device could register receipt of the hug message by, for example, illuminating an indicator light or sending a message to the display of the device. Significantly, the CHUMBY™ device is not limited to an implementation in a malleable housing; all of the features associated with such a malleable housing may be emulated using a rigid housing in combination with alternative sensors (e.g., force-sensitive or virtually emulated sensors).

System Components

FIG. 1 is a block diagram illustrating a set of networked components comprising an exemplary embodiment of the system 100 of the invention. As shown, the system 100 comprises one or more CHUMBY™ personal audiovisual devices 102 in communication with a central service provider 106 via one or more access networks 110 and the Internet 116. As those skilled in the art will appreciate, the access networks 110 are representative of various intermediary network routing and other elements between the Internet 116 and the CHUMBY™ personal audiovisual devices 102. Such intermediary elements may include, for example, gateways or other server devices, and other network infrastructure provided by Internet service providers (ISPs). As is discussed below, the CHUMBY™ personal audiovisual devices 102 obtain application programs ("widgets") for execution from the central service provider 106 or locally from a mass storage device, personal computer or other computing device. In this regard the service provider 106 typically contains a repository of widgets and has access to other content capable of being communicated to a given CHUMBY™ device 102 upon the request of its authorized user or another user to which appropriate permission has been granted.

Referring again to FIG. 1, the system 100 also includes a plurality of user computers 120 disposed for communication with the service provider 106 via an access network (not shown) and the Internet 116. Each user computer 120 executes a Web browser 122 capable of displaying Web pages generated by the service provider 106 through which a user may configure one or more CHUMBY™ personal audiovisual devices 102. As mentioned above, such configuration may include, for example, specifying a set of widgets to be sent to a particular device 102 and their sequence of execution, adjusting audio or visual parameters relating to such execution, defining and managing a user's CHUMBY™ network (including, for example, defining a "buddy list" comprised of other CHUMBY™ users with respect to which the device 102 is permitted to communicate), and defining the layout or other aspects of the user interface presented through the screen of the device 102. To this end a given Web browser 122 may, when in communication with the service provider 106, present a rectangular configuration window which displays the widgets currently configured to "play" within the named "channel". By "dragging and dropping" iconic representations of widgets or content files into such a configuration window, a user may personalize the behavior and user interface presented by the corresponding CHUMBY™ device 102. Alternatively, a user may select textual and/or graphical representations of widgets and select a button or other graphical representation of a user interface control to "add" the widget to the CHUMBY™ device being configured. Moreover, users may access the service provider 106 via a Web browser 122 for the purpose of sending widgets or other information to other users for execution or display by their respective CHUMBY™ devices 102. In one embodiment the service provider 106 maintains a record of the permissions granted among users of CHUMBY™ devices in order to determine which users are authorized to provide, via the service provider 106, a given user with widgets, messages or other information, and vice-versa. Such permissions may be granted or withdrawn by a given user via appropriate pages presented by a Web browser 122 in communication with the service provider 106.

In the exemplary embodiment a configuration window may be utilized to configure one or more CHUMBY™ devices 102 consistent with the permissions granted by the users of such devices 102. In addition, a user of a given CHUMBY™ device 102 may elect to have the interface of the device 102 "mirror" or otherwise replicate that of another device 102 subject to the requisite permissions being granted. Similarly, one or more CHUMBY™ devices 102 may be configured to mirror the interface for a "virtual" CHUMBY™ device (or vice-versa) defined via a configuration window.

Different users of a given CHUMBY™ device 102 may be accorded different roles or privileges in configuring the device 102. For example, user-granted supervisory privileges could be given the authority to filter or monitor the widgets or content sent to the CHUMBY™ device 102. This would enable, for example, parents to manage and/or monitor the widgets and content executed and displayed by the one or more CHUMBY™ devices 102 used by their children. Moreover, administrators of the system 100 would typically possess an elevated level of privilege relative to users of CHUMBY™ devices 102 within the system 100. Also, if a specific widget performs functions requiring communication with a web site controlled by a third party in order to access content, the developer of the widget may create a hierarchical user model to regulate such access (and perhaps the functions of the widget).

Figure 2:
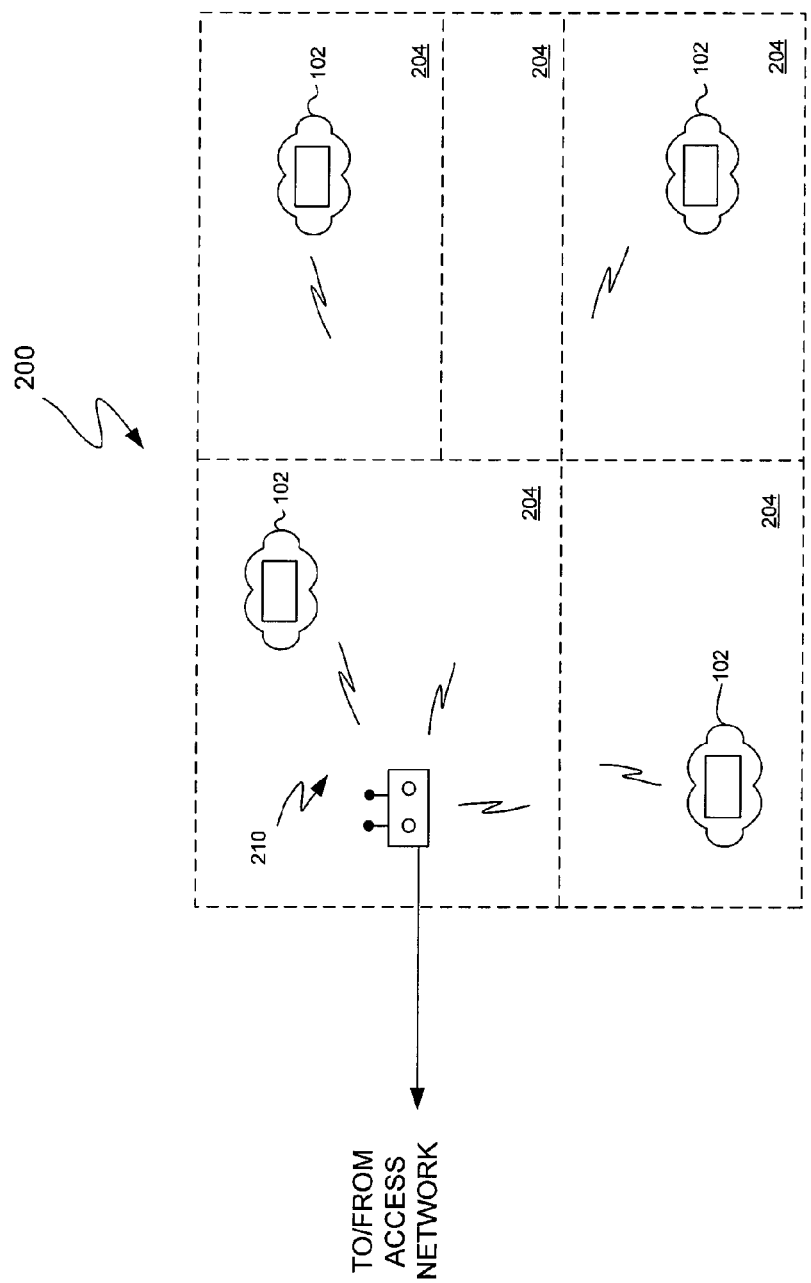
FIG. 2 illustrates an exemplary distribution of CHUMBY™ devices throughout a residence or other building having a number of rooms.

Attention is now directed to FIG. 2, which illustrates an exemplary distribution of CHUMBY™ devices 102 throughout a residence 200 or other building having a number of rooms 204. In the embodiment of FIG. 2, each CHUMBY™ device 102 is equipped with wireless transceiver (e.g., a Wi-Fi transceiver) to facilitate communication with one or more access points 210. Each access point is interconnected with an access network 110 by way of, for example, a local area network, thereby enabling Internet-based communication to be established between the service provider 106 and the devices within the residence 200.

Figure 3:
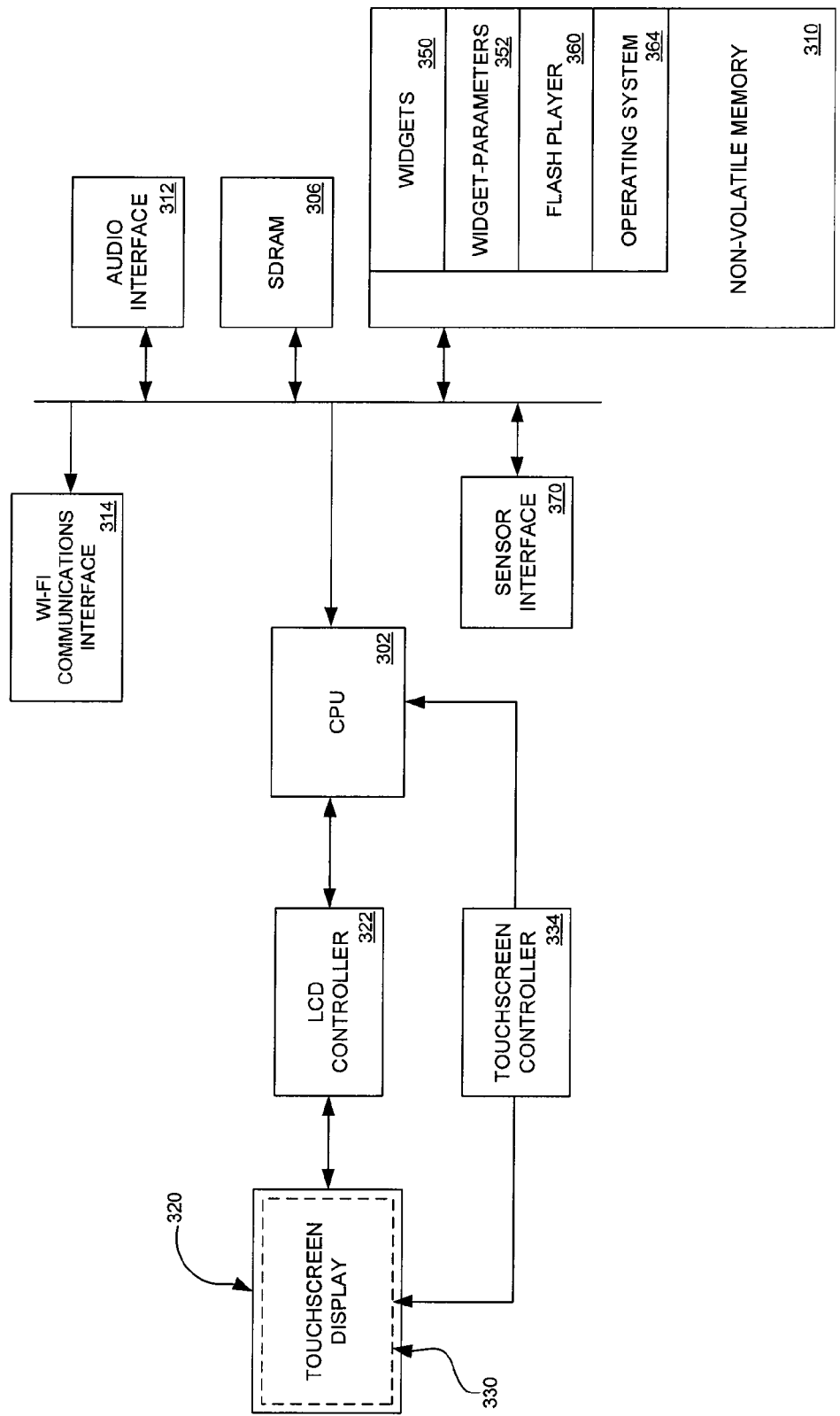
FIG. 3 provides a block diagrammatic representation of the principal components of an embodiment of a CHUMBY™ device of the present invention.

Turning now to FIG. 3, a block diagrammatic representation is provided of the principal components of an embodiment of a CHUMBY™ device of the present invention. As shown, the device includes a central processing unit (CPU) 302, memory including volatile (e.g., SDRAM) 306 and non-volatile memory 310 (e.g., flash memory), an audio interface 312, a wireless communications interface 314, and a sensor interface 370. In an exemplary implementation the CPU 302 comprises a microprocessor (e.g., based upon an ARM core) configured to run a Linux kernel and having attendant capabilities for graphics rendering. The device may or may not include a battery backup unit, which serves to preserve real-time information in the event of a power outage, and may also serve as a primary power source if the user desires untethered operation. The battery may or may not be rechargeable. The operating system is made aware of the power status and actively configures the CHUMBY™ device and the running widget to either save power or modify the user interface consistent with untethered operation.

The device may or may not include a Security Module (not shown) If included, the Security Module serves to store secrets and compute authentication algorithms in a fashion that fully isolates core security routines from otherwise unsecured code running on CPU 302. The secret storage and authentication capability may or may not be used by the client-server communication protocol to enable authenticated and encrypted communication capabilities for, among other things, financial transactions. The Security Module is initialized in such a way that there is no default mapping of the secrets contained within the module versus the identity of the hardware of the user. Furthermore, the secrets are revocable and a routine may exist for generating new secrets based upon a master secret that is never associated with a specific user's profile. This enables opt-in policies for privacy and a limited ability to revoke identity information, barring forensic network analysis, thereby enabling anonymity as well. The anonymous trust network can be extended with a variety of client-server protocols to enable a wide range of anonymous transactions, including but not limited to cash and content transactions.

As shown, software comprising widgets 350 or other applications received from the service provider 106 are stored in memory 310 and loaded into SDRAM 306 or non-volatile memory 310 for execution by the CPU 302. In one embodiment widgets are downloaded from the service provider 106 to CHUMBY™ devices in the format of a "Adobe Flash" file, also referred to as a "Flash movie". As is known by those skilled in the art, Flash movies are usually accorded a ".swf" file extension and may be played by a Flash Player developed and distributed by Adobe Systems. Accordingly, the memory 310 also includes a Flash Player 360 as well as a copy of the operating system 364 executed by the CPU 302. In other embodiments widgets may be developed in accordance with other formats and played by players compatible with such other formats.

In the exemplary embodiment widgets are not "permanently" stored in memory 310 of CHUMBY™ devices. Rather, widgets are executed by the CPU and then either discarded or cached in temporary memory for future use. This enables widgets to be "pushed" from the service provider 106 as necessary to support the sequence of widget execution specified for each CHUMBY™ device. That is, the service provider 106 may operate to provide a "stream" of widgets to each CHUMBY™ device, where the widgets within each such stream are temporarily cached within the memory of the applicable CHUMBY™ device until their execution. This enables the service provider 106 and/or the creator of each widget program to maintain a degree of control over the content and behavior of each widget program, since each such program is typically not permanently downloaded (thereby facilitating modification) but is rather temporarily cached and erased after some predetermined time has passed or a memory use threshold has been reached.

The CHUMBY™ device also includes a liquid crystal display (LCD) 320 controlled by an LCD controller 322, which may or may not be integrated into the CPU 302. The display 320 visually renders iconic representations of the widget programs stored within the CHUMBY™ device and images generated in connection with the execution of such widgets by the CPU 302. In an exemplary implementation a touchscreen 330 overlays the LCD 320 and is responsive to a touchscreen controller 334. In one embodiment a user may induce the CHUMBY™ device to enter a "control panel mode" by touching the a sensor such as the squeeze sensor (not shown in FIG. 3), touchscreen 330 or other sensor device. In an exemplary embodiment, widgets and the system control panel may present the user with different "user interface", or "UI", elements to enable the user to interact with the widget/system control panel. These UI elements may include, but are not limited to, buttons, scroll bars, drop down combo boxes and menus. When a user touches the screen to interact with one of these UI elements, the touchscreen controller 334 informs the CPU 302 that the touchscreen has been touched at a specific location and that location is converted by the CPU 302 to a UI control actuation event based on the configuration of the currently displayed widget 350 or system control panel screen (not shown in FIG. 3). In alternate implementations the LCD 320 and touchscreen 330 may comprise an integral device controlled by an integrated controller.

Figure 4:
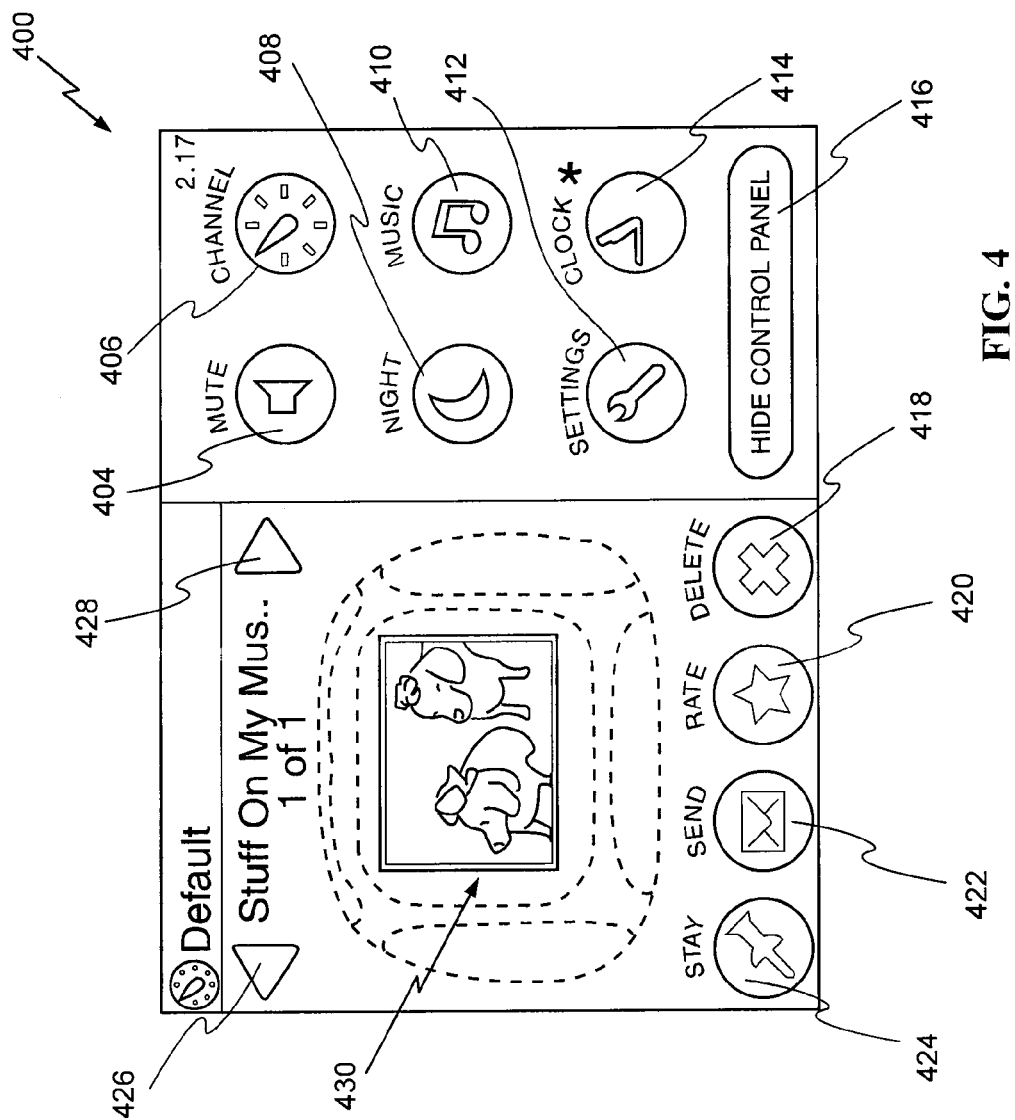
FIG. 4 shows an exemplary user interface generated through a screen of a CHUMBY™ device during operation of the CHUMBY™ device in a control panel mode.
Figure 5A:
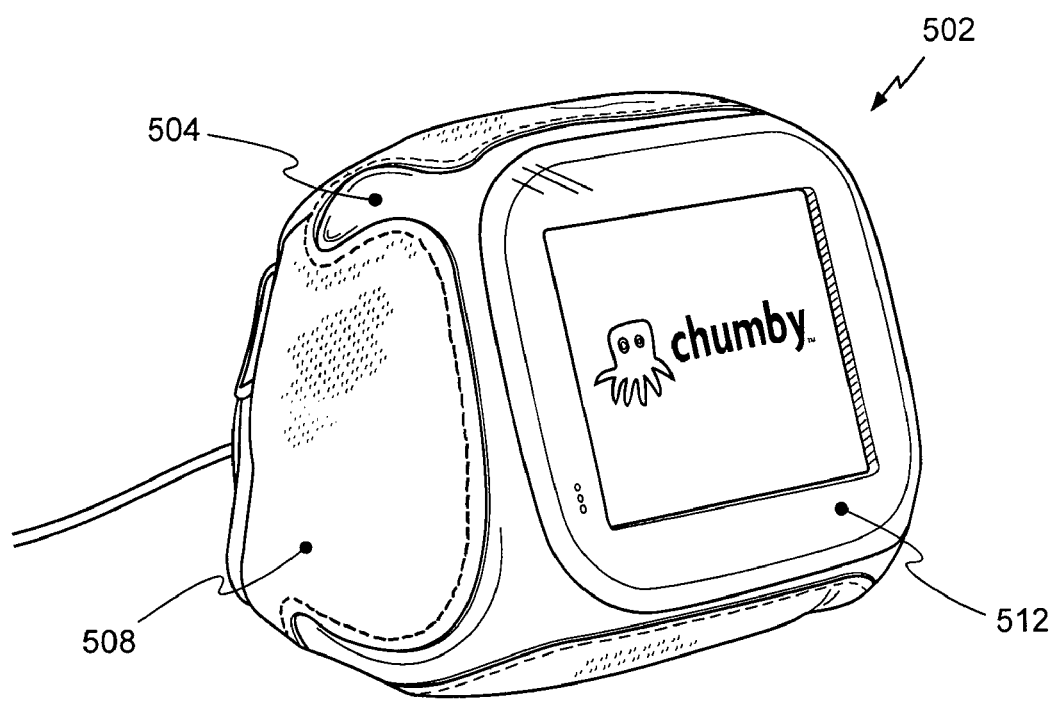
FIGS. 5A-5E provides various perspective views of an exemplary CHUMBY™ device configured with a malleable housing.
Figure 5B:
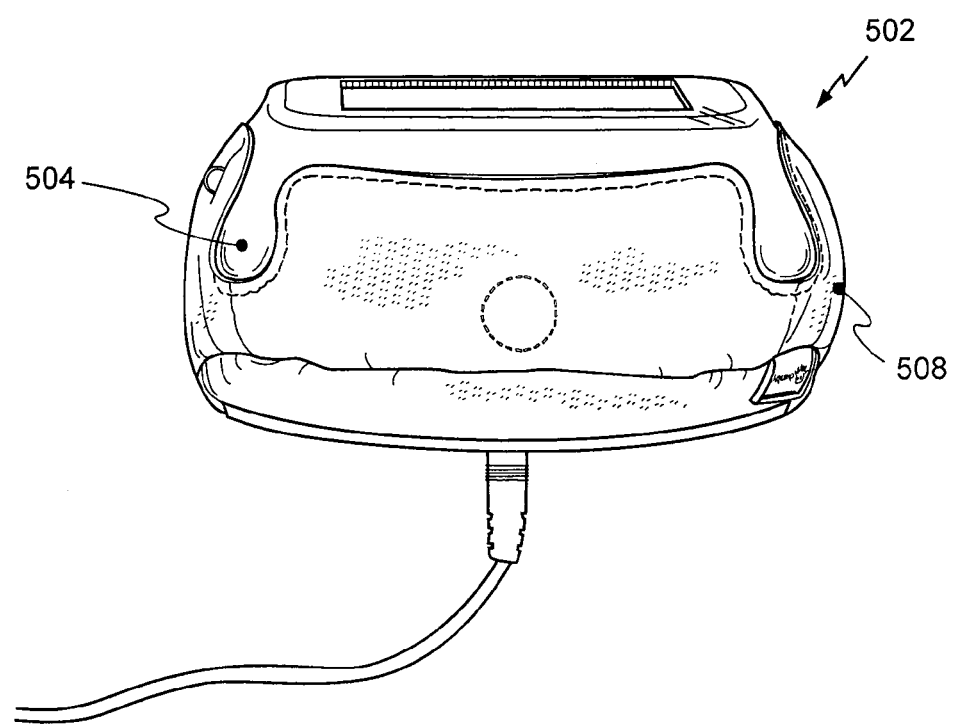
Figure 5C:
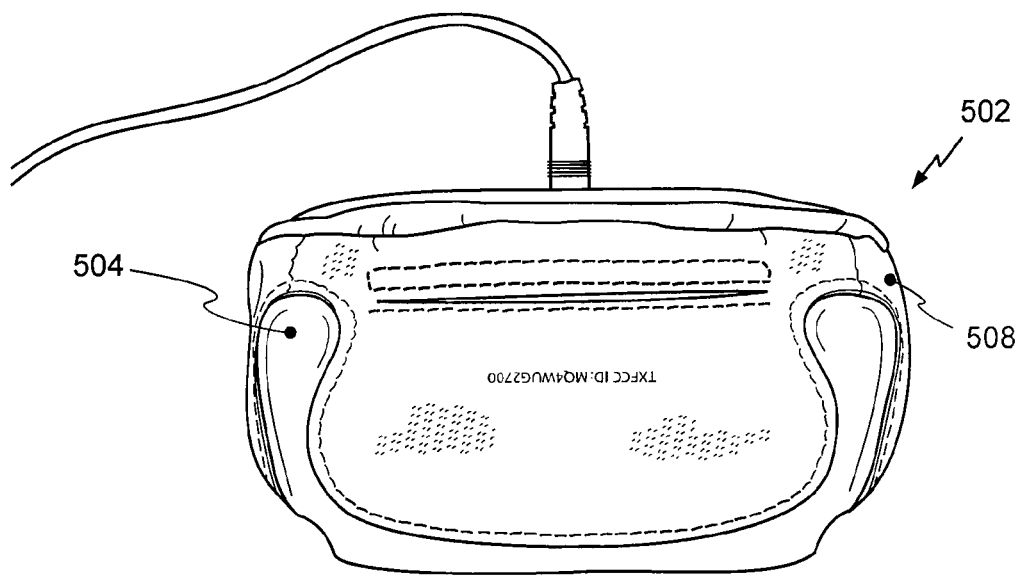
Figure 5D:
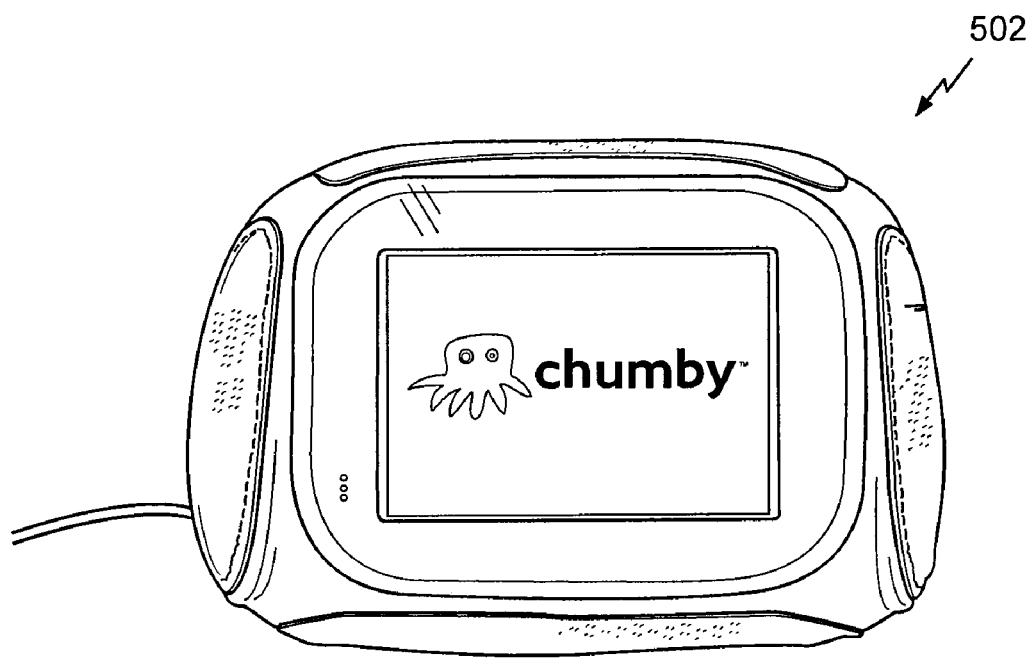
Figure 5E:
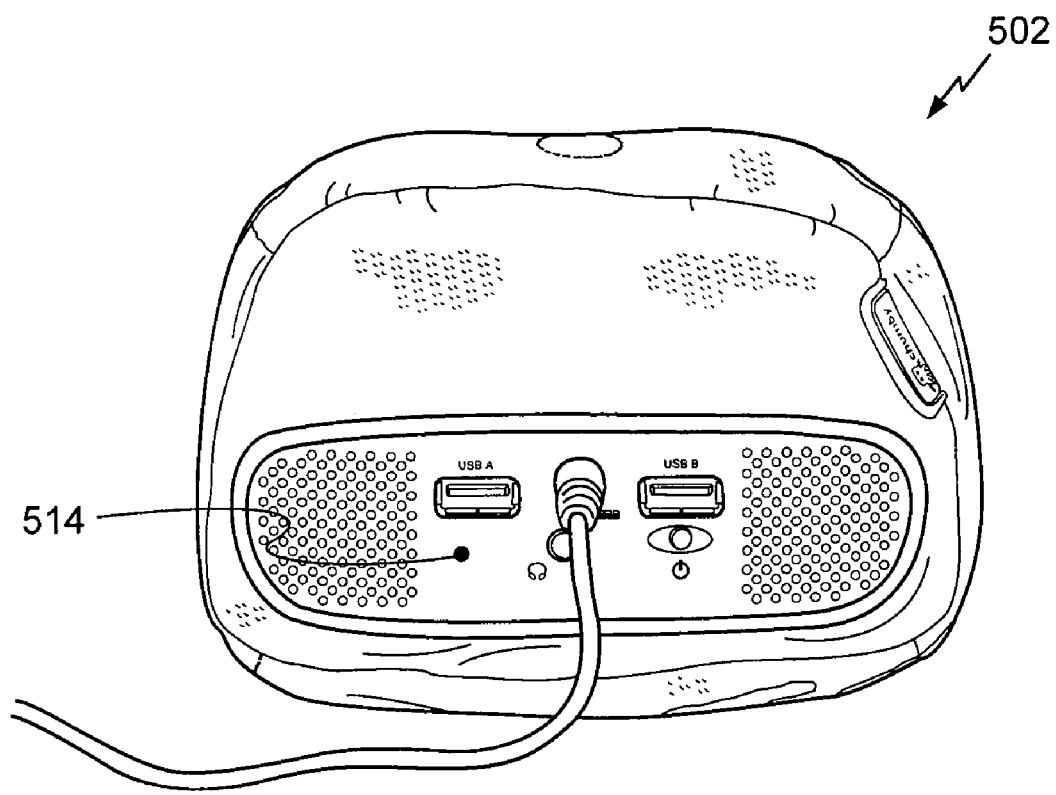

Turning to FIG. 4, there is shown an exemplary user interface 400 generated by the LCD 320 during operation of the CHUMBY™ device in control panel mode. As shown, the interface 400 defines an mute button 404, a channel button 406, a night button 408, a music button 410, a settings button 412, a clock button 414, a delete button 418, a rate button 420, a send button 422, a stay button 424, a right arrow button 428, a left arrow button 426, and a hide control panel mode button 416. Selection of the mute button 404 toggles the mute state of the CHUMBY™ device. Selection of the channel button 406 instantiates another control panel screen which enables users to view the content of all of their CHUMBY™ "channels" and/or select a new "channel" to be loaded and run on the CHUMBY™ device. A "channel" is a collection of widgets configured by a user in a named grouping via an interaction between a page rendered on a web browser 122 and the CHUMBY™ service provider, such collection of widgets generally running on the CHUMBY™ device in a sequential, repetitive fashion.

Selection of the night button 408 places the CHUMBY™ device into a "night mode" in which the screen is dimmed and a low intensity clock is displayed. Selection of the music button 410 instantiates another control panel screen which enables the user to interact with and control various continuous music sources, such as, for example, MP3 players, storage devices, and music services. Such sources may reside on either the local network or on the Internet. Selection of the settings button 412 instantiates another control panel screen which enables the user to configure various CHUMBY™ device settings, such as, for example, wireless network setup, speaker volume and touchscreen calibration. Selection of the clock button 414 instantiates another control panel screen which enables the user to configure the time, date and alarm functions of CHUMBY™ device. Selection of the delete button 418 deletes the currently displayed widget to be deleted, with user confirmation, from the current "channel". Selection of the rate button 420 instantiates another control panel screen which enables the user to provide a rating on a fixed scale for the currently displayed widget. Selection of the send button icon 422 instantiates another control panel screen which displays a personalized list of other users of CHUMBY™ users to which it may be desired to send widgets or otherwise communicate. Selection of the stay button 424 toggles the "stay" state of the currently selected widget. When the "stay" state of a widget is selected, the widget plays continuously on the CHUMBY™ device. Selection of the right arrow button 426 or left arrow button 428 causes the CHUMBY™ device to display the previous or next widget in the channel, respectively. A user may, from any Web browser 122, access a Web page generated by the service provider 106 and designate a "favorite" widget. Alternatively, a user may press a virtual, touchscreen-based button on his or her CHUMBY™ device 102 to designate the current widget as the new "favorite" widget. When the user then selects the heart-shaped icon (not shown in FIG. 4) on his or her CHUMBY™ device, an iconic representation of this favorite widget (e.g., a clock widget) replaces the heart-shaped icon and enables the user to immediately activate (i.e., cause the CPU 302 to execute) the program instructions corresponding to such favorite widget. Alternatively, selection of the heart-shaped icon (or other predefined icon) results in the CHUMBY™ device becoming configured in accordance with a "favorite" or other profile rather than executing a favorite widget. Of course, certain profiles may be specified to include only a single widget such as, for example, an "alarm clock" or "photo viewer widget.

Referring again to FIG. 4, selection of the right arrow button 426 advances one widget in a user-defined (or default) widget sequence ("channel"), or just skips ahead in implementations in which widgets are chosen to be displayed randomly. Similarly, selection of the left arrow button 428 results in "going back" one widget in the user-defined (or default) widget sequence ("channel"). As the buttons 426 and 428 are selected, an iconic representation or avatar corresponding to the currently active widget is displayed in a display box 430. If it is desired to return to the currently active widget, the hide control panel mode button 416 is selected and the control panel mode interface 400 changes to a screen through which the user views the sequence of widgets currently configured to be executing on the CHUMBY™ device.

In certain embodiments a physical button element (not shown) may be provided proximate the LCD screen 320 to enable navigation through menus and the like presented by the LCD screen 320. In one implementation this button element is cross-shaped in order to facilitate two-dimensional navigation, and may further include a smaller, dedicated button (e.g., in the center of the cross) associated with a specific widget (e.g., clock widget). Pressing this dedicated widget would interrupt the operation of all other widgets.

In implementations in which two-dimensional navigation through the user interface of the CHUMBY™ device is supported, users may be provided with the ability to navigate forward and back in the configured widget timeline. Similarly, users may navigate up and down a stack of related widgets. This function depends on the implementation of the concept of widget categories—i.e., associating widgets into logical categories that can be displayed sequentially, if configured to be displayed. An example of a category could be "News". Widgets included within this category could include, for example, a local news widget, a sports news widget, an entertainment news widget, a business news widget, and the like. For each category, there would be a default widget, which is designated by the user on the CHUMBY™ web site for each category selected to be displayed by the user's CHUMBY™ device.

If more than one widget in a category is selected, then the widgets are conceptually "stacked" with the default widget being:

on the top of the stack; and the widget that is displayed as the CHUMBY™ device automatically cycles through configured widgets.

If a widget for a given category (e.g., "News") is displayed and there exist additional widgets in the category which are also configured for display, then in the exemplary embodiment these additional widgets are "stacked" below the displayed widget. In this case the user may take some predefined action with respect to the user's CHUMBY™ device (e.g., perhaps selecting a control on the touchscreen or accessing a function via the control panel, which is instantiated via actuating the squeeze sensor) in order to cause the next widget in the "stack" for that category to be displayed. The CHUMBY™ device may be configured such that taking further predefined actions of the same type will cause the widgets either above or below in the stack to be displayed, as designated by the user. The last widget that is displayed in the stack for the applicable category when the CHUMBY™ device cycles to the next widget category will be the widget displayed in the next cycle for the just exited category (e.g, News).

The tabular illustration below provides a conceptual layout of exemplary widget stacks in various categories:

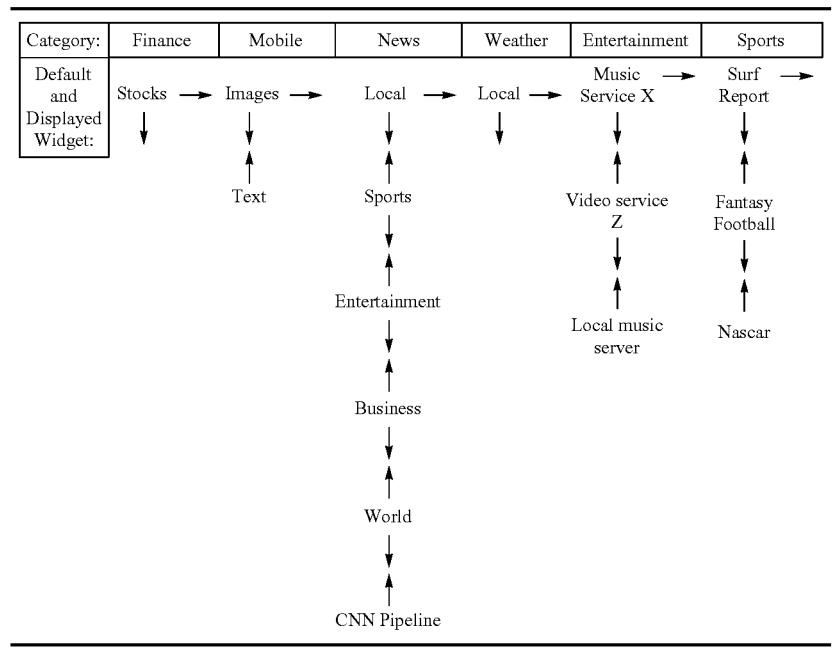

The following provides a conceptual representation of the case in which the user has navigated into widget stacks for News, Entertainment and Sports:

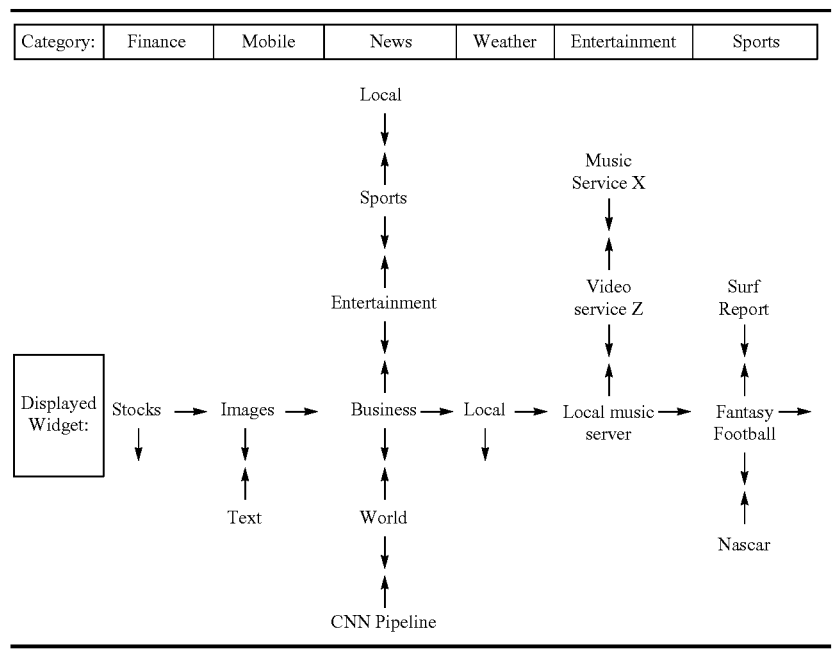

In general, the electronics of each assembly are populated onto a printed circuit board, thereby forming a printed circuit board assembly (PCBA). The PCBA is integrated into a hard sub-frame made out of a typically stiff material, such as a plastic (ABS) or a metal (steel or aluminum). The integration of the sub-frame and PCBA is referred to an "electronics sub-assembly".

Embodiments of the CHUMBY™ device may include one or more electronics sub-assemblies; an exemplary embodinents integrated into a soft housing. Each such assembly may or may not include components that are externally visible.

CHUMBY™ Device Structure

FIGS. 5-6 and 28-29 provide various views of an exemplary CHUMBY™ device in accordance with the present invention. Embodiments of a CHUMBY™ device will typically include one or more assemblies of electronic compoment described herein employs three such sub-assemblies. One such sub-assembly is included within a core electronics unit of the CHUMBY™ device, and contains heat-generating electronics components, an LCD, and a microphone. Another such electronic sub-assembly comprises a WiFi riser containing a WiFi communications module. The third electronics sub-assembly included within the exemplary embodiment of the CHUMBY™ device comprises a "daughtercard sub-assembly". The daughtercard contains a plurality of external connectors (e.g., USB connectors) and a set of audio transducers. In the exemplary embodiment a mechanical switch is grafted onto the daughtercard sub-assembly facilitates the "squeeze sensing" described below. An accelerometer may also be included upon the daughtercard sub-assembly.

The general subdivision into these three sub-assemblies confers several benefits. By confining the heat generating components to the core electronics unit and WiFi riser, a more cost-effective heat path may be engineered. By confining the connectors and large transducers to the daughtercard, logistical advantages may be conferred to the supply chain. This may add a new level of rapid reconfigurability of the CHUMBY™ device for end user customization. By bridging between the sub-assemblies with flexible connectors, the CHUMBY™ device retains a soft and flexible feel.

Attention is now directed to FIG. 5, which provides various perspective views of an exemplary CHUMBY™ device configured with a malleable housing 502 comprising a rubber-type frame 504 in combination with a fabric material 508. The housing 502 surrounds a core electronics unit 512, bezel 514 for daughtercard sub-assembly, and a plush interior fill material (not shown in FIG. 5). The frame 504, fabric 508 and fill materials collectively impart a soft and malleable feel to users handling the CHUMBY™ device.

In one embodiment the frame 504 is composed of Santoprene™ or Texin, a soft, flexible, tactile, rubber-like material similar to TPE (thermo plastic elastomer). In another embodiment, the frame 504 is composed of a very low durometer PVC (Polyvinyl Chlroide). The exact frame composition will generally balance considerations of flexibility, feel, look, and manufacturing properties, namely, the ability to be sewn and to have items tacked onto the side with adhesive to improve production tolerances. The frame 504 provides structure and form to the housing 502 and allows the core electronics unit 512 to be replaced and inserted. The frame 504 will generally be manufactured in a relatively flattened configuration and then manually flexed or curved and stitched to the fabric or other soft material when assembling the housing 502 of the CHUMBY™ device. In another embodiment, the CHUMBY™ frame, fabric, or a combination thereof is created out of molded EVA (Ethylene Vinyl Acetate) foam. The molding process renders a slightly different feel but generally provides greater fidelity to CAD-related artwork.

Figure 28:
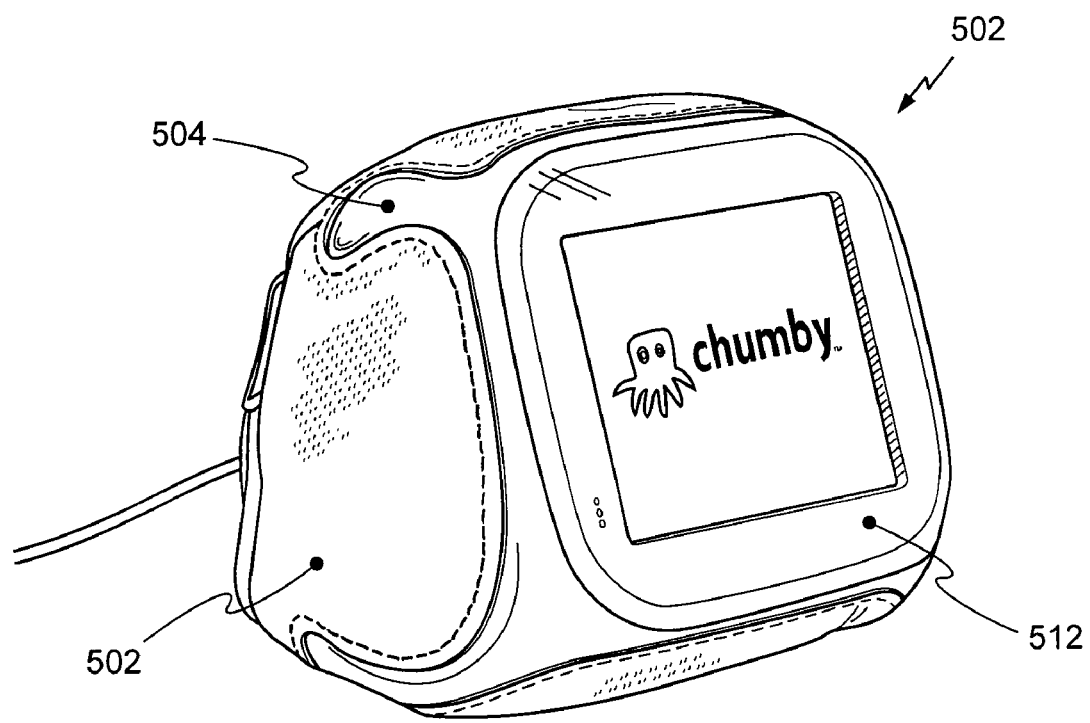
FIG. 28 provides an alternative illustration of a CHUMBY™ device in which is identified a core electronics unit and flexible housing of the device.

FIG. 28 provides an alternative illustration of a CHUMBY™ device in which are identified the core electronics unit 512 and the flexible housing 502. As opposed to existing wireless or other consumer electronic devices in which the device electronics are typically simply mounted into rigid plastic enclosures that are not subject to any user modification or customization, in an exemplary embodiment the flexible housing of a CHUMBY™ device may be created using any number of exterior fabric materials such as those used in soft-goods or plush toy manufacturing. Such materials may include, for example, leather, suede, Neoprene, rubber, vinyl, etc. Interior to the flexible housing may be contained any number of fill materials, such as Poly-Fil, polyester beads, gel, foam, metal beads, etc., not unlike a pillow, stuffed animal, or plush toy. Such interior fills enable the CHUMBY™ device to be "squishable." Moreover, such interior fill enables the device to retain its shape after being "squeezed" or "pressed" by a user in order to trigger an internal squeeze sensor 650. (In other embodiments an electric field/capacitance sensor may be used in lieu of a squeeze sensor to detect the location/distance of a user's hand to the sensor; that is, since the user's hand moves closer to the sensor as the user squeezes the flexible housing of the CHUMBY™ device, the sensor is capable of indicating that a "squeeze" event has occurred).

Figure 29:
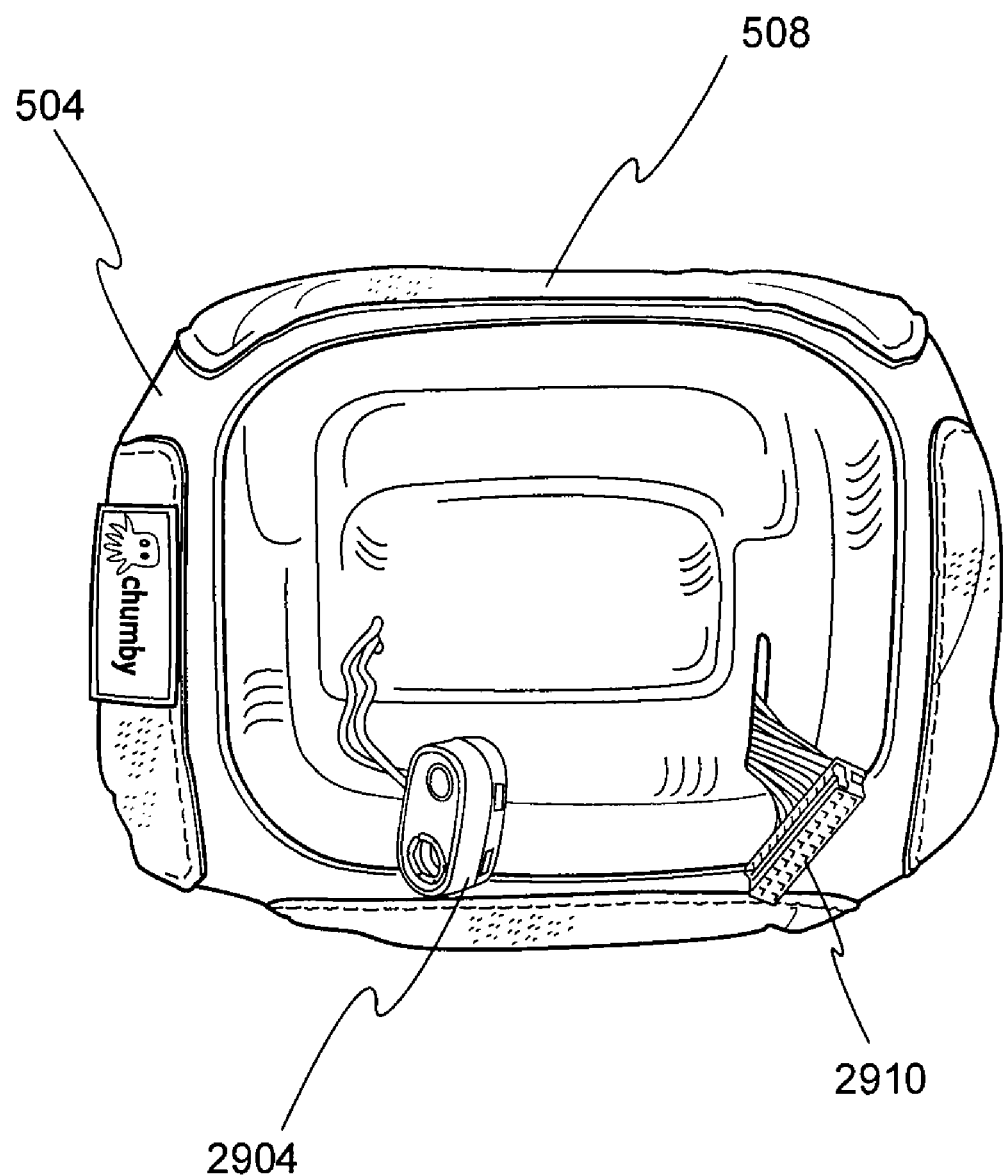
FIG. 29 illustrates various components interior to a flexible housing of an exemplary CHUMBY™ device.

Turning now to FIG. 29, interior to the flexible housing of an exemplary embodiment of the device there is included the daughtercard circuitry containing an external power switch, external power supply connector, external headphone connector, one or more external USB connectors, internal left and right speaker connectors, internal 9V back-up battery connector 2904, internal squeeze sensor connector, and internal cable assembly or "Chumbilical™" connector 2910. In one implementation the Chumbilical connector 2910 is used to connect all the signals received/processed by the daughtercard sub-assembly to the core electronics unit 512 of the CHUMBY™ device, which is press-fit into the soft frame. Also positioned interior to the flexible housing are a pair of speakers 630 (for left and right audio output) (FIG. 6F), as well as a squeeze sensor 650 (FIG. 6G) and various cabling required to attach such elements to the daughtercard sub-assembly 640. In the preferred embodiment, the speakers are affixed to a rigid plate, constructed of plastic or other similar material, located on the back of the CHUMBY™ device, coincident to the headphone connector, USB ports, power switch and power connector.

The division of the circuitry into a core board with greater complexity and cost and a daughtercard which breaks out many of the peripheral connections and features is a significant feature of the design of exemplary embodiments of the CHUMBY™ device. So segregating the design enables quicker adaptation to market and product changes, since the most volatile components of a system are often "on the edge". The segregation of the core and the peripherals in this manner also provides a key benefit, in that the peripheral card can be customized at a lower cost, which helps enable the growth of an ecosystem of accessories and custom housings around the CHUMBY™ device.

Figure 30:
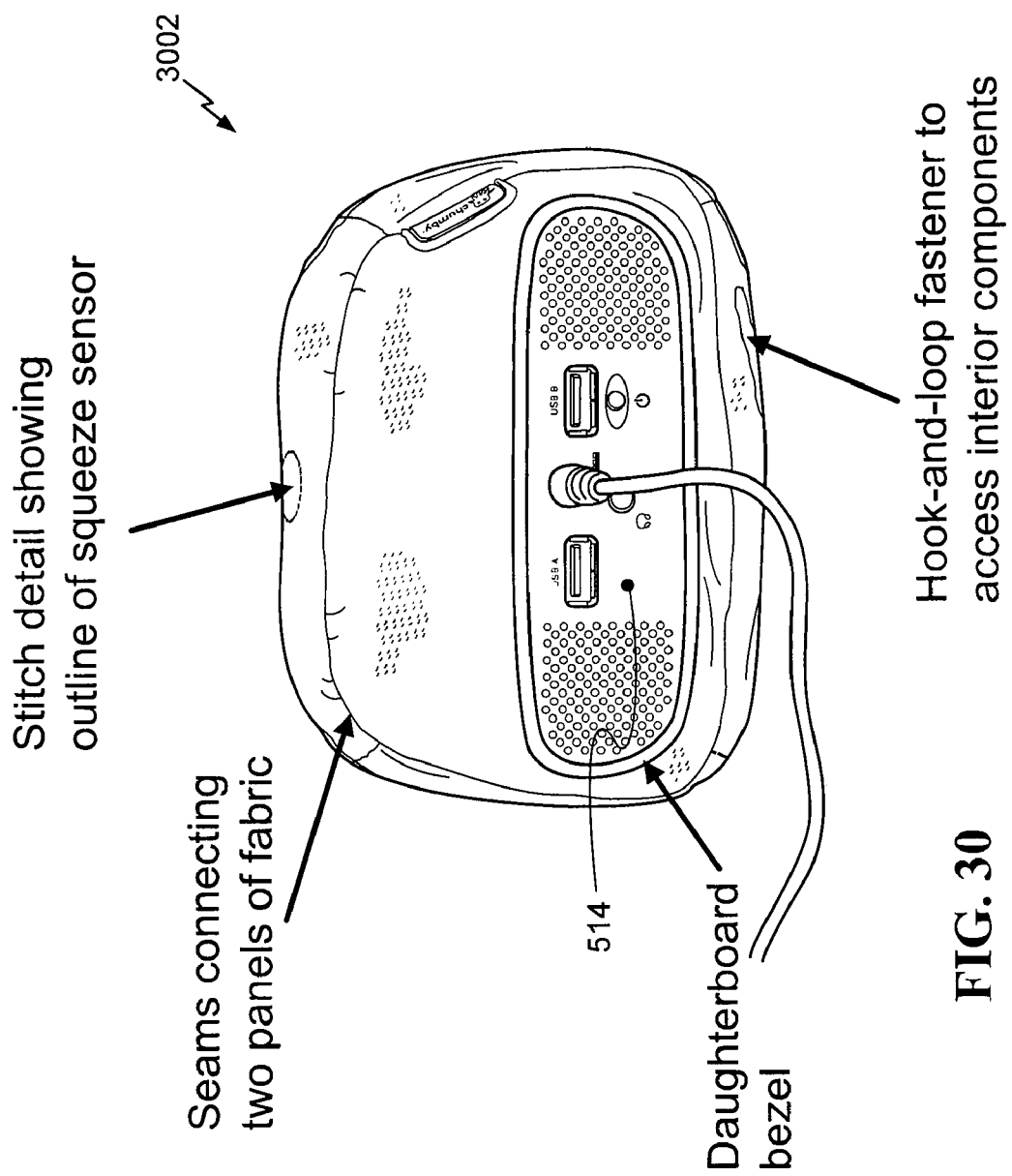
FIGS. 30-31 provide an example of a flat pattern used to define the exterior structure of a flexible housing of an exemplary CHUMBY™ device.
Figure 31:
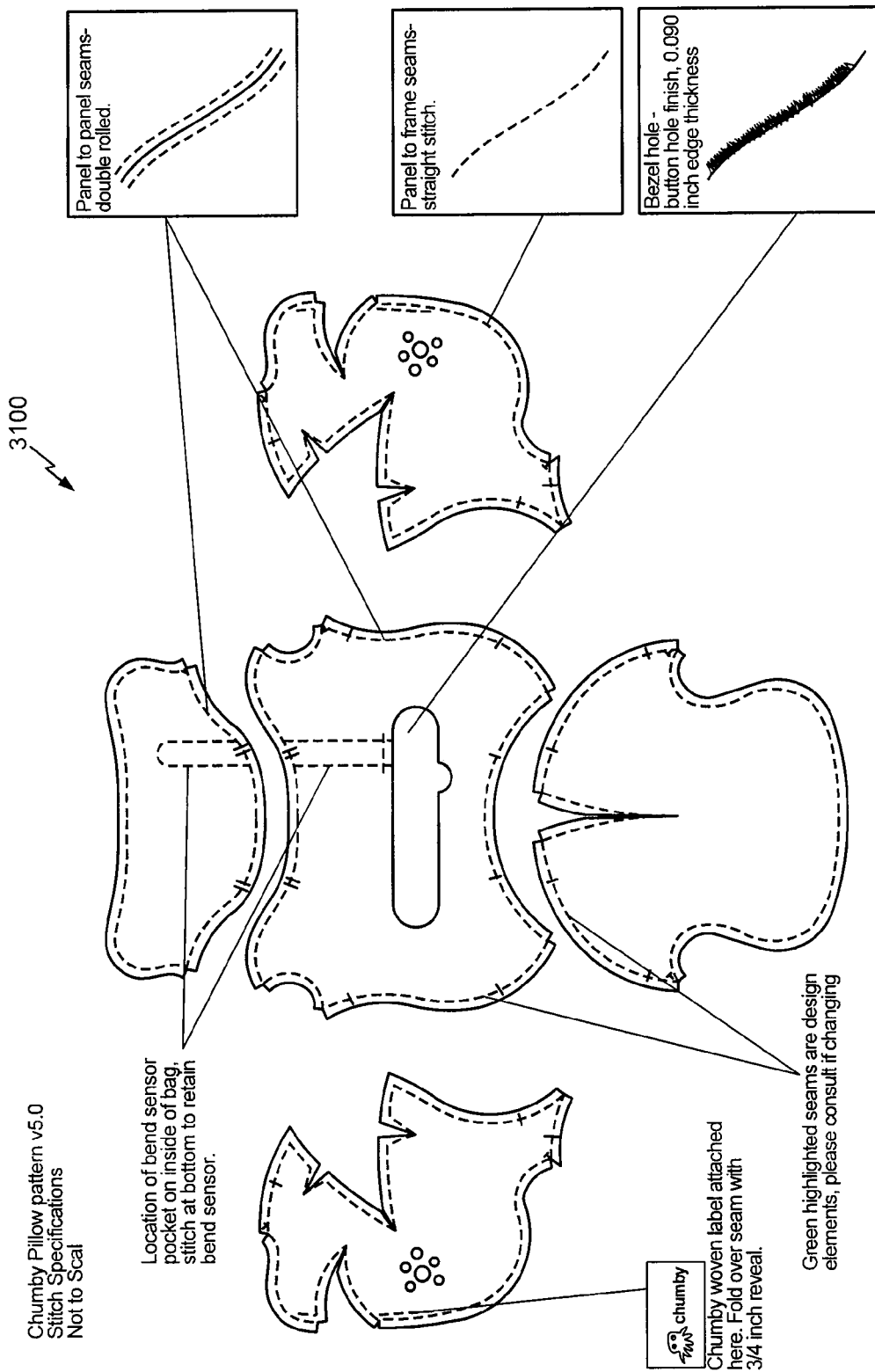

Referring to FIGS. 30-31, an example of a flat pattern, commonly used in soft-goods and garment manufacturing, is used to define the exterior structure of the flexible housing 3002 or "bag" of an exemplary CHUMBY™ device ("CHUMBY™ bag"). Any number of artistic/design elements can be added to the exterior fabric material of the CHUMBY™ bag to add dimension and visual features. The use of a fabric-type enclosure for the CHUMBY™ device provides for unlimited possibilities for product housing creation, both by the original manufacturer and end-users (such as craftspeople, hobbyists, etc.), and is believed to represent a novel approach in the design of consumer electronic and/or wireless devices. Fabric tags, patches, or other fabric/garment-related items can be stitched or otherwise attached to the exterior housing of the CHUMBY™ device to convey product or corporate information, such as a logo.

Figure 6B:
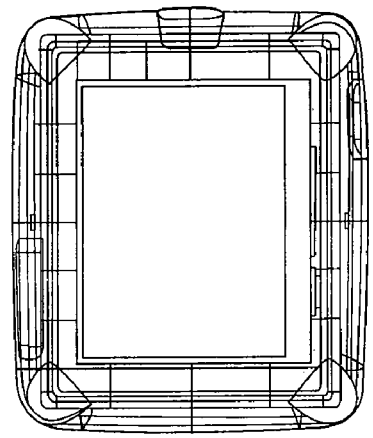
FIGS. 6A-6D provide various partially transparent perspective, side and plan views of an embodiment of the CHUMBY™ device.
Figure 6D:
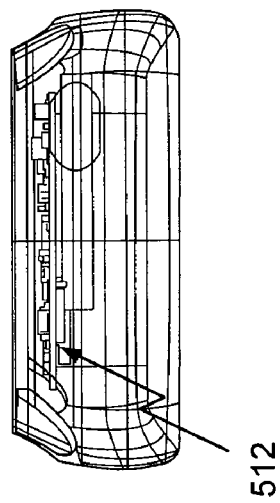
Figure 6A:
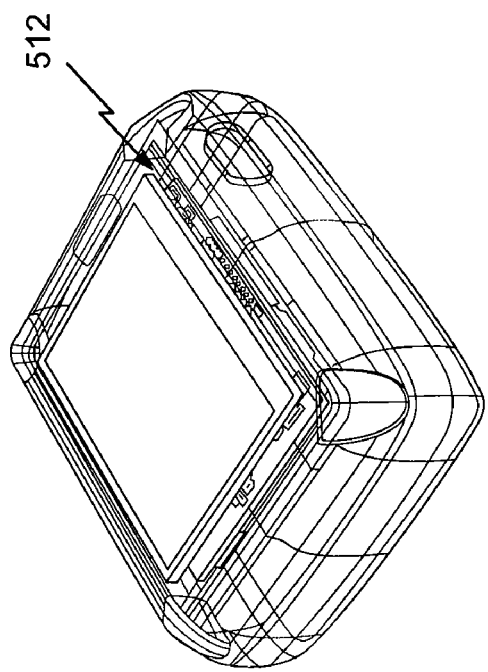
Figure 6C:
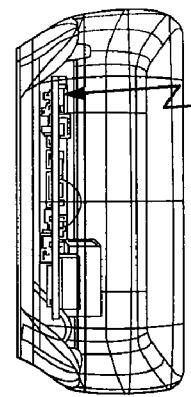
Figure 6E:
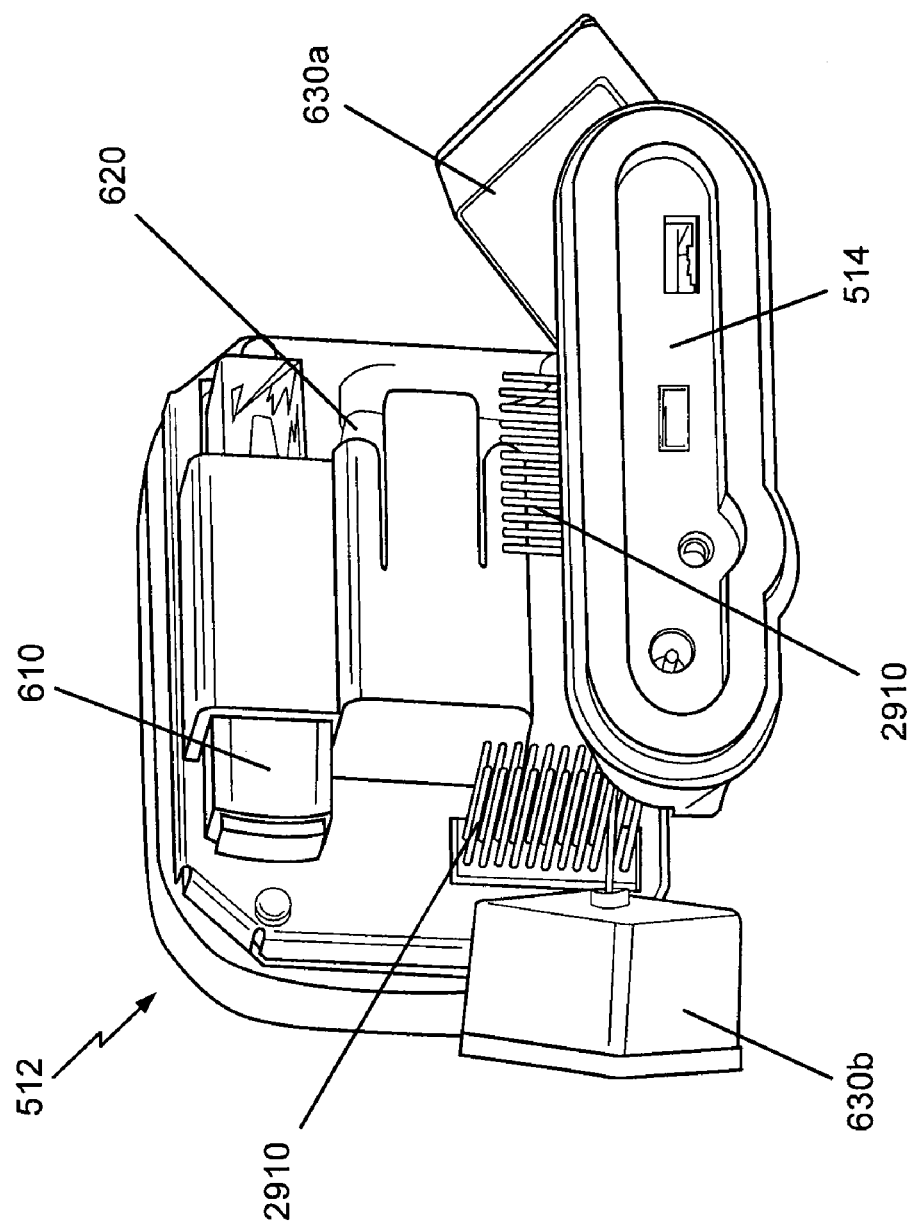
FIGS. 6E-6G depict the core electronics and other components contained within the housing of a CHUMBY™ device and the arrangement of certain of these components within a housing of the device.
Figure 6F:
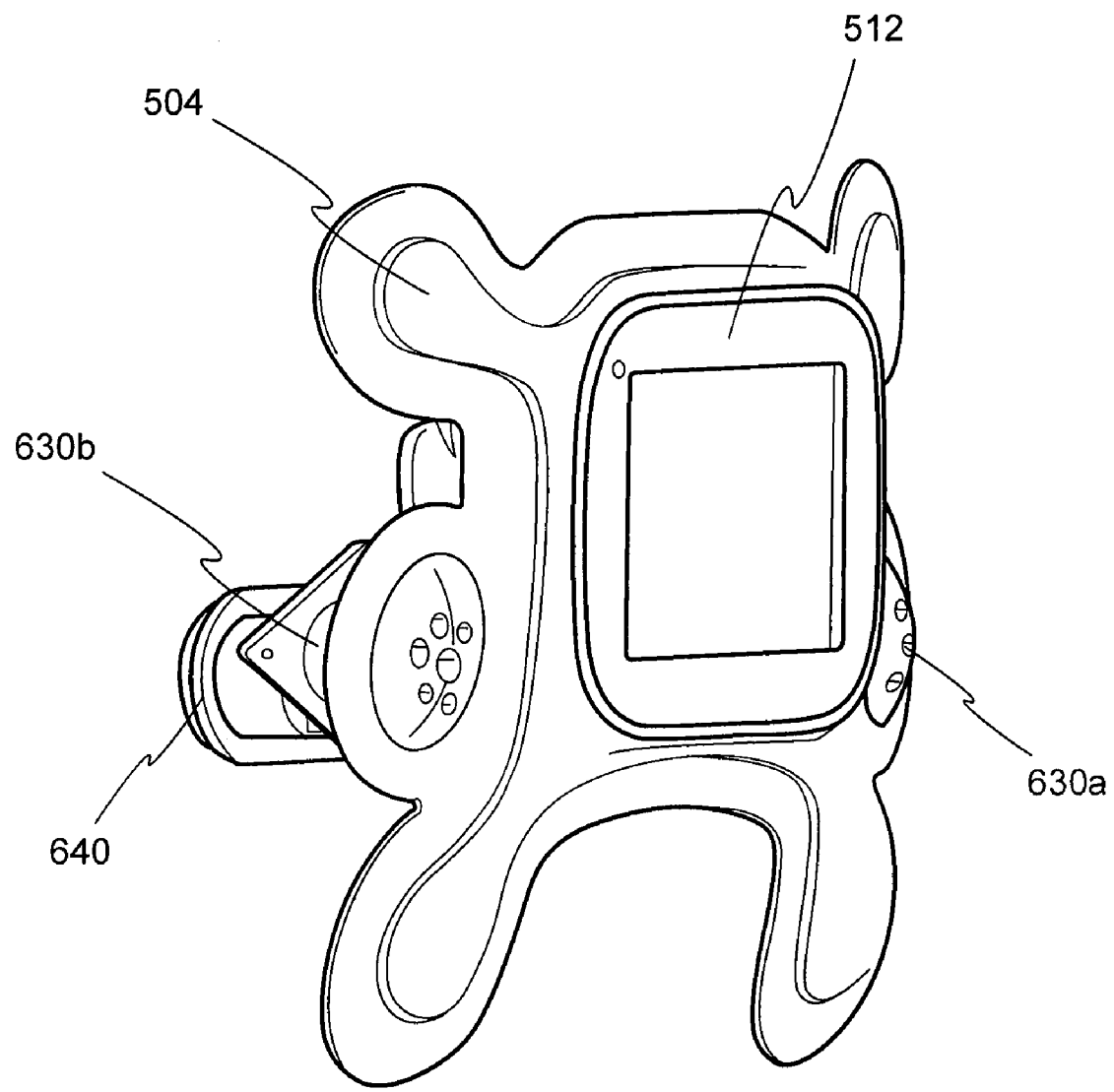
Figure 6G:
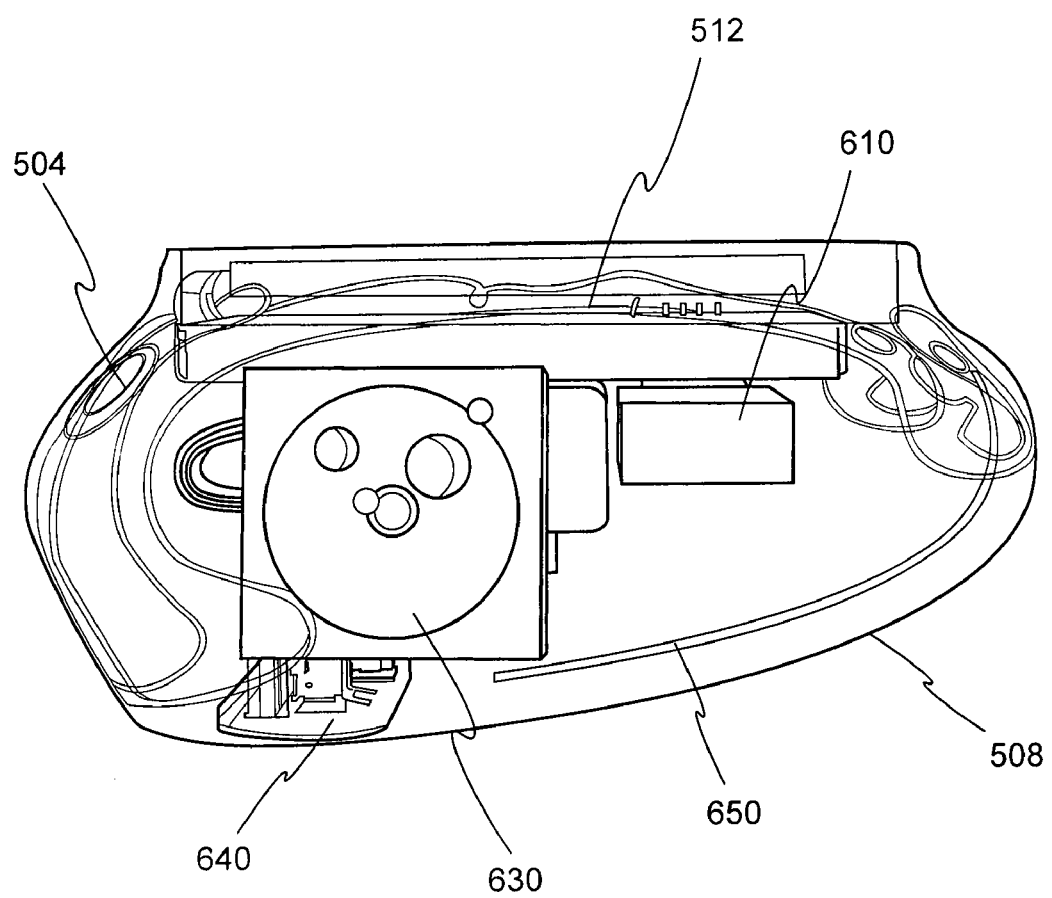

FIG. 31 provides a sample flat pattern drawing 3100 for the flexible housing 3002 or "bag" of a CHUMBY™ device, showing individual fabric panel shapes, stitching details, and design elements:

FIGS. 6A-6D provide various partially transparent perspective, side and plan views of an embodiment of the CHUMBY™ device. FIGS. 6E-6F depict the core electronics unit and other components contained within the housing of the CHUMBY™ device, and FIG. 6G illustrates the arrangement of certain of these elements within the housing.

The core electronics unit 512 will generally include, for example, a main circuit board onto which are populated a plurality of electronic components. The main circuit board will generally then be integrated into a hard sub-frame made of a rigid material such as, for example, stiff plastic or metal, thereby yielding an electronics sub-assembly. The core electronics unit 512 will also typically include an LCD display, touchscreen, ambient light sensor, microphone, USB WiFi dongle 610, backup battery 620, and any number of RF shields. This core module is designed to be removable from the frame by the user of the CHUMBY™ device. It is typically connected into the housing CHUMBY™ by the Chumbilical™ connector 2910.

The WiFi dongle 610 is connected to the WiFi riser (not shown) of the core electronics unit and facilitates WiFi wireless networking.

The backup battery 620 may be realized using, for example, a standard 9V alkaline, and is used to provide backup/supplemental power to the CHUMBY™ device in the event of failure of the primary power supply. In one embodiment, the backup battery 620 is mounted onto an RF shield positioned on a back side of the core electronics unit 512 and is intended to be replaceable by the user. In another embodiment, the battery 620 is contained in the soft housing of the CHUMBY™ device and is accessible via a velcro-sealed hole in the exterior material for user service.

In the exemplary embodiment the daughtercard 640 provides connectors available to the user, including power input, headphone output, and external USB-style connectors for future accessories and/or facilitating device upgrades. The daughtercard sub-assembly 640 is clamped to the fabric in between the daughtercard sub-assembly front and rear bezel components 514, which are made of rigid ABS-type plastic. The daughtercard sub-assembly connects to the core electronics 512 via the Chumbilical™ 2910.

In the exemplary embodiment the CHUMBY™ device includes a pair of internally-mounted speakers 630 to provide stereo sound. In one embodiment, the speakers 630 are held in place using square pouches sewn into the interior of the unit. The pouches each have a small drawstring to keep the speakers 630 in a relatively fixed position within the interior of the CHUMBY™ device. In another embodiment, the speakers are retained in the rear bezel molding. Both speakers 630 connect to the daughtercard sub-assembly 640.

As is discussed below, the squeeze sensor 650 may be implemented in a variety of different ways to facilitate sensing of "squeezing" of the CHUMBY™ device. The squeeze sensor 650 is typically connected to the daughtercard sub-assembly 640 and in one particular embodiment comprises a flexible resistive element which varies in resistance based upon the angle of flex of the sensor. Alternatively, the squeeze sensor 650 may be comprised of a canonical snap action switch with a lever protruding into the body of the CHUMBY™ device and buffered by the surrounding fill material to give an overall soft feel. Accordingly, the squeeze sensor 650 is capable of detecting physical "squeezing" of the soft housing of the CHUMBY™ device. Signals from the squeeze sensor 650 are processed (e.g., by the core electronics module 512 or dedicated electronic circuitry) and generally will precipitate performance a defined action, which may be dependent upon characteristics of the currently active widget. The squeeze sensor 650 connects to the daughtercard sub-assembly 640. The squeeze sensor 650 will generally be attached to the inside of the CHUMBY™ bag and oriented parallel to the vertical access of the CHUMBY™ device. In other embodiments, one or more displacement sensors may be used to effect the same function.

The squeeze sensor 650 may be implemented in a variety of different forms to accomplish "squeeze sensing" within a CHUMBY™ device:

Mechanical sensor: As mentioned above, a mechanical switch, such as a "snap action" switch, may be mounted with its actuator lever curled over so that it does not catch on any of the internal fabric seams. Soft fill may be packed between the lever and the bag surface so as to spread the force of the squeeze around, thereby increasing the effective active area of the snap action switch. Soft fill may also be packed between the lever and the switch so as to provide extra restoring force so that the switch does not become stuck in one position.

Force or bend sensitive sensor: A strip, such as a resistive bend sensor, or a force sensor consisting of a resistive material, a spacer, and intercalated electrodes, may be adhered or sewn into the fabric. The deformation of the fabric modulates the resistance of these sensors, which could then be post-processed by the electronics in the bag into a bend signal.

Field sensor: A capacitive field sensor may be used, which creates a sensing field that extends up to the edge of the bag. When the bag is squeezed, the deformation and presence of the fingers will change the dielectric properties of the air within the bag. This change in dielectric property can be detected using a number of techniques, including but not limited to the shift in frequency of a resonant tank.

Acceleration sensor: An accelerometer inside the bag may be used to detect the signature of a deformation event based upon how the sensor moves inside the bag. A set of advanced signal identification primitives may be required, which may take the form of kalman filters, matched filters, and/or hidden markov estimators.

Fabrication of CHUMBY™ Device

As is described hereinafter, a number of process innovations have been developed to address a number of issues pertinent to fabrication of exemplary embodiments of the CHUMBY™ device. For example, challenges exist in ensuring that the soft housing retain each electronics sub-assembly; that is, ensuring that such sub-assemblies remain appropriately positioned within, and do not fall out of, the soft housing of the CHUMBY™ device. In particular, it will generally be desired that the core electronics unit be accessible with a small amount of effort on the part of the end user. A number of methods may be used to ensure a solid mating between the core electronics unit and the soft frame:

First, a plastic lip may be attached to an opening defined by the soft housing in the manner described below. The lip is preferably configured to have a smaller opening than the size of the core electronics sub-assembly. This difference in diameter or relevant dimension prevents the core from easily falling out of the plastic lip.

Second, the soft housing may internally include a set of buttresses that press against the core electronics sub-assembly to keep the housing from being easily pushed inward. The buttresses may take the form of a structural foam or of a rigid mechanical piece attached to the housing.

Third, the lip may have a set of friction-locking points, thus enabling it to engage into the core electronics sub-assembly through mating friction-lock points.

Fourth, the lip and core electronics sub-assembly may be glued together using a variety of adhesives. Using a brittle drying adhesive (such as a cyanoacrylate) allows the seal to be broken with minimal cosmetic impact.

In addition, the lip of the soft housing may be engineered using a soft but semi-tacky plastic, such as TPE, which inherently provides friction.

With respect to mating of the bezel of the daughtercard sub-assembly to the soft housing, it will typically be desired that the sub-assembly be mounted in place without any visible gapping so as to create a "seamless" look with respect to the remainder of the soft housing. A number of methods may be employed to ensure such a seamless mating:

First, an overmolded soft plastic lip (such as a TPE compound) can be applied to the plastic edge of the bezel for the daughtercard sub-assembly to facilitate blending.

Second, a viscous or semi-solid adhesive (such as VHB) can be applied to the daughtercard bezel prior to mounting to assist with minimizing gapping.

Third, a jig-shaped element may be used to hold the bezel component so as to facilitate alignment of the applicable components.

Fourth, a set of screw holes may be made in the fabric of the soft housing in alignment with mating screw-through pegs in the daughtercard bezel to facilitate both alignment and retention of the fabric.

Fifth, a friction-fit rim consisting of an exterior piece sandwiching an interior piece may be used to enhance the snugness of the seam between the soft housing and the daughtercard bezel.

In exemplary embodiments of the CHUMBY™ device a number of approaches may be used during the fabrication process to reduce the buildup of within the soft housing during operation of the CHUMBY™ device. Since in certain embodiment a CHUMBY™ device may gain its shape and resilience due to air trapped between the fibers of a compound similar to polyfill, the fill material and soft housing collectively act as an insulator around the various electronics sub-assemblies. Strategies for mitigating this potential insulating effect are described below.

One heat dissipation strategy involves filling the soft housing of the CHUMBY™ device with thermally-conductive materials. The materials may be dispersed in whole or in part through the soft fill material interposed between the electronics sub-assemblies and the soft housing. Such thermally-conductive materials may be composed of, for example, hollow aluminum beads or pellets, or plastics having relatively good thermal conduction characteristics. Another embodiment uses a thermally-conductive gel material to conduct the heat from the core electronics sub-assembly to the surface of the soft housing. Alternatively, a heat pipe may be used to conduct heat to a metal plate glued to the surface of the soft housing. Such approaches may advantageously leverage a large surface area and utilize relatively thin fabric material for the soft housing so as to minimize overall heat retention.

Heat dissipation may also be facilitated by "stacking" the various electronic sub-assemblies and other components in such a way that a low-thermal resistance path exists from each heat-generating component within the device to one of the solid structures facing exterior to the CHUMBY™ device (e.g., the daughtercard bezel or LCD display). In this embodiment such solid structures effectively function as heats sinks. Each low-thermal resistance path may be completed by interposing a thermal compound (e.g., in the form of soft, gel-like gap filling pads) between the heat generating electronics sub-assemblies and the externally facing solid structure. For example, in one embodiment the LCD display is held in place with an aluminum heat spreader plate, and a thermal compound is applied between the heat spreader and the LCD. In addition, the PCB of the core electronics sub-assembly may contain thermal vias and copper planes to enhance heat flow.

When the WiFi module is mounted directly to the PCB of the core electronics module, heat conduction may be enhanced using positioning a soft gel-like gap filling between the WiFi module to this PCB and ultimately through the LCD display to the ambient air. In another embodiment, the WiFi module is placed on a WiFi riser in order to enable generation of an improved antenna pattern. In this embodiment the WiFi module is positioned such that a suitably low-resistance thermal path is established between the module and the PCB of the core electronics module through any of the metal connectors or devices exposed on the PCB.

Assembling pieces of a soft, flexible material into the soft housing of CHUMBY™ device poses a number of challenges. One exemplary approach involves first sewing the pieces of flexible material inside out and then "turning" the resultant aggregation into its final bag-like configuration for mating (e.g., sewing) to the flexible frame 504. A number of difficulties which may be potentially encountered during this type manufacturing process and possible resolutions to such difficulties are described below.

Binding of the flexible frame to the sewing machine—In one approach a spray-on lubricant may be applied to a back of the flexible frame 504 to prevent binding of the soft housing to the foot of a sewing machine used to attach the soft housing to the frame 504. Such binding may also be reduced by laminating a piece of smooth paper to the back of the frame 504. Another process improvement that may be employed in combination with any or all of the above is to use a post-style or anvil-style sewing machine rather than a flatbed machine.

Misalignment due to mismatch of fabric and plastic durometer—As the sewing machine feeds the interface between the frame 504 and the fabric of the soft housing, the fabric will tend to stretch more and faster than the plastic frame 504. This may be compensated for by pre-distorting the fabric pattern by an amount matching the amount of distortion introduced by the sewing machine feed.

Misalignment due to operator error—Mismatch of the fabric of the soft housing and the frame 504 may occur due to the compound curves involved in realizing exemplary embodiments of the CHUMBY™ device, thereby making visual alignment difficult. Such mismatch may be reduced by integrating notches, marks, and dots into the plastic frame 504 and flat pattern to act as guides for the operator of the sewing machine.

Fabric puckering—Once a seam is created between the frame 504 and the fabric material of the soft housing, the fabric will tend to pucker away from the seam due to the fabric crushing in the vicinity of the seam. This may be compensated for by gluing the fabric onto the frame 504 prior to sewing. The glue acts both as a scaffolding to hold the fabric in place and to prevent the fabric from lifting off the surface of the frame 504.

Edge finishing—It is anticipated that small errors in sewing will tend to be more apparent or otherwise noticeable if the edges of the fabric of the soft housing are rough. This degradation in appearance may be addressed by treating the edges of the fabric to make them appear finished. The specific process employed depends upon the type of fabric material used. For example, in exemplary embodiments which use leather as the fabric material for the soft housing, the edges may be painted. When woven synthetics are used as the fabric material, the edges may first be heat-treated (either with an open flame or a heated metal die). In particular, when using synthetic fabrics for the soft housing a heated metal die may be utilized create a melted emboss pattern around the area of the die used for cutting the fabric. The melted emboss pattern will act to bind the fibers together and create a finished looking edge. For natural fabrics, the edges may be painted, folded under, or have sewing tape applied.

Height matching—In exemplary embodiments the plastics or other substances forming the frame 504 are pressed in high-precision molds; in contrast, the fabric materials used for the soft housing are the products of imprecise processes. Mismatch in height between the two can create objectionable visual artifacts. When leather is used as the fabric material, these artifacts may be ameliorated by skiving the leather so as to control its height prior to sewing to the frame 504. Also, the plastics or other materials used for the frame 504 will generally be molded such that they rise above the height of the finished leather over anticipated manufacturing tolerances. This reduces the visual impact of any imperfections, particularly when the device is viewed from "head-on".

The process of initially integrating multiple pieces of flexible material into the soft prior to attachment to the frame 504 also poses a number of challenges. One exemplary process pertinent to a soft housing comprised of leather is described below.

First, the soft housing is assembled with the four leather panels, each of which forms one of the sides of the soft housing. When joining these seams, the leather is flipped over, glued, and pounded flat so as to reduce the profile and puckering of the seams when viewed from the front.

The leather has its thickness skived, at least in the area of any seam, so as to reduce puckering in the area of the seam.

The back of the soft housing is attached at the last stage of the process, and then the device is turned inside out.

In another embodiment, the leather seams are given excess length, and the material is sewn back upon itself to create a triple-stitch.

In other embodiments darts may be used to relieve stress around the curved edges of the soft housing. However, the use of darts may adversely affect the aesthetics of the device. Accordingly, in yet another embodiment a modified flat pattern having sufficient tolerance to handle any stresses that build up around such curved edges is utilized.

Due to the stresses that are stored in the flexible frame 504 and fabric housing, exemplary embodiments of the CHUMBY™ device may develop a permanent, assymetric bias in shape. The following techniques may be applied to limit the impact of these stresses.

First, the effects of friction at the interface between the sewing machine and the materials being sewn may be reduced in the manner described above.

Second, a hot melt may be applied to the frame 504 after the CHUMBY™ device has been assembled. The hot melt is applied on a shaped jig such that the when the hot melt cures it forces the device into a prescribed shape.

A stiffer fabric may be laminated to the back of soft fabrics used in the process. Although not visible from exterior to the CHUMBY™ device, the stiffness allows the natural shape of the fabric (as embodied by the flat pattern) to dominate the forces built into the stitch seams between the frame 504 and the fabric.

Natural fabrics, such as leather, contain defects that can impact the yield of the process. During the die cutting phase, coarser pieces of leather may be cut using the pattern for the bottom and back pieces, so as to lessen the visual impact of these pieces while increasing the overall usage of the leather hide.

The material selection for the frame 504 plays a large role in the manufacturability of the soft housing. The soft frame 504 will preferably comprise a material which is flexible yet does not stretch easily. It will typically be sufficiently soft to permit a sewing needle to penetrate without breaking. One embodiment uses a TPU type of plastic to implement the frame 504. This type of plastic has the advantage that the soft housing may be attached to using glue, but is relatively hard and sewing needles may have trouble penetrating its surface. Another embodiment uses a TPE type of plastic, which is flexible, does not stretch easily, and may be easily penetrated by a needle. However, it is difficult to induce adherence to the surface of TPE. Another embodiment uses a PVC/PU type of plastic, which is flexible, admits the application of glue, and is soft enough for a needle to easily penetrate.

In another embodiment, an EVA foam is used for both the frame 504 and the fabric of the soft housing, or just for the frame. The EVA may be cast over a mold of the desired size and allowed to set. This process may advantageously produce an integrated frame and flexible housing without sewing, and is capable accurately realizing precise geometries. However, the use of an EVA foam for both the frame and housing of a CHUMBY™ device results in the device exhibiting a stiffer feel than other implementations.

Figure 32:
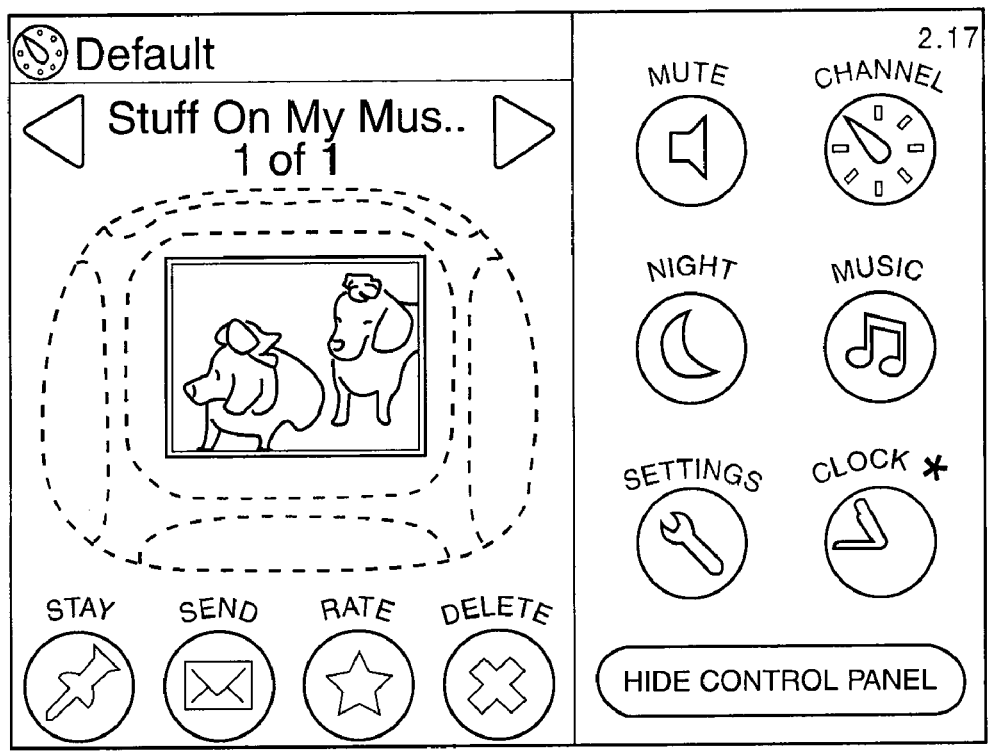
FIGS. 32-33 show exemplary user interface screens of a CHUMBY™ device applicable to a process for calibration of one or more bend sensors within the device.
Figure 33:
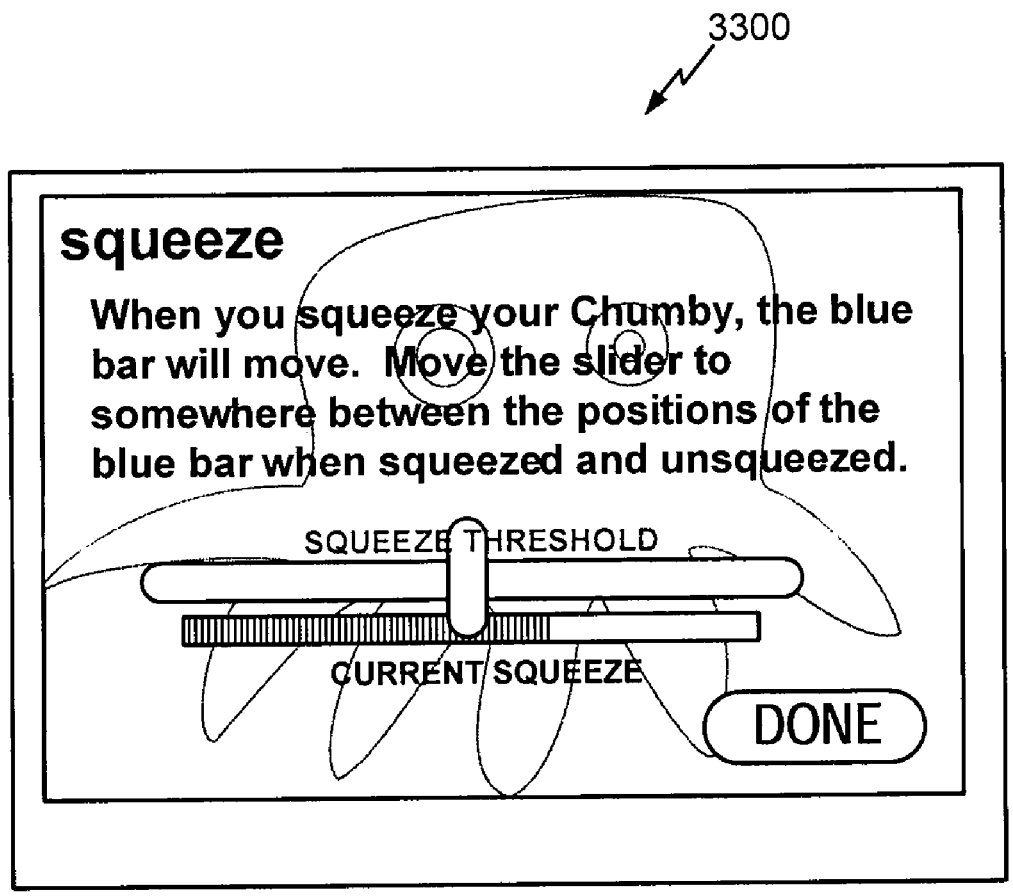

Attention is now directed to the exemplary user interface screens of a CHUMBY™ device shown in FIGS. 32-33, to which reference will be made in describing a process for calibration of the one or more bend sensors 650 within the device. When a user "squeezes" the back of a CHUMBY™ device and displaces the applicable squeeze sensor 650 beyond the threshold tolerance, the Control Panel function is activated and the appropriate user interface is displayed (FIG. 32). From a "settings" screen accessed 3220 via the Control Panel 3210 of FIG. 32, the user can then access the "squeeze" calibration function 3300 (FIG. 33) to recalibrate the bend sensor.

Although in certain embodiments the flexible or malleable housing of each CHUMBY™ device is intended to be essentially permanent and not replaced, in other embodiments such housings may comprise interchangeable "skins" designed to be easily detached and replaced at the discretion of the user. In such implementations the CHUMBY™ device may be configured to operate in accordance with various profiles depending upon the particular "skin" currently attached to the underlying hardware "core" of the device. Specifically, one or more sensors could be deployed upon the core of the CHUMBY™ device in order to read electronic identifiers embedded within the various skins disposed to be employed as the housing for the CHUMBY™ device. Each identifier could consist of a persistent (non-volatile) storage module containing unique identifying information, and would be physically configured so as to make electrical or radio contact with a corresponding sensor on the core of the CHUMBY™ device upon its skin becoming attached to the device core. The information read from such embedded identifiers could be used to inform the control system of the CHUMBY™ device of the identity of the skin currently enveloping the core of the device. Certain of such skins could, for example, include characteristics or features suggestive of various applications (e.g., "clock radio", or "boom box") or intended operating environments (e.g., "car", "kitchen", "workshop"). In another embodiment, an identifier can be written into non-volatile storage integral to a "skin". When such "skin" is mated to the core, a wired connection is established between the non-volatile storage and the "core" in such a fashion that the identifier can be read directly from such.

Once a new skin has been attached or otherwise secured to the core of a CHUMBY™ device and the information from the embedded identifier has been read, the CHUMBY™ device may send a message to the service provider 106 indicative of its current skin (e.g., "skin #1"). In response, the service provider 106 may reply with a message instructing the CHUMBY™ device to utilize a particular profile (e.g., "profile #3"). It is contemplated that users may elect to define, via a Web browser 122 in communication with the service provider 106, profiles for each of their skins or simply utilize default profiles available from the service provider 106. Each profile could define, for example: (i) the widgets to be executed, (ii) the configuration to be used for executing the widgets, and (iii) the style and theme information (color schemes, control decorations, fonts, backgrounds, etc) utilized in presenting information via the LCD display 320.

CHUMBY™ Service Provider

Figure 7:
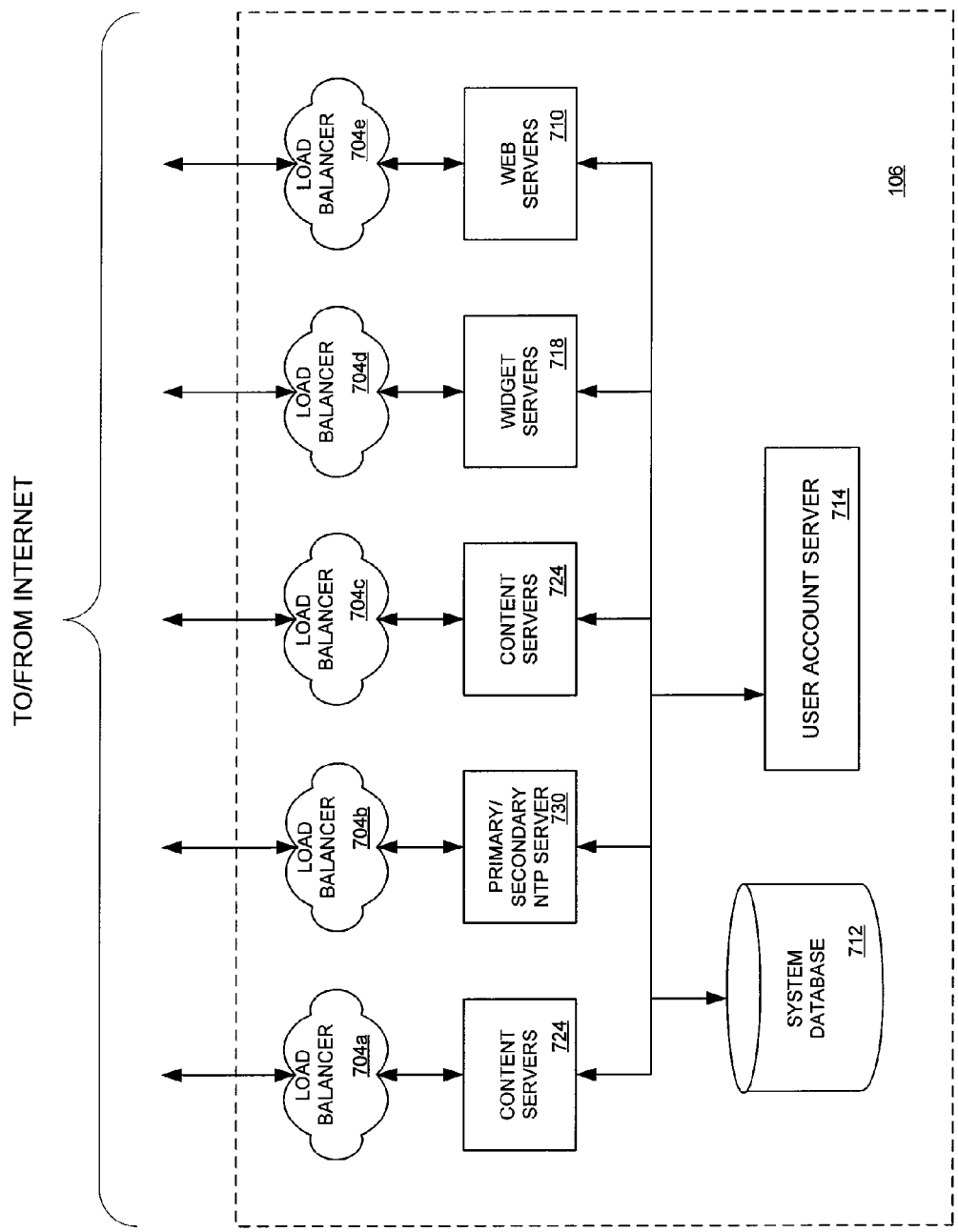
FIG. 7 provides a block diagrammatic representation of the server components and other infrastructure which may be utilized to facilitate the operations of a CHUMBY™ service provider.

Referring now to FIG. 7, a block diagrammatic representation is provided of the server components and other infrastructure which may be utilized to facilitate the operations of the CHUMBY™ service provider 106. It is understood that the representation of FIG. 7 is functional in nature, and single or multiple computers may be adapted to execute software designed to perform one or more than one of the functions described below. For example, the functionality provided by the load balancers 704 may be provided by a single load balancing device or multiple load balancing devices. Similarly, each of the servers represented in FIG. 7 may be realized using either a single server computer or using a cluster comprised of primary, secondary and backup server computers interconnected in configurations familiar to those skilled in the art.

As shown in FIG. 7, one or more Web servers 710 are used to define the Web interface presented by the CHUMBY™ service provider 106 to users or other interested parties. A system database 712 may include, among other things, CHUMBY™ user account information, CHUMBY™ device configuration information, CHUMBY™ widget configuration and instance information, marketing materials, press information, and contact information relating to the CHUMBY™ service that is served by the Web servers 710. Also included may be information relating to registration and first-level support.

A user account server 714 maintains user account data in the system database 712 and provides authentication services to the other servers depicted in FIG. 7.

One or more widget servers 718 are used to serve widgets to CHUMBY™ devices 102. Each widget server 718 will typically be sufficiently powerful to encrypt and sign widgets on demand. In addition, each server 718 will be configured to "store-and-forward" widgets being sent from one user to another.

The service provider 106 may also utilize a number of content servers 724 to provide information (e.g., new, weather, stock market information) to CHUMBY™ devices 102. In an exemplary embodiment all content servers function in a "pull" mode of operation; that is, CHUMBY™ device 102 polls the applicable content server 724 for new data on some periodic basis. Each response from a content server 724 preferably contains the schedule and frequency for subsequent polls. For example, a content server 724 disposed to provide stock market information can change the polling frequency to reflect whether or not the stock market is open. In other implementations a CHUMBY™ device 102 may be provided with the capability to change polling frequencies on the basis of, for example, environmental conditions (e.g., ambient room brightness) or other factors. One or more of the content servers 724 may be used for serving certain types of content uploaded by users for use on their own or other CHUMBY™ devices 102 and stored within the system database 712.

The CHUMBY™ service provider 106 will typically maintain a small number of load-balanced Network Time Protocol (NTP) servers 730 to provide time to CHUMBY™ devices 102. Each such server 730 will be configured to fetch their time from a "primary" NTP server, which fetches time from an upstream external public NTP server. If the primary NTP server 730 is inoperative, secondary NTP servers 730 will synchronize with a random selection of upstream servers. If all servers 730 are unavailable, a CHUMBY™ device 102 will either fetch time information from random public NTP servers or simply have its time adjusted via user input. In one embodiment each CHUMBY™ device 102 requests time upon connecting to the Internet and at jittered intervals thereafter, no more frequently than once a day.

Figure 8:
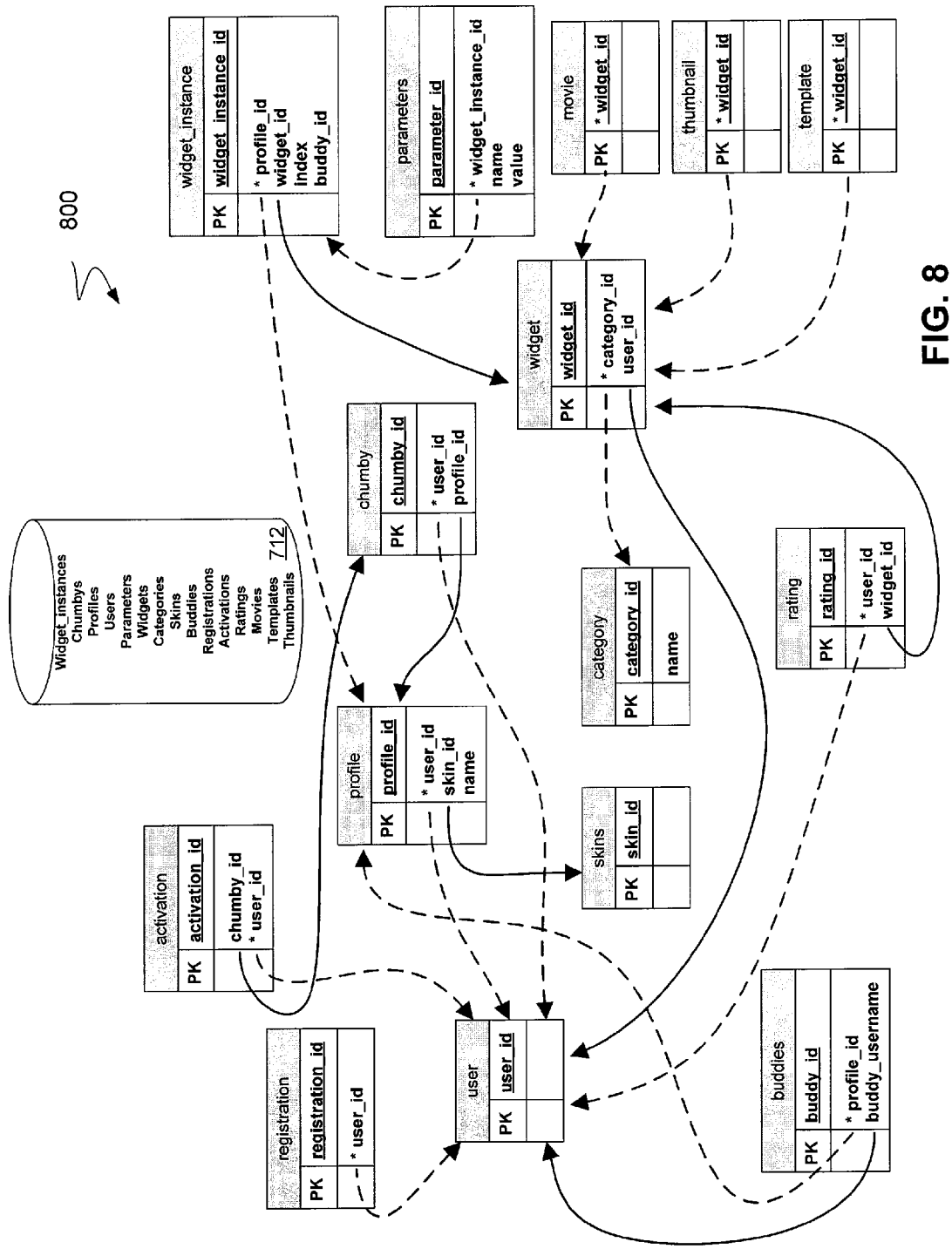
FIG. 8 provides a database model diagram of an exemplary object-oriented database schema utilized by a system database.

Turning now to FIG. 8, a database model diagram is provided of an exemplary object-oriented database schema 800 utilized by the system database 712. As shown, the schema 800 includes the following tables: buddies, categories, CHUMBY™ devices, parameters, profiles, skins, users, widget instance, widgets, ratings, registrations, activations, movies, templates, thumbnails. Each rectangular object in FIG. 8 is an entity object representation of a table in the database 712, with the primary key denoted with the acronym "PK"; ownership relationships indicated by dashed arrows which originate at the owned entity and terminate at the owning entity, and which are keyed by the asterisked column in the owned object; and solid arrows indicating a relationship between entities. Although the type of information contained within a number of these tables will be readily apparent to those skilled in the art in view of the discussion herein, a simplified example of various steps performed during user registration and the adding of a widget to a "profile" is provided in order to further illuminate the structure of the database schema 800.

In one embodiment the user registration and account creation process is initiated by a user through submission, via a Web browser 122, of a CHUMBY™ ID so as to identify a particular CHUMBY™ device 102. The act of creating a user account results in the construction of a default profile and one or more widget instances, each of which is automatically assigned to the CHUMBY™ device 102 (as identified by its CHUMBY™ ID) currently being registered. When a user adds a widget to the user's profile, the user is presented with a list of potential categories based upon information within the categories table. The user then selects a category from the categories table, and the user is presented with a list of widgets belonging to the chosen category. After the user chooses a widget, a widget instance is constructed and information is entered into the appropriate fields (e.g., profile id, widget id, index). The user is then presented a user interface via the Web browser 122 for editing the widget-specific parameters associated with the selected widget. In response to the user's parameter selections, records are appropriately updated in the parameters table.

FIGS. 36A-36H provide a more comprehensive tabular representation of an exemplary object-oriented database schema capable of being utilized by the system database 712.

System Operation

Client-Server Communication Protocol

In general, it is contemplated that embodiments of the invention will be implemented such that each CHUMBY™ device 102 will function as a client relative to various servers existing within the CHUMBY™ service provider 106. In these embodiments the CHUMBY™ devices 102 do not engage in direct communication with each other, but may do so via independent client-sever relationships established with the service provider 106. In this way the service provider 106 may facilitate the communication of a variety of different types of executable files (e.g., widgets or other computer programs, audio clips, short "Flash" movies, etc.) among CHUMBY™ devices 102, subject to the permission of the content owner and potential recipient. A user may designate that a widget or other content be sent to another user, or to the members of a user's "buddy list" or the like. This designation may be made via a Web browser 122 in communication with the service provider 106, or directly through the interface of the user's CHUMBY™ device 102.

In one embodiment executable files may be created by users of CHUMBY™ devices 102 or other third parties and loaded within the system database 712 after being approved by the entity operating the service provider 106. Once a widget or other executable file has been created and stored within the system database 712, it is made available for use by all those users of CHUMBY™ devices 102 that have been granted the requisite permission. Various schemes for granting permissions among and between users are possible. For example, one such type of permission could entail that any user X that is given permission by a user Y to send widgets to user Y's CHUMBY™ device may select any widget for which user X has usage rights and "send" such widget to user Y's CHUMBY™ device. Other restrictions could be placed on the transferability of widgets or other files from the service provider 106 to a CHUMBY™ device at the request of another user. For example, a user could be provided with the capability to "lock" certain widgets on only the user's CHUMBY™ device, or a CHUMBY™ device could reach a "full" state and advertise itself as being incapable of receiving any additional widgets.

Although widgets and other executable files could be transferred between the service provider 106 and CHUMBY™ devices 102 in a number of different formats, in one embodiment such transfers will occur in the Flash movie format (i.e., as .swf files, when not signed or encrypted). In this case the process for downloading widgets from the service provider 106 includes receiving a notification at a CHUMBY™ device 102 that a "new" widget is ready for downloading. Since in the exemplary embodiment each CHUMBY™ device 102 acts in a "pull" mode, each device 102 periodically polls the service provider and inquires as to whether any configuration changes are available to load. In the case in which a new widget is available for downloading, the CHUMBY™ device 102 will generally use standard HTTP (or HTTPS) protocols in downloading the applicable widget file.

Attention is now directed to FIGS. 9-13, which are a series of signal flow diagrams representative of the client-server communication protocol established between a CHUMBY™ device 102 and the CHUMBY™ service provider 106. As mentioned above, each CHUMBY™ device 102 functions as a client relative to the CHUMBY™ service provider 106. In one embodiment the basic protocol established between each CHUMBY™ device and the corresponding server entity of the CHUMBY™ service provider 106 may be characterized as XML using a Representational State Transfer (REST) architecture transmitted using HTTP. In general, the CHUMBY™ device 102 issues periodic HTTP GET or POST requests and the service provider 106 responds with a block of XML. The CHUMBY™ device 102 will use HTTP GET for relatively simple requests, and POST for more complex requests, which will be in encapsulated in XML. Individual data elements are uniquely identified by Global Unique Identifiers (GUID). In one embodiment, there will be some form of cryptographic key exchange and transactions will be encrypted using those keys. Furthermore, XML may be compressed in order to facilitate transfer between the CHUMBY™ device 102 and the CHUMBY™ service provider 106.

Each CHUMBY™ device 102 will have a unique GUID. In some embodiments, time codes will be represented in ISO-8061 format.

Requesting a CHUMBY™ Configuration

Figure 9:
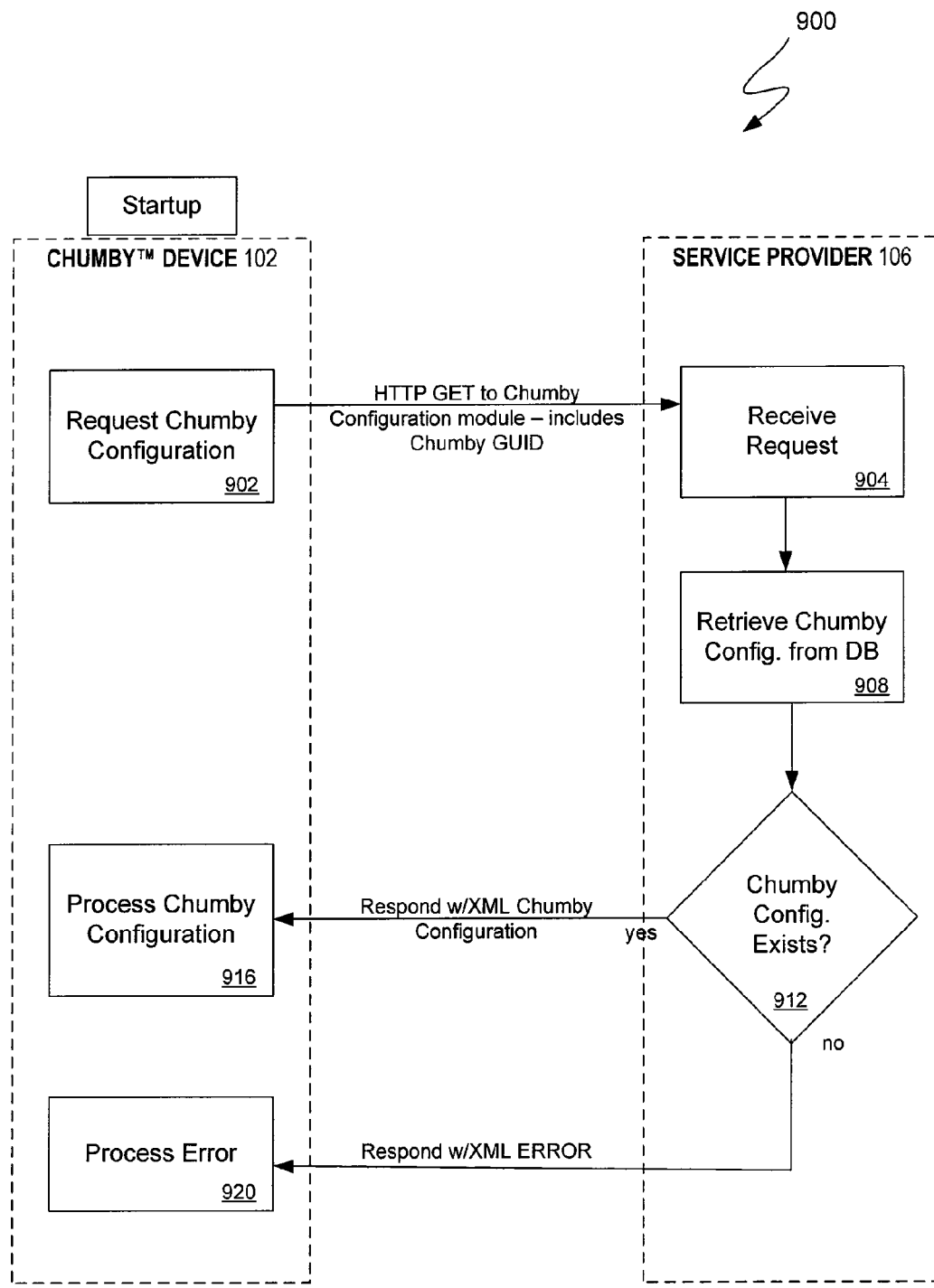
FIG. 9 is a signal flow diagram representative of one manner in which a configuration is provided to a CHUMBY™ device by a service provider.

Referring to FIG. 9, a signal flow diagram 900 illustratively represents one manner in which a "CHUMBY™ configuration" is provided to a CHUMBY™ device 102 by the service provider 106. In one embodiment each CHUMBY™ device 102 operates in accordance with a configuration, which specifies the profile to be loaded by the CHUMBY™ device 102 under various conditions. The user specifies the profile for the CHUMBY™ device 102 via a web interface at the CHUMBY™ web site. The profile contains several operational parameters for the CHUMBY™ device 102.

As shown in FIG. 9, the requesting of a configuration is initiated when the CHUMBY™ device 102 sends an HTTP GET request containing the GUID of the requested configuration to a CHUMBY™ configuration object within the system database 712 maintained by the service provider 106 (stage 902). An example of such a request is provided below:

http://server.chumby.com/xml/chumbies/CB6A8A20-DFB8-11DA-98FA-00306555C864

The service provider 106 receives the request (stage 904), and retrieves the requested configuration from the system database 712 (stage 908). If the requested configuration exists, the service provider responds with an XML-based configuration; if not, the service provider 106 responds with an XML-based error message (stage 912). An exemplary XML-based response generated by the service provider 106 is given below:

<?xml version="1.0" encoding="UTF-8"?>
<chumby id="CB6A8A20-DFB8-11DA-98FA-00306555C864">
<name>Bathroom</name>
<profile href="/xml/profiles/00000000-0000-0000-0000-000000000001" name="Default" id="00000000-0000-0000-0000-000000000001"/>
<user username="Frank" href="/xml/users/00000000-0000-0000-0000-000000000001" id="00000000-0000-0000-0000-000000000001"/>
</chumby>

Once the response is received by the CHUMBY™ device 102, it is processed by the Master Controller (stage 916). If an error is instead received, it is processed by the Master Controller as well (stage 920).

Requesting a Profile

Figure 10:
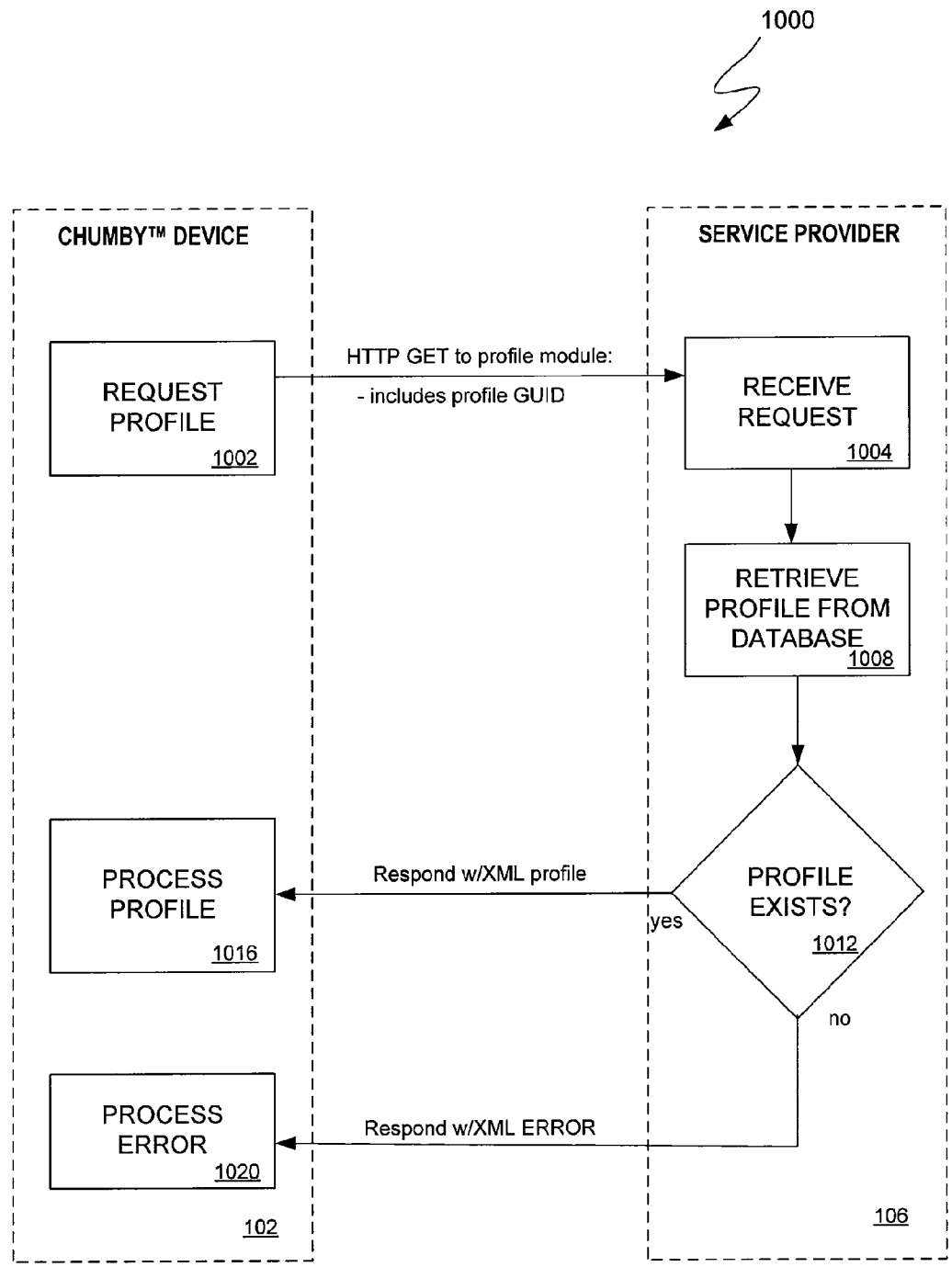
FIG. 10 is a signal flow diagram which represents one manner in which a profile is provided to a CHUMBY™ device by a service provider.

Referring to FIG. 10, a signal flow diagram 1000 illustratively represents one manner in which a "profile" is provided to a CHUMBY™ device 102 by the service provider 106. In one embodiment each CHUMBY™ device 102 operates in accordance with a profile, which specifies the set of widgets to be executed by the CHUMBY™ device 102 under various conditions. This enables a user to specify that a certain subset of the available set of widgets is to be instantiated and utilized during a particular time frame, based upon the location of the user's CHUMBY™ device 102 or the skin (or housing) within which the CHUMBY™ device 102 is currently seated. For instance, the user may desire that local weather and traffic information be provided while the user is located at home, but would prefer that airline flight information be available from the CHUMBY™ device 102 when the user is traveling.

As shown in FIG. 10, the requesting of a profile is initiated when the CHUMBY™ device 102 sends an HTTP GET request containing the GUID of the requested profile to a profile object within the system database 712 maintained by the service provider 106 (stage 1002). An example of such a request is provided below:

http://server.chumby.com/xml/profiles/00000000-0000-0000-0000-000000000001

The service provider 106 receives the request (stage 1004), and retrieves the requested profile from the system database 712 (stage 1008). If the requested profile exists, the service provider responds with an XML-based profile; if not, the service provider 106 responds with an XML-based error message (stage 1012). An exemplary XML-based response generated by the service provider 106 is given below:

```
<?xml version="1.0" encoding="UTF-8"?>
<profile id="00000000-0000-0000-0000-000000000001">
  <name>Default</name>
  <description>Default profile for your Chumby</description>
  <user username="chumby" href="/xml/users/00000000-0000-0000-0000-000000000001" id="00000000-0000-0000-0000-000000000001"/>
  <skin href="/xml/skins/00000000-0000-0000-0000-000000000001" name="Standard" id="00000000-0000-0000-0000-000000000001"/>
  <access access="private" id="EC667B90-EC41-11DA-8774-00306555C864"/>
  <widget_instances>
    <widget_instance href="/xml/widgetinstances/B2BE8552-E7F2-11DA-B4BD-00306555C864" id="B2BE8552-E7F2-11DA-B4BD-00306555C864"/>
    <widget_instance href="/xml/widgetinstances/033BFBC2-E794-11DA-B4BD-00306555C864" id="033BFBC2-E794-11DA-B4BD-00306555C864"/>
    <widget_instance href="/xml/widgetinstances/94177E18-E777-11DA-B4BD-00306555C864" id="94177E18-E777-11DA-B4BD-00306555C864"/>
    <widget_instance href="/xml/widgetinstances/9AA50336-E777-11DA-B4BD-00306555C864" id="9AA50336-E777-11DA-B4BD-00306555C864"/>
    <widget_instance href="/xml/widgetinstances/9E4647F2-E777-11DA-B4BD-00306555C864" id="9E4647F2-E777-11DA-B4BD-00306555C864"/>
    <widget_instance href="/xml/widgetinstances/7AC67832-E77D-11DA-B4BD-00306555C864" id="7AC67832-E77D-11DA-B4BD-00306555C864"/>
    <widget_instance href="/xml/widgetinstances/B4C35F06-E777-11DA-B4BD-00306555C864" id="B4C35F06-E777-11DA-B4BD-00306555C864"/>
    <widget_instance href="/xml/widgetinstances/5D81823A-E77D-11DA-B4BD-00306555C864" id="5D81823A-E77D-11DA-B4BD-00306555C864"/>
  </widget_instances>
  <buddies_of>
    <buddy profile="A9BF0AC6-07DB-11DC-A700-0017F2D98B02" name="fredgarvin" profilename="Default" id="9790F788-07DB-11DC-A700-0017F2D98B02"/>
  </buddies_of>
</profile>
```

Once the response is received by the CHUMBY™ device 102, it is processed by the Master Controller (stage 916). If an error is instead received, it is processed by the Master Controller as well (stage 920).

Each Profile has a name, a description, a skin, and a list of "Widget Instances". The Profile will be periodically refetched in order to reflect changes made by the owner, for instance, adding and removing Widget Instances. The Profile may also contain a "buddies_of" node, which contains information about users and profiles that have indicated the owner of the Profile to be a "buddy" in order to facilitate the sending of widget instances.

The CHUMBY™ device 102 processes each Widget Instance in turn, fetching the settings for each widget, and the Widget itself, and displays the Widget with the settings encapsulated by the Widget Instance.

A process similar to that described with reference to FIG. 9 may be used to change a profile. An example of an HTTP POST containing an the GUID of the profile to modify and an XML-based request to change a profile generated by the CHUMBY™ device 102 is given below:

http://server.chumby.com/xml/profiles/00000000-0000-0000-0000-000000000001

```
<?xml version="1.0" encoding="UTF-8"?>
<profile id="00000000-0000-0000-0000-000000000001">
  <name>Default</name>
  <description>Default profile for your Chumby</description>
  <user username="chumby" href="/xml/users/00000000-0000-0000-0000-000000000001" id="00000000-0000-0000-0000-000000000001"/>
  <skin href="/xml/skins/00000000-0000-0000-0000-000000000001" name="Standard" id="00000000-0000-0000-0000-000000000001"/>
  <access access="private" id="EC667B90-EC41-11DA-8774-00306555C864"/>
  <widget_instances>
    <widget_instance href="/xml/widgetinstances/B2BE8552-E7F2-11DA-B4BD-00306555C864" id="B2BE8552-E7F2-11DA-B4BD-00306555C864"/>
    <widget_instance href="/xml/widgetinstances/033BFBC2-E794-11DA-B4BD-00306555C864" id="033BFBC2-E794-11DA-B4BD-00306555C864"/>
    <widget_instance href="/xml/widgetinstances/94177E18-E777-11DA-B4BD-00306555C864" id="94177E18-E777-11DA-B4BD-00306555C864"/>
    <widget_instance href="/xml/widgetinstances/9AA50336-E777-11DA-B4BD-00306555C864" id="9AA50336-E777-11DA-B4BD-00306555C864"/>
    <widget_instance href="/xml/widgetinstances/9E4647F2-E777-11DA-B4BD-00306555C864" id="9E4647F2-E777-11DA-B4BD-00306555C864"/>
    <widget_instance href="/xml/widgetinstances/7AC67832-E77D-11DA-B4BD-00306555C864" id="7AC67832-E77D-11DA-B4BD-00306555C864"/>
    <widget_instance href="/xml/widgetinstances/B4C35F06-E777-11DA-B4BD-00306555C864" id="B4C35F06-E777-11DA-B4BD-
```

```
            <widget_instance         href="/xml/widgetinstances/
                10A66395-8500-215E-81F0-003256F98257"
                id="10A66395-8500-215E-81F0-003256F98257"/>
        </widget_instances>
    </profile>
```
An exemplary XML-based response corresponding to such a request which contains the updated profile could be provided by the service provider 106 as follows:

```
    <?xml version="1.0" encoding="UTF-8"?>
    <profile          id="00000000-0000-0000-0000-
000000000001">
        <name>Default</name>
        <description>Default profile for your Chumby</description>
        <user username="chumby" href="/xml/users/00000000-
            0000-0000-0000-000000000001"      id="00000000-
            0000-0000-0000-000000000001"/>
        <skin      href="/xml/skins/00000000-0000-0000-0000-
            000000000001"    name="Standard"    id="00000000-
            0000-0000-0000-000000000001"/>
        <access access="private" id="EC667B90-EC41-11DA-
            8774-00306555C864"/>
        <widget_instances>
            <widget_instance         href="/xml/widgetinstances/
                B2BE8552-E7F2-11DA-B4BD-00306555C864"
                id="B2BE8552-E7F2-11DA-B4BD-
                00306555C864"/>
            <widget_instance         href="/xml/widgetinstances/
                033BFBC2-E794-11DA-B4BD-00306555C864"
                id="033BFBC2-E794-11DA-B4BD-
                00306555C864"/>
            <widget_instance         href="/xml/widgetinstances/
                94177E18-E777-11DA-B4BD-00306555C864"
                id="94177E18-E777-11DA-B4BD-
                00306555C864"/>
            <widget_instance         href="/xml/widgetinstances/
                9AA50336-E777-11DA-B4BD-00306555C864"
                id="9AA50336-E777-11DA-B4BD-
                00306555C864"/>
            <widget_instance         href="/xml/widgetinstances/
                9E4647F2-E777-11DA-B4BD-00306555C864"
                id="9E4647F2-E777-11DA-B4BD-
                003065550864"/>
            <widget_instance         href="/xml/widgetinstances/
                7AC67832-E77D-11DA-B4BD-00306555C864"
                id="7AC67832-E77D-11DA-B4BD-
                00306555C864"/>
            <widget_instance         href="/xml/widgetinstances/
                B4C35F06-E777-11DA-B4BD-00306555C864"
                id="B4C35F06-E777-11DA-B4BD-
                00306555C864"/>
            <widget_instance         href="/xml/widgetinstances/
                10A66395-8500-215E-81F0-003256F98257"
                id="10A66395-8500-215E-81F0-003256F98257"/>
        </widget_instances>
    </profile>
```

Widget Instance Upload/Download

Figure 11:
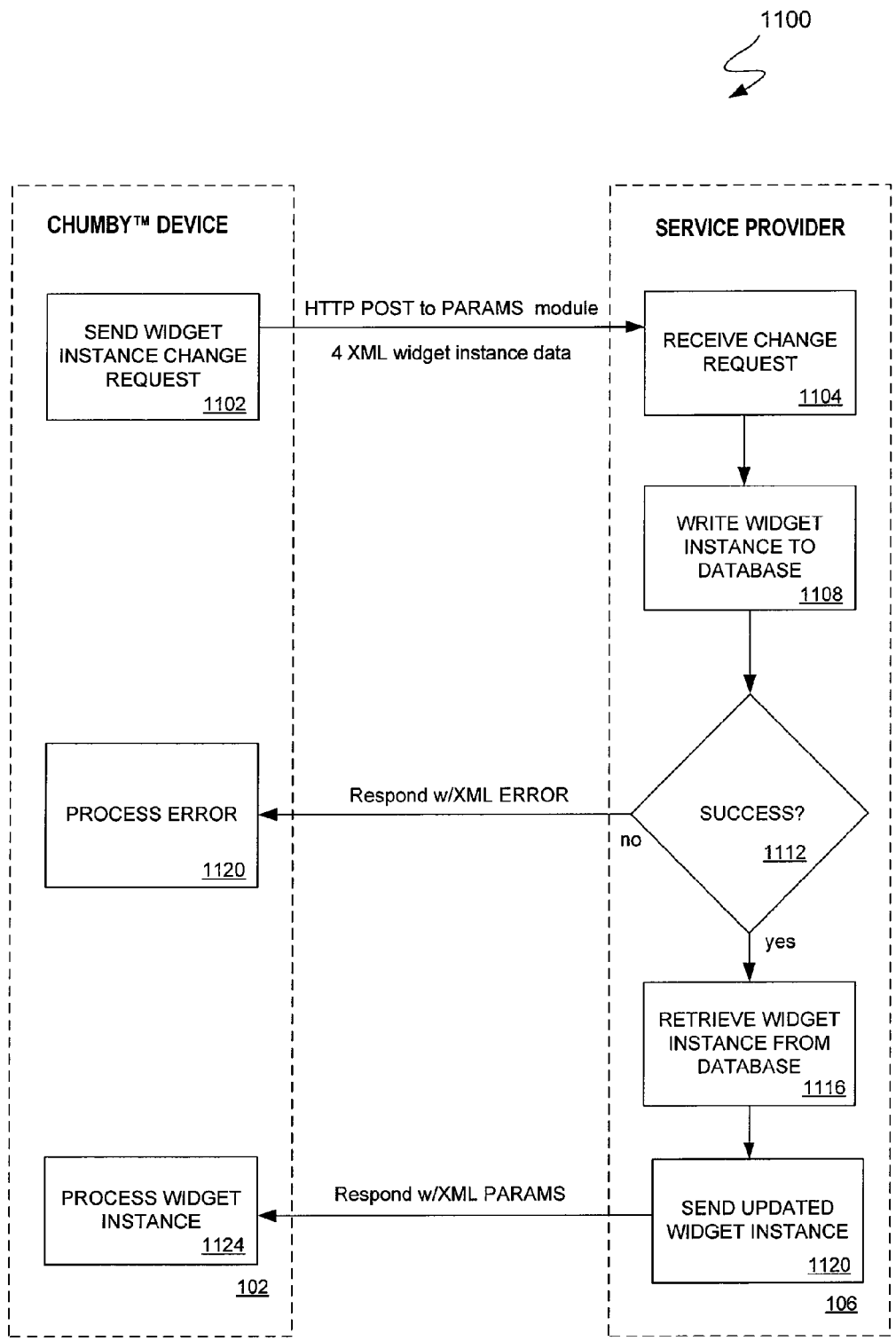
FIG. 11 is a signal flow diagram which depicts processing of changes made to the parameters of a widget instance through the interface of a CHUMBY™ device in which the widget is instantiated.
Figure 12:
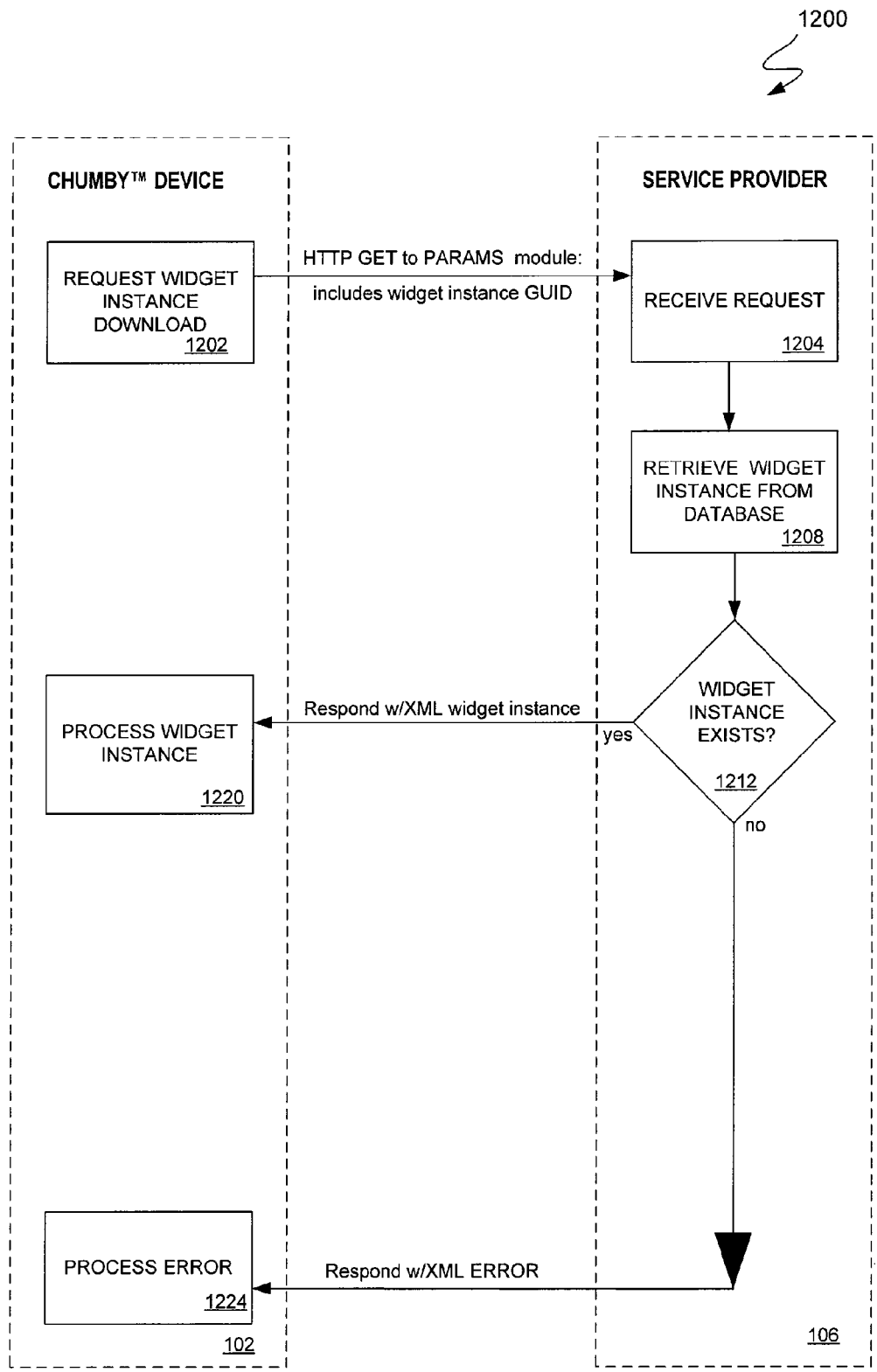
FIG. 12 shows a signal flow diagram illustrating an exemplary widget instance download operation in which a service provider is requested to push values of widget-specific parameters to a requesting CHUMBY™ device.

Turning now to FIGS. 11-12, there are shown signal flow diagrams representative of the communication of widget instance information from the CHUMBY™ device 102 to the service provider 106, and vice-versa. In one embodiment the set of parameters associated with a widget instance determine the user-specified manner in which the behavior of the widget is modified when executed by a CHUMBY™ device 102. That is, the parameters fetched by the CHUMBY™ device 102 from the service provider 106 for a given widget constitute the user's "customized" settings, rather than dynamic content. For example, in the case of a "stock ticker" widget the applicable parameters could comprise the names and symbols of the stocks within the user's portfolios, but would not define or relate to the current prices of the stocks (which would be furnished by another service supplied by the service provider 106).

FIG. 11 is a signal flow diagram which depicts processing of changes made to the parameters of a widget instance through the interface of the CHUMBY™ device 102 in which the widget is instantiated. Examples of parameter changes could include changing a location of interest in the case of a "weather" widget, or adding/removing stock ticker symbols in the case of a "stock market" widget. In the exemplary embodiment it is not necessary for the user to set or otherwise modify all parameters of a given widget, and the service provider 106 will effectively "expand" the parameter change data into a full parameter record once received. For instance, a zip code could be sufficient to uniquely identify a location in the case of a weather widget, and the associated city, state, etc. could be supplied to the applicable record during processing of the parameter change request by the service provider 106.

As shown, the widget instance change operation is initiated when the CHUMBY™ device 102 sends an HTTP POST and an XML request to a widget instance object within the system database 712 maintained by the service provider 106 (stage 1102). This type of "UPLOAD" operation informs the service 106 that the parameters of a specific widget instance have been updated by the applicable user. As shown, the updated parameters are received by the service provider (stage 1104), and are attempted to be written to a corresponding widget instance object within the system database 712 (stage 1108). If this attempted write operation is unsuccessful (stage 1112), the service provider 106 responds with an error message that is processed by the requesting CHUMBY™ device 102 (stage 1120). If the write operation is successful, the newly updated widget instance are retrieved from the system database 712 (stage 1116) and sent to the applicable CHUMBY™ device 102 (stage 1120).

Once received, the widget instance is processed by the CHUMBY™ device 102 (stage 1124). In general, the processing of the parameters contained in a widget instance are dependent upon the characteristics of the particular widget. In certain cases the parameters may be sufficient to enable the widget to display information, while other widgets may use the parameters to fetch content from another service. As an example of the former, consider a "clock" widget capable of displaying information following receipt of a parameter indicating a time zone. In contrast, a "stock widget" may have stock symbols as parameters and use such symbols to fetch quote information.

Referring now to FIG. 12, there is shown a signal flow diagram illustrating an exemplary widget instance download operation in which the service provider 106 is requested to push values of widget-specific parameters to a requesting CHUMBY™ device 102. The requesting of a parameter download is initiated when the CHUMBY™ device 102 sends an HTTP GET containing the GUID of the requested widget instance request to a parameter object within the system database 712 maintained by the service provider 106 (stage 1202). An example of such a request in the case of a "weather" widget is provided below:

http://server.chumby.com/xml/widgetinstances/ 5D81823A-E77D-11DA-B4BD-00306555C864

The service provider 106 receives the request (stage 1204), and retrieves the requested parameters from the system database 712 (stage 1208). If the requested parameters exist, the service provider 106 responds with an XML-based widget instance message (stage 1212). Using the example of a weather widget, which utilizes a zip code to identify the location for which weather is to be retrieved, such a message could comprise:

```
<?xml version="1.0" encoding="UTF-8"?>
<widget_instance id="5D81823A-E77D-11DA-B4BD-
    00306555C864">
    <widget href="/xml/widgets/BF4CE814-DFB8-11DA-
        9C82-00306555C864" id="BF4CE814-DFB8-11DA-
        9C82-00306555C864"/>
    <profile href="/xml/profiles/00000000-0000-0000-0000-
        000000000001" id="00000000-0000-0000-0000-
        000000000001"/>
    <access access="private"/>
    <mode time="10" mode="timeout"/>
    <received buddy="9790F788-07 DB-11DC-A700-
        0017F2D98B02" forward="true" accepted="false"/>
    <widget_parameters>
        <widget_parameter id="BF4CE814-DFB8-11DA-
            9C82-00306643C864">
            <name>ZipCode</name>
            <value>92037</name>
        </widget_parameter>
    </widget_parameters>
</widget_instance>
```

The CHUMBY™ device 102 uses the GUID in the "widget" tag to fetch the information about the Widget to be displayed. Once the widget has been started, it is passed the name/value pairs in the "widget parameters" section, in order to customize the behavior of the widget. The "mode" tag indicates how long the widget is to be played. A value of "default" in the mode attribute indicates that the timing will be specified by the widget description, an attribute value of "timeout" will use the duration specified in the "time" attribute (in seconds), and the value of "cooperative" will display the widget until the user explicitly commands it to stop through a UI element, or the widget itself indicates that it wishes to discontinue operation. The presence of a "received" node indicates that the widget instance has been "sent" by a buddy. The value of the "accepted" attribute indicates whether or not the widget instance has been accepted by the recipient, which is done either through the web interface or through the UI of the device. The "forward" attribute indicates whether this widget instance can be sent on to another user.

If the requested parameters do not exist, a default widget instance is attempted to be retrieved from the system database 712 (stage 1224). If such a widget instance exists (stage 1228), the service provider 106 responds with an XML-based parameters message that is processed by the CHUMBY™ device 102 upon receipt (stage 1220). If such a default widget instance does not exist, an error message is returned to the CHUMBY™ device 102 (stage 1232).

Downloading a Widget

Figure 27:
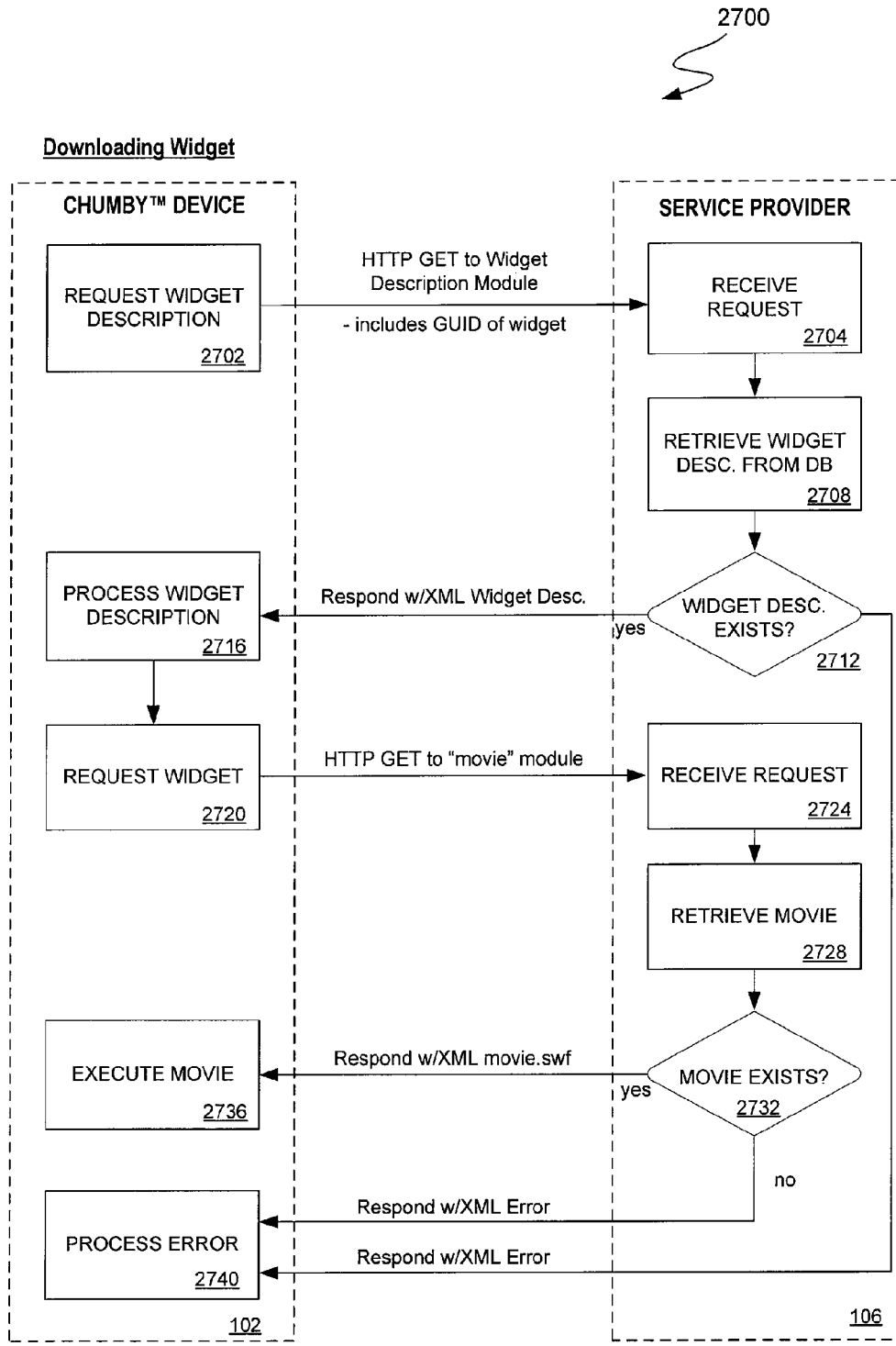
FIG. 27 is a signal flow diagram which illustratively represents the process of downloading the code for a widget from a service provider.

Referring now to FIG. 27, a signal flow diagram 2700 is provided which illustratively represents the process of downloading the code for a widget (e.g., a .swf file) from the service provider 106 for execution on a CHUMBY™ device 102. The process is initiated when the CHUMBY™ device 102 sends an HTTP GET request containing the GUID of the requested widget to a specific widget description object within the system database 712 maintained by the service provider 106 (stage 1302). An example of such a request is provided below:

http://server.chumby.com/xml/widgets/BF4CE814-DFB8-11DA-9C82-00306555C864

The service provider 106 receives the request (stage 2704), and attempts to retrieve the requested widget description from the system database 712 or other data source available to the service provider 106 (stage 2708). If the requested widget description is able to be retrieved, the service provider 106 responds with an XML-based widget description message; if not, the service provider 106 responds with an XML-based error message (stage 2712). An exemplary XML-based response generated by the service provider 106 is given below:

```
<?xml version="1.0" encoding="UTF-8"?>
<widget id="BF4CE814-DFB8-11DA-9C82-
    00306555C864">
    <name>Time Zones</name>
    <description>A time zone selector</description>
    <version>1.0</version>
    <protection protection="none"/>
    <mode time="15" mode="default"/>
    <access sendable="true" deleteable="true"
        access="public" virtualable="true"/>
    <user username="chumby" href="/xml/users/00000000-
        0000-0000-0000-000000000001" id="00000000-
        0000-0000-0000-000000000001"/>
    <category href="/xml/categories/00000000-0000-0000-
        0000-000000000001" name="Chumby"
        id="00000000-0000-0000-0000-000000000001"
    <thumbnail contenttype="image/jpeg" href="/xml/
        thumbnails/BF4CE814-DFB8-11DA-9C82-
        00306555C864"/>
    <template contenttype="text/xml" href="/xml/templates/
        BF4CE814-DFB8-11DA-9C82-00306555C864"/>
    <movie contenttype="application/x-shockwave-flash"
        href="/xml/movies/BF4CE814-DFB8-11DA-9C82-
        00306555C864"/>
    <rating count="0" rating="0.0"/>
</widget>
```

Once the requested widget description is received by the CHUMBY™ device 102, the CHUMBY™ device 102 uses the URL referencing the "movie" for the requested widget to download the movie (e.g., .swf) file from the service provider 106. The CHUMBY™ device 102 sends an HTTP GET request containing the GUID of the requested movie to a specific movie object within the system database 712 maintained by the service provider 106 (stage 1320). An example of such a request is provided below:

http://server.chumby.com/xml/movies/BF4CE814-DFB8-11DA-9C82-00306555C864

The service provider 106 receives the request (stage 2724), and attempts to retrieve the requested movie from the system database 712 or other data source available to the service provider 106 (stage 2728). If the requested movie is able to be retrieved, the service provider 106 responds with the .swf file which implements the movie; if not, the service provider 106 responds with an XML-based error message (stage 2732). Once the requested movie is received by the CHUMBY™ device 102, it is loaded by the Master Controller and queued for subsequent execution (stage 2736). If an error is instead received, it is processed accordingly (stage 2740).

Requesting Content

Figure 13:
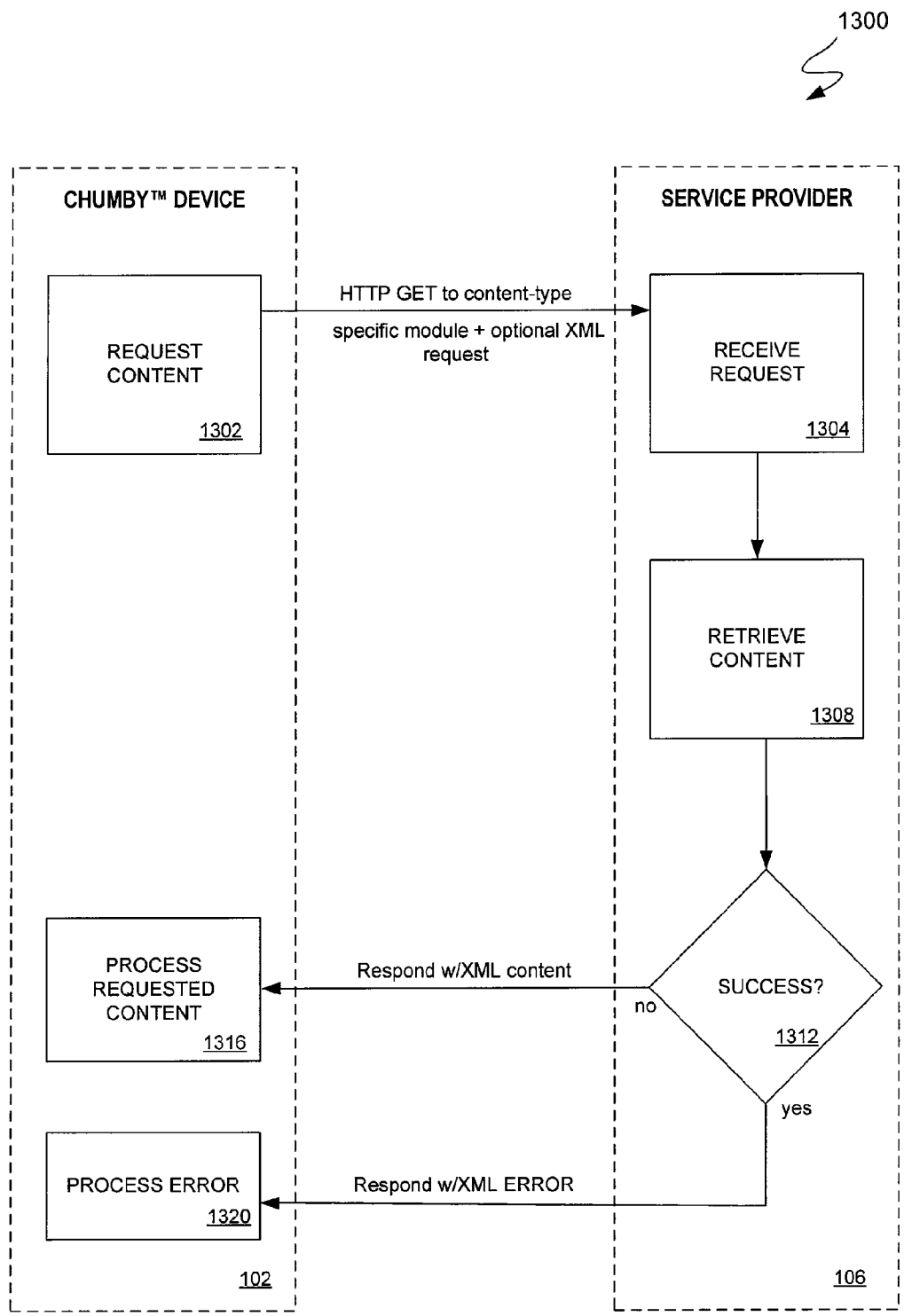
FIG. 13 is a signal flow diagram which illustratively represents the process of obtaining content from the service provider for a widget of a CHUMBY™ device.

Referring now to FIG. 13, a signal flow diagram 1300 is provided which illustratively represents the process of obtaining content from the service provider 106 for a widget of a CHUMBY™ device 102. The process is initiated when the CHUMBY™ device 102 sends an HTTP GET and an optional XML request to a specific content object within the system database 712 maintained by the service provider 106

(stage 1302). An example of such a request for content for a "tide" widget is provided below:
http://content.chumby.com/tides/United%20States/
National%20City%2C%20San%20Diego%20Bay%2C%20California The service provider 106 receives the request (stage 1304), and attempts to retrieve the requested content from the system database 712, internal content service, external content service or other data source available to the service provider 106 (stage 1308). If the requested content is able to be retrieved, the service provider 106 responds with an XML-based content message; if not, the service provider 106 responds with an XML-based error message (stage 1312). Once the requested content is received by the CHUMBY™ device 102, corresponding audiovisual output is generated by the device 102 for the benefit of its user (stage 1316). If an error is instead received, it is processed accordingly (stage 1320). An exemplary XML-based response generated by the service provider 106 is given below:

```
<tideitems>
  <tideitem timestamp="2006-05-31T00:39:11Z">
    <location>
      <locationstring string="National City, San Diego Bay, California"/>
      <station id="National City, San Diego Bay"/>
      <state name="California"/>
      <country name="United States"/>
      <coordinates lat="32.6667Â° N", lon="117.1167Â° W"/>
    </location>
    <tides>
      <tide dateTime='2006-05-31T12:44:00Z', tidedescription="Low Tide", tidelevel="0.85 meters"/>
      <tide dateTime='2006-05-31T02:50:00Z', tidedescription="Sunset"/>
      <tide dateTime='2006-05-31T06:30:00Z', tidedescription="Moonset"/>
      <tide dateTime='2006-05-31T06:56:00Z', tidedescription="High Tide", tidelevel="1.80 meters"/>
      <tide dateTime='2006-05-31T24:41:00Z', tidedescription="Sunrise"/>
      <tide dateTime='2006-05-31T14:46:00Z', tidedescription="Low Tide", tidelevel="-0.13 meters"/>
      <tide dateTime='2006-05-31T16:38:00Z', tidedescription="Moonrise"/>
      <tide dateTime='2006-05-31T21:55:00Z', tidedescription="High Tide", tidelevel="1.14 meters"/>
      <tide dateTime='2006-06-01T01:38:00Z', tidedescription="Low Tide", tidelevel="0.92 meters"/>
      <tide dateTime='2006-06-01T02:50:00Z', tidedescription="Sunset"/>
      <tide dateTime='2006-06-01T07:06:00Z', tidedescription="Moonset"/>
      <tide dateTime='2006-06-01T07:41:00Z', tidedescription="High Tide", tidelevel="1.64 meters"/>
      <tide dateTime='2006-06-01124:41:00Z', tidedescription="Sunrise"/>
      <tide dateTime='2006-06-01T15:37:00Z', tidedescription="Low Tide", tidelevel="-0.01 meters"/>
      <tide dateTime='2006-06-01T17:38:00Z', tidedescription="Moonrise"/>
      <tide dateTime='2006-06-01T22:59:00Z', tidedescription="High Tide", tidelevel="1.18 meters"/>
      <tide dateTime='2006-06-02T02:51:00Z', tidedescription="Sunset"/>
      <tide dateTime='2006-06-02T02:58:00Z', tidedescription="Low Tide", tidelevel="0.96 meters"/>
      <tide dateTime='2006-06-02T07:37:00Z', tidedescription="Moonset"/>
      <tide dateTime='2006-06-02T08:35:00Z', tidedescription="High Tide", tidelevel="1.47 meters"/>
      <tide dateTime='2006-06-02T24:41:00Z', tidedescription="Sunrise"/>
      <tide dateTime='2006-06-02T16:28:00Z', tidedescription="Low Tide", tidelevel="0.09 meters"/>
      <tide dateTime='2006-06-02T18:35:00Z', tidedescription="Moonrise"/>
      <tide dateTime='2006-06-02T23:51:00Z', tidedescription="High Tide", tidelevel="1.26 meters"/>
      <tide dateTime='2006-06-03T02:51:00Z', tidedescription="Sunset"/>
      <tide dateTime=2006-06-03T04:44:00E, tidedescription="Low Tide", tidelevel="0.93 meters"/>
      <tide dateTime='2006-06-03T08:04:00Z', tidedescription="Moonset"/>
      <tide dateTime='2006-06-03T09:46:00Z', tidedescription="High Tide", tidelevel="1.31 meters"/>
      <tide dateTime='2006-06-03T24:41:00Z', tidedescription="Sunrise"/>
      <tide dateTime='2006-06-03T17:17:00Z', tidedescription="Low Tide", tidelevel="0.19 meters"/>
      <tide dateTime='2006-06-03T19:31:00Z', tidedescription="Moonrise"/>
      <tide dateTime='2006-06-03T23:06:00Z', tidedescription="First Quarter"/>
      <tide dateTime='2006-06-04T12:30:00Z', tidedescription="High Tide", tidelevel="1.35 meters"/>
    </tides>
  </tideitem>
</tideitems>
```

In the case where content is retrieved directly from an external content service provider (i.e., from other than the service provider 106), a series of web-based transactions (most likely HTTP and/or XML-based) defined by such content service provider will take place between the CHUMBY™ device 102 and such provider.

CHUMBY™ Security Protocol

CHUMBY™ devices 102 may optionally include a hardware security module, which in one implementation is accessed via a character driver interface in the operating system ("OS") of the device 102. The module may or may not be installed. When the module is not installed, the OS preferably virtualizes the hardware security module by emulating it in software. While losing all the tamper-resistance benefits of a hardware module, this feature enables cost reduction savings while maintaining protocol interoperability with a secured system.

The hardware security module of a CHUMBY™ device 102 may be implemented in a number of ways. As an example, the hardware security module may be implemented using a monolithic security processor or a cryptographic Smart Card module. This module, or its emulated counterpart, is capable of at a minimum, the following operations: (1) storage of secret numbers in hardware; (2) the ability to compute public-key signatures; (3) the ability to compute one-way cryptographic hashes; and (4) the ability to generate trusted random numbers.

During the manufacturing process the hardware security module, or its emulated counterpart, is initialized with a set of secret numbers that are only known to the module and to the CHUMBY™ service provider 106. These secret numbers may or may not consist of public and private keys. If the numbers consist of public and private keys, then a mutual key-pair is stored by both the CHUMBY™ service provider 106 and the hardware module, along with a putative, insecure identifier number for the pair. Furthermore, these numbers are preferably not recorded by the CHUMBY™ service provider 106 in association with any other identifying information, such as the MAC address for the WLAN interface, or any other serial numbers that are stored in insecure memory for customer service purposes.

When the user or service wishes to initiate a strong authenticated transaction, the CHUMBY™ device 102 sends the putative insecure key-pair identifier to the service provider 106. The service provider 106 looks up the putative insecure key-pair identifier and issues a challenge to the hardware module, consisting of a random number In particular, the challenge is packetized and sent through the Internet to the CHUMBY™ device 102. The device 102 unpacks the challenge and passes it directly to the hardware module. The hardware module adds another random number to the packet and signs the pair of numbers, along with other transaction information (such as the version number of the protocol) with a private key that is only known to the CHUMBY cryptoprocessor. In addition, an "owner key" may optionally be encrypted to the server public key. Again, this message is packetized and transmitted by the device 102 to the service provider 106 over the Internet. Upon receipt, the service provider 106 verifies the signature of the packet using the device's public key, which was generated and recorded at the time of manufacture and indexed by the hash of the putative insecure key-pair identifier. The CHUMBY device is deemed authentic if the signature is correct and the signed packet contains the exact random number that was generated by the service provider in the first step of the challenge. The service provide 106 also decrypts the owner key, whose purpose is discussed in the next paragraph. At the conclusion of this transaction, the service provider 106 has authenticated the device 102, and can fall back to any number of session keys that can be either dynamically generated or statically stored for further secured transactions. Advantageously, this authentication transaction does not involve uniquely associating the hardware module with user information. Rather, the service provider 106 is simply aware of the existence of the approved hardware module and upon completion of the authentication transaction may safely trust the integrity of the secrets stored therein.

The owner key comprises a random number (or one of a set of random numbers) generated at the time of manufacture and stored only within the cryptographic processor. The owner key is transmitted to the server, encrypted using the server public key, and used as a shared secret to protect any other secrets (user passwords, credit card information, etc.) that may be stored on the server. Once a user decides they no longer wish to continue with the service, or desire to sell or transfer their CHUMBY™ device, or otherwise wish to revoke any secrets entrusted to the server, the user can instruct the cryptographic processor to delete the key from memory, thereby abolishing the server's ability to decrypt the secrets entrusted to it.

A user of the device 102 may opt-out of privacy mode and provide identifying information, as required by some billing services such as credit cards and banks. Optionally, an anonymous cash-based transaction network can be established where accounts are opened and managed only by secrets contained within the hardware module.

To enable limited revocation of user-identifying information, the specific embodiment of the master authentication protocol should operate on a set of clean-room servers with a multiplicity of connections that are trusted by the CHUMBY™ service provider 106, and authenticated session keys are then passed on laterally to the content servers. Thus, the anonymity of the master authentication key is nominally preserved, although it is possible to recreate and correlate transactions from forensic logs and transaction timings. The use of multiple servers and multiple connections, along with network routing randomization techniques, can be used to increase the anonymization resistance to forensic logging (cf. Tor network), but this configuration is in no way essential to the network's operation.

CHUMBY™ Device Calibration, Registration and Account Management

Attention is now directed to FIGS. 14-21, which are a set of flowcharts representative of the calibration, registration and initial operation of a CHUMBY™ device and associated account management functions.

Initial Power-Up

Figure 14:
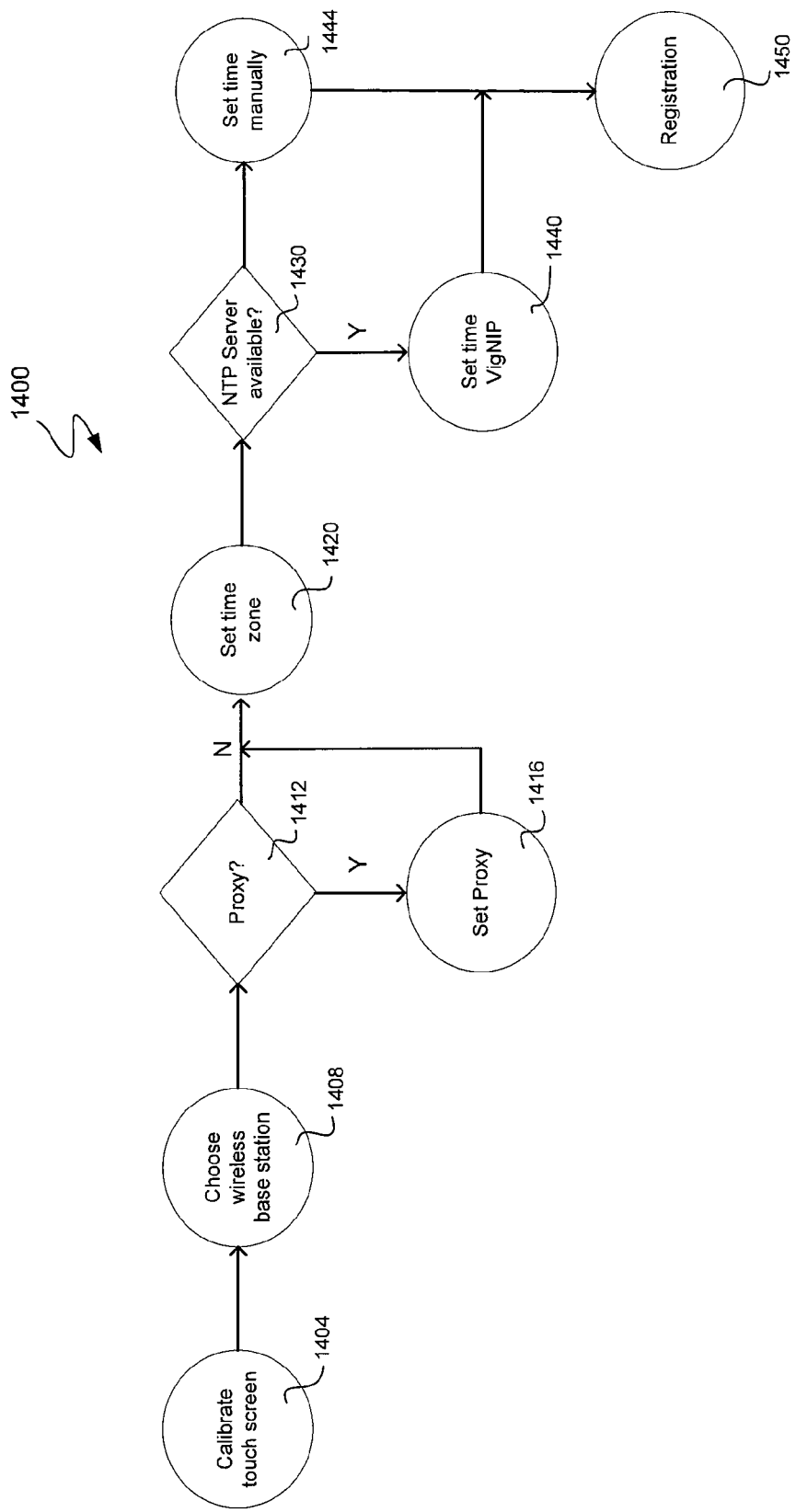
FIG. 14 is a flowchart which depicts an exemplary sequence of operations performed by a CHUMBY™ device upon initial power-up.

FIG. 14 is a flowchart 1400 which depicts an exemplary sequence of operations performed by a CHUMBY™ device 102 upon initial power-up. When a user initially connects a CHUMBY™ device 102 to a power source, the device 102 undergoes a touchscreen calibration process described below with reference to FIGS. 15-16 (stage 1404). The device 102 then selects a wireless base station in the manner described below with reference to FIG. 17 (stage 1408). If a proxy server is identified (stage 1412), then information relating to the proxy server is configured into the CHUMBY™ device 102 to enable it to with the Web site maintained by the service provider 106 (as well as with the Web sites of content providers) (stage 1416). At this point the user of the CHUMBY™ device 102 is prompted to set the time zone in which the device 102 is located (stage 1420). If an NTP server is determined to be available (stage 1430), then time is set automatically based upon information acquired from such a server (stage 1440). If not, the CHUMBY™ device 102 is referenced to a time set manually (stage 1444). After the time of the CHUMBY™ device 102 has been set, the registration process described below with reference to FIG. 18 is initiated (stage 1450).

In one embodiment a CHUMBY™ device downloads configuration information from the service provider 106 each time it is powered on or otherwise re-establishes communication with the service provider 106. However, a minimal amount of widget and configuration information may be locally stored on a CHUMBY™ device so that it may continue to function in the absence of network connectivity. For example, a clock widget may be permanently stored on a CHUMBY™ device so that its clock function could remain operational at all times. A CHUMBY™ device will typically include sufficient memory capacity to hold configuration information received from the service provider 106 for all of the widgets to be executed by the device, up to some reasonable number of widgets. If a user changes the configuration for a CHUMBY™ device through the Web site maintained by the service provider 106, a polling function implemented on the corresponding CHUMBY™ device will typically be used to "pull" the modified configuration information from the service provider 106. Alternatively, an operation may be manually initiated via the interface of the corresponding CHUMBY™ device in order to obtain this information (e.g., an "Update My CHUMBY™ Device Now" operation).

Touchscreen Calibration

Figure 15:
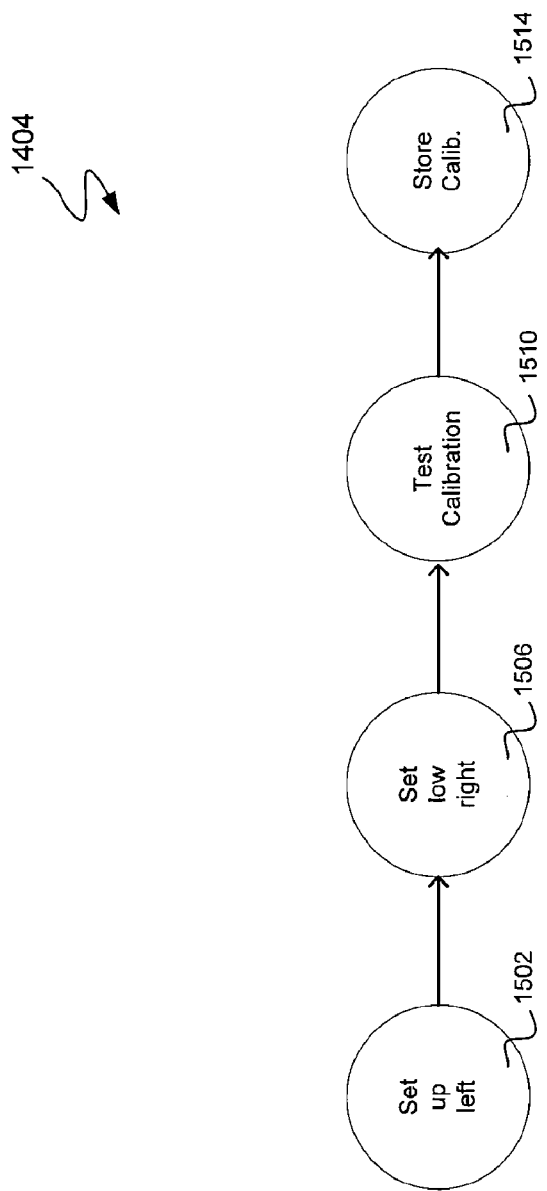
FIG. 15 is a flowchart illustrating an exemplary routine used to calibrate a touchscreen of a CHUMBY™ device.

Turning now to FIG. 15, there is shown a flowchart which illustrates an exemplary routine used to calibrate the touchscreen of a CHUMBY™ device 102. FIGS. 16A-16E provide a set of screen shots of the user interface of the CHUMBY™ device 102 being calibrated pursuant to the routine of FIG. 15. As shown, the calibration routine involves determining an upper left set point (stage 1502). This set point is determined by generating a target 1602 (FIG. 16A) through the LCD screen 320 which the user is then prompted to tap. A lower right set point is then determined by prompting the user to tap a target 1604 depicted in FIG. 16D (stage 1506). After the lower right set point target 1604 has been tapped, the user is instructed to test the touch screen calibration (stage 1510) by dragging the ball 1605 depicted in FIG. 16C from ring A 1606 to ring B 1607. Once the ball 1605 has been successfully placed in ring B 1607, a notification of success 1608 as depicted in FIG. 16D will be displayed and done button 1609 will be activated. Once the done button 1609 has been pressed, the results of the calibration process are then stored (stage 1514). Based upon the coordinate data received from the touchscreen 330 during each of stages 1502 and 1506, the CPU 302 executes a program to generate calibration information used during subsequent operation of the device 102.

Wireless Base Station Selection

Figure 17:
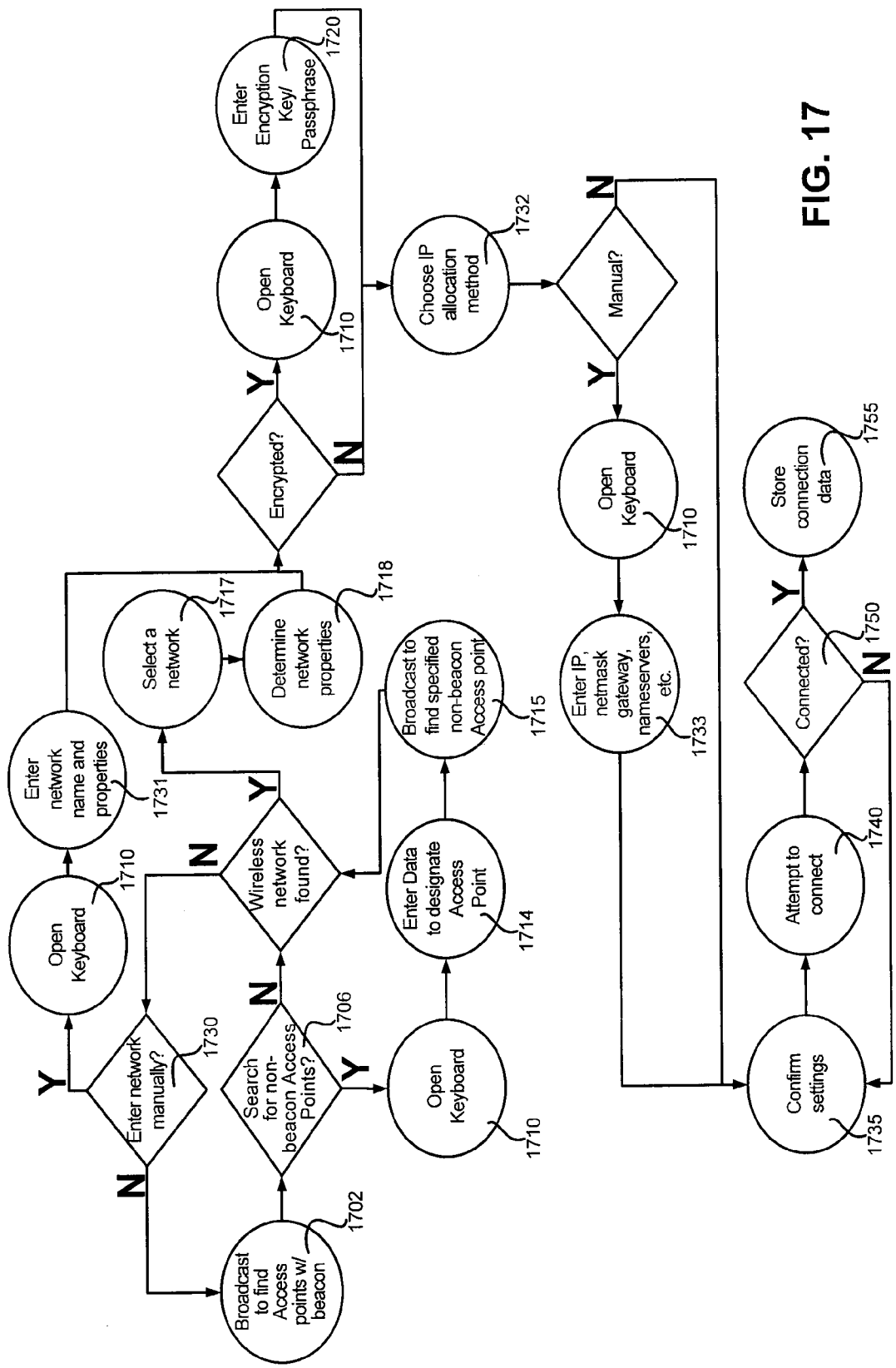
FIG. 17 is a flowchart illustrating the operations performed in selecting a wireless base station upon initial power-up of a CHUMBY™ device.
Figure 18:
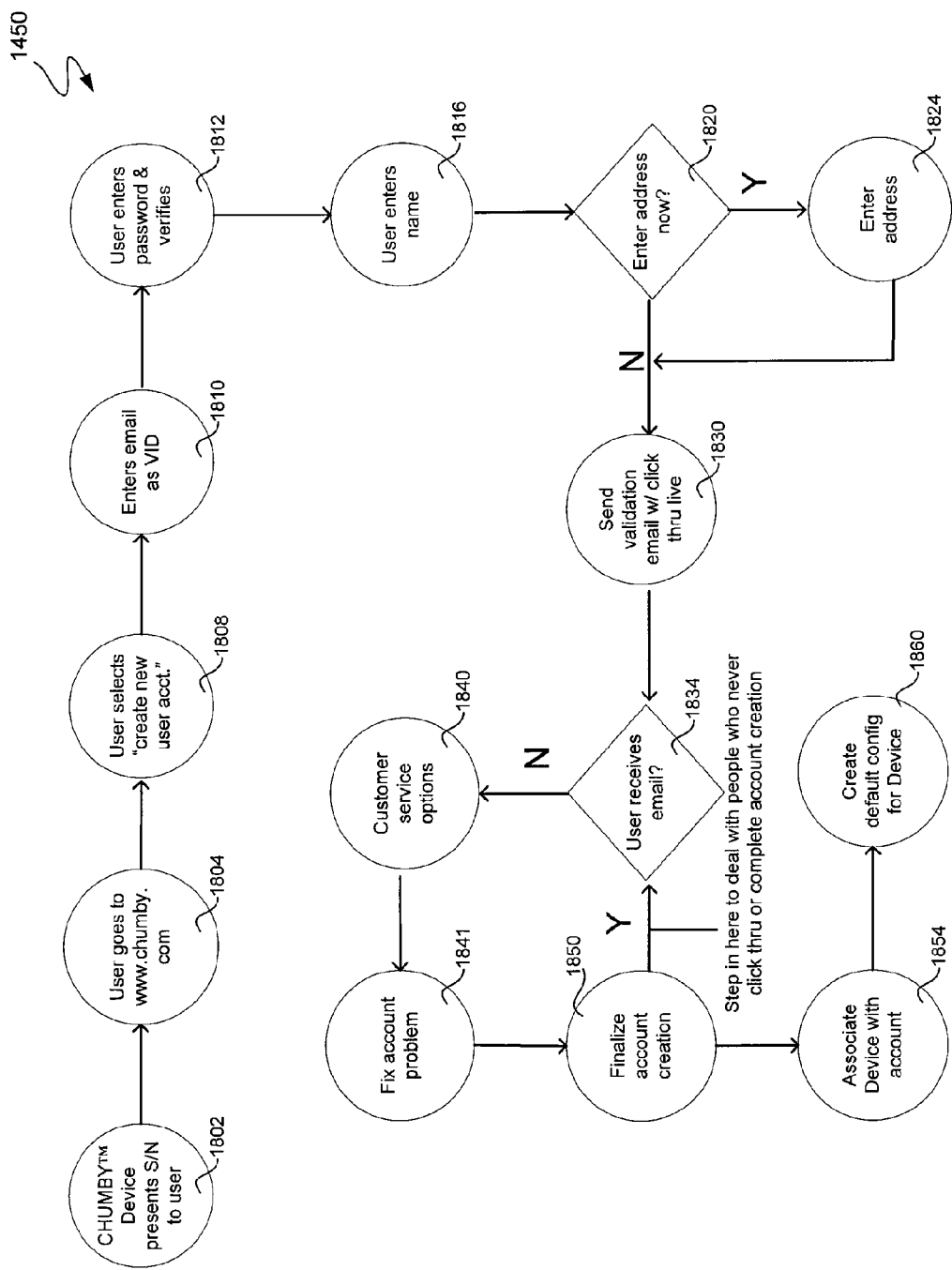
FIG. 18 is a flowchart of an exemplary account creation and registration process.

FIG. 17 is a flowchart illustrating the operations performed in selecting a wireless base station upon initial power-up of the device 102. As shown, the Wi-Fi communications interface 314 of the device initially searches for one or more access points 210 emitting a beacon signal (stage 1702). If the device is configured to search for access points not emitting a beacon signal (stage 1706), then a keyboard is accessed (stage 1710) and data designating an access point is entered (stage 1714). The keyboard may comprise a physical keyboard connected to the device 102 as a peripheral component. Alternatively, an "onscreen" keyboard generated by the LCD screen 320 and interacted with via the touchscreen 330 may be utilized. Once data designating an access point has been entered, a subsequent scan (stage 1715) will be initiated in an attempt to find the access point that was not emitting a beacon signal. Once one or more wireless networks have been discovered, the user is given the option to select one from a list (stage 1717). When a wireless network is selected, the CPU 302 executes a program to determine various aspects of the chosen wireless network (stage 1718), including but not limited to authentication mode, encryption type, channel/frequency, etc. If a suitable network is not detected, the user may be given the choice to enter the network configuration properties (e.g. SSID, authentication mode, etc) manually (stage 1730). If the user chooses to manually enter network properties, a keyboard (stage 1710) is displayed and the user is prompted to enter the network properties (stage 1731). If the selected or designated network requires authentication (e.g., WPA, WPA2, etc) and/or or is otherwise encrypted (e.g., WEP, AES, TKIP, etc), a keyboard (stage 1710) is displayed and the user is given the opportunity to enter the applicable key (stage 1720). In the event that a user enters a WEP key, the key size will be determined automatically by the length of the key entered by the user. The user is then presented with a choice of automatic or manual IP allocation (stage 1732). Should the user select a manual IP allocation, a keyboard (stage 1710) is displayed and the user is prompted to enter IP related configuration data (stage 1733) such as IP address, netmask, gateway, nameservers, etc. After the IP allocation method has been chosen and optionally configured, the user will be asked to confirm the network settings (stage 1735). A connection is then attempted to be established with a detected or designated access point (stage 1740). If a connection is so established (stage 1750), then the information relating to the connection is stored within the memory of the device 102 (stage 1755); otherwise the user is given the option to reattempt to establish the connection.

Registration

Referring now to FIG. 18, a flowchart is provided of an exemplary account creation and registration process 1450. The process begins upon presentation by the device, via its LCD screen 320, of its serial number or other identifying information (stage 1802). The user then logs in, via a Web browser 122, to a web site operated by the service provider 106 (e.g., www.chumby.com) (stage 1804). In one embodiment the user may then select a "create new user account" tab or the like (stage 1808), and is prompted to enter an email address (stage 1810), password (stage 1812), and name (stage 1816). In certain implementations the user may also be offered the opportunity to enter his or her address (stage 1820), while in other implementations the user is not prompted to provide an address until this information is required for some particular purpose (e.g., to provide a billing information for a subscription or shipping information for a product purchase). If this option is selected, the user enters his or her address (stage 1824). In certain implementations, the user may be prompted to provide other identifying and/or demographic information (not shown in this figure). At this point the service provider 106 sends an email to the address entered in stage 1810 which contains a "click through" account activation hyperlink (stage 1830). If the user does not receive this message (stage 1834), the user is provided with the opportunity to take advantage of various customer service options in order to remedy the account creation difficulties being experienced (stages 1840-1841). In any event, the account creation process is then finalized (stage 1850), and the CHUMBY™ device being registered is associated within the system database 712 with a particular user account in the manner described below (stage 1854). Once this has occurred a default configuration and a number of widget instances are established for the newly registered CHUMBY™ device (stage 1860).

Account Association

Figure 19:
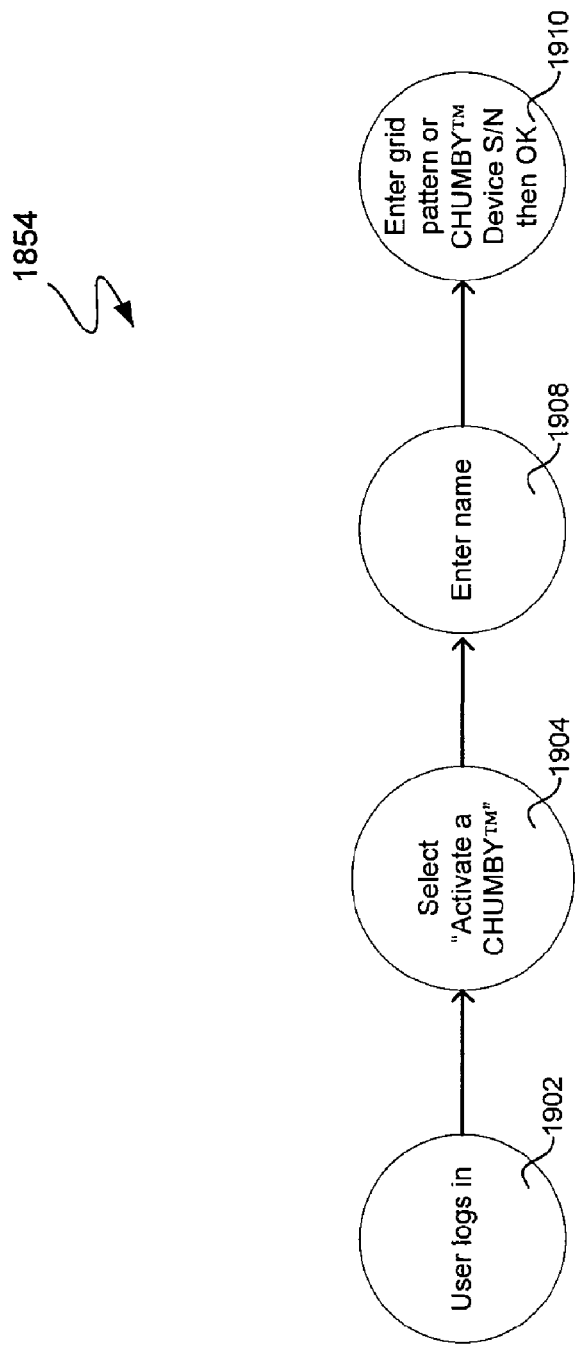
FIG. 19 is a flowchart representative of an exemplary Web-based interaction between a user and a service provider in connection with associating a particular CHUMBY™ device with the user's account.

FIG. 19 is a flowchart representative of exemplary Web-based interaction occurring between a user and the service provider 106 in connection with associating a particular CHUMBY™ device with the user's account. The process is initiated when the user logs in to a Web site operated by the service provider 106 (stage 1902) and selects an "Activate a CHUMBY™" link or the equivalent (stage 1904). The user enters a name of the CHUMBY™ device (e.g., bedroom, study, Fred, evening, etc.) (stage 1908) and then, as described in the above-referenced U.S. Provisional Application Ser. No. 60/945,900, the user duplicates the "captcha grid" pattern displayed on the "Activate a CHUMBY™" page on the corresponding "Activate CHUMBY™" screen on the CHUMBY™ device and selects "OK" (stage 1910). The CHUMBY™ device then transmits the encoded pattern along with the putative id (unique serial number) of the CHUMBY™ device to the server for verification and association with the user's account. Alternatively, the user may directly enter the putative id (unique serial number) of the user's CHUMBY™ device into the Web page and selects "OK" (stage 1910). An association is then created between the user's CHUMBY™ device and the applicable account within the system database 712.

In one embodiment user accounts are configured to be capable of hosting and moderating sub-accounts.

Disabling a CHUMBY™ Device

Figure 20:
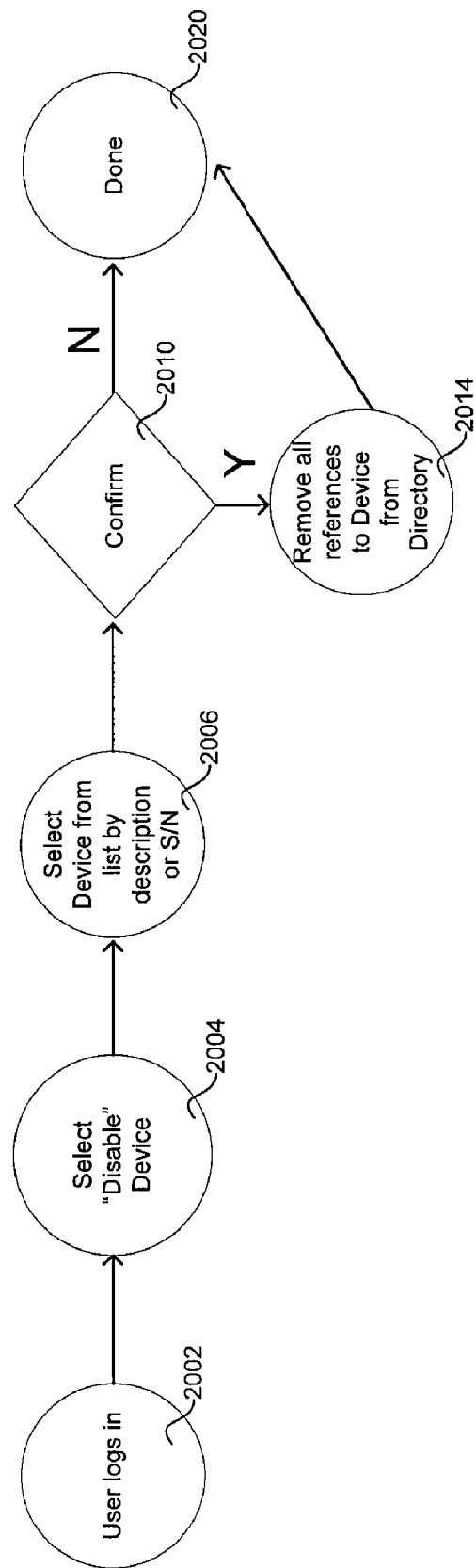
FIG. 20 is a flowchart of an exemplary Web-based interaction between a user and the service provider with regard to disabling a CHUMBY™ device that has been previously associated with the user's account.

Referring now to FIG. 20, a flowchart is provided of exemplary Web-based interaction occurring between a user and the service provider 106 with regard to disabling a CHUMBY™ device that has been previously associated with the user's account. As shown, the user logs in to the account via a Web browser 122 (stage 2002) and selects a "Disable CHUMBY™ device" tab or the equivalent (stage 2004). The user then selects the CHUMBY™ device to be disabled from a list based upon either the device's serial number or description (stage 2006). Next the user is prompted to confirm the selection (stage 2010), and if so all references to the disabled CHUMBY™ device are removed from the directory maintained within the system database 712 (stage 2014). The process is then completed whether or not the selection is confirmed (stage 2020), at which point the service provider 106 no longer responds to requests from the CHUMBY™ device which has been disabled.

Mirroring a CHUMBY™ Device

Figure 21:
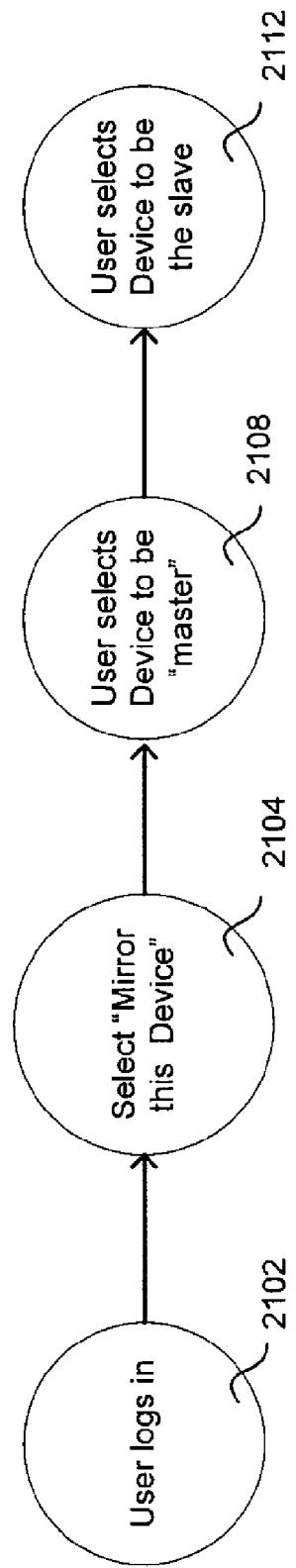
FIG. 21 is a flowchart of an exemplary Web-based interaction between a user and the service provider in connection with "mirroring" CHUMBY™ devices.

FIG. 21 is a flowchart which represents exemplary Web-based interaction occurring between a user and the service provider 106 in connection with "mirroring" CHUMBY™ devices; that is, enabling one CHUMBY™ device to utilize the widget set and configuration of another CHUMBY™ device. In one embodiment once a given CHUMBY™ device (i.e., the "slave device") has been mirrored to another CHUMBY™ device (i.e., the "master device"), widget-related changes made to the master device are automatically reflected in the slave device. As shown in FIG. 21, the user logs in to the applicable account via a Web browser 122 (stage 2102) and selects a "Mirror this CHUMBY™ device" tab or the equivalent (stage 2104). The user then selects the CHUMBY™ device to be the "master" (stage 2108) and further selects the CHUMBY™ device to the "slave" (stage 2112). In certain embodiments the master CHUMBY™ device need not correspond to a physical device, but could instead constitute a "virtual" CHUMBY™ device defined within the system database 712. In this case changes made to the widget set or configuration of the virtual CHUMBY™ device would be mirrored by all of its slave CHUMBY™ devices. In certain embodiments the slave CHUMBY™ device need not correspond to a physical device, but could instead constitute a "virtual" CHUMBY™ device defined within the system database 712.

Widget Selection, Removal and Configuration

Attention is now directed to FIGS. 22-25, 37 and 38, which are a set of flowcharts representative of Web-based widget selection, removal and configuration processes contemplated by embodiments of the present invention. Screen shots of exemplary user interfaces presented by the Web browser 122 or, alternatively, the screen 320 of the applicable CHUMBY™ personal audiovisual device 102, which are used to facilitate certain of these processes are illustrated in FIG. 26.

Overview of Widget Management Process

Figure 22:
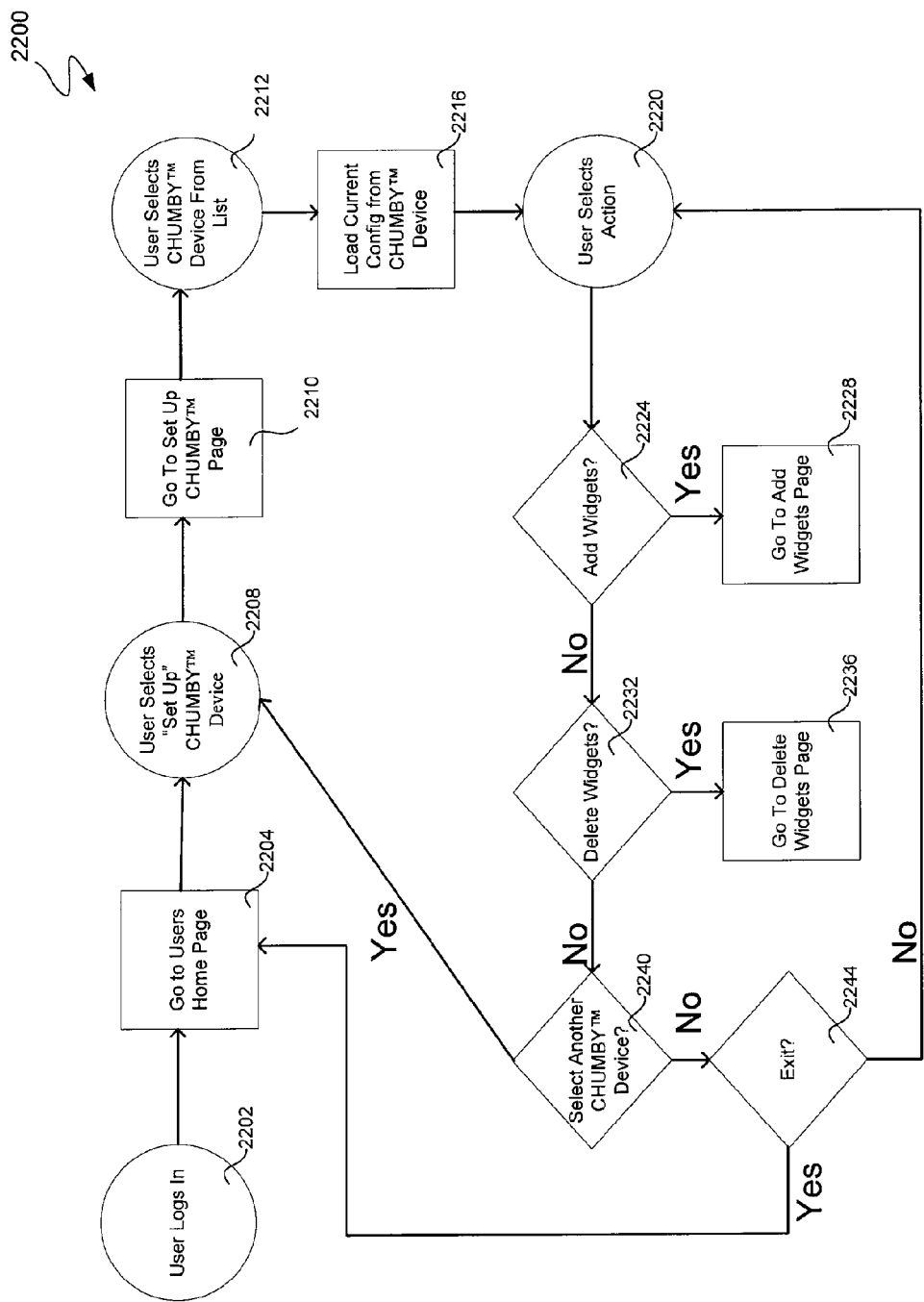
FIG. 22 is a top-level flowchart of exemplary Web-based or CHUMBY™ device-based interaction between a device user and the service provider with regard to adding, removing and configuring widget profiles relative to the user's CHUMBY™ device.

Turning now to FIG. 22, a top-level flowchart 2200 is provided of exemplary Web-based interaction occurring between a device user and the service provider 106 with regard to adding, removing and configuring widget profiles relative to the user's CHUMBY™ device. Alternatively, this interaction between a device user and the service provider 106 may be effected through user interface screens presented by the user's CHUMBY™ device in lieu of the Web browser 122. Although a user may have the impression that a CHUMBY™ device itself is being configured through the process of FIG. 22, in the exemplary embodiment a profile currently assigned to the user's CHUMBY™ device is instead configured.

Figures 26A, 26B, 26C, 26D, 26E:
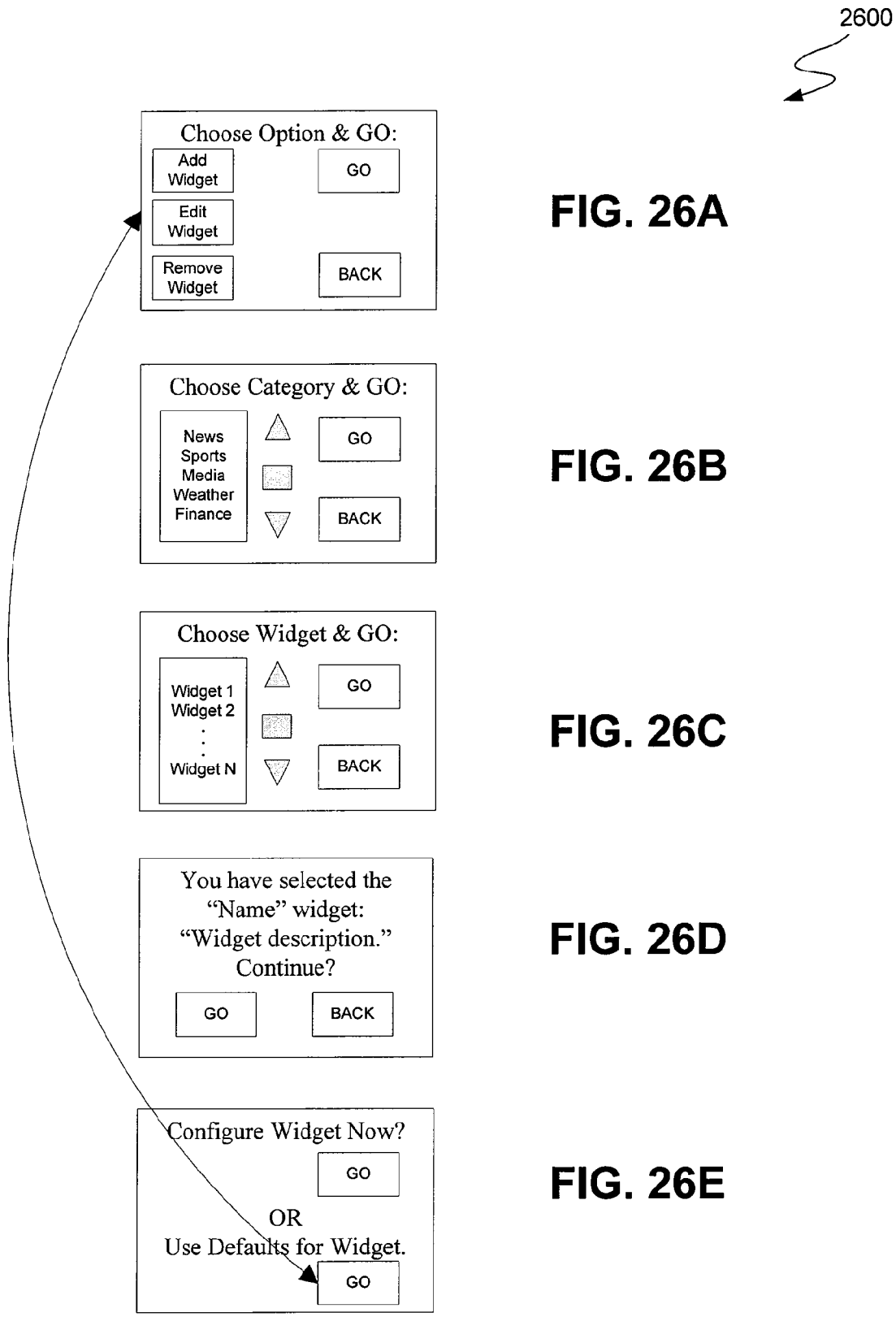
FIGS. 26A-26E are screen shots of exemplary user interfaces presented by a Web browser used to facilitate certain of the processes described by FIGS. 22-25.

As shown in FIG. 22, the user logs in to the user's account maintained with the service provider 106 via a Web browser 122 (stage 2202) and proceeds to the user's "home page" or the equivalent (stage 2204). From this home page the user selects a "Set Up" device tab or the like (stage 2208) and the Web browser 122 presents a corresponding "Set Up" page (stage 2210). The user then selects the CHUMBY™ device profile to be configured from a list based upon either the device's serial number or description (stage 2212). The current configuration for the selected device profile is then retrieved from the system database 712 and loaded into the device (stage 2216). Once this has occurred the user selects an action to be performed, as is illustrated by FIG. 26A (stage 2220). Such actions may include, for example, adding, deleting or editing widget profiles. If the user opts to add widget profiles (stage 2224), then the Web browser 122 displays an "Add Widgets Page" through which widget profiles may be added to the current configuration of the applicable CHUMBY™ device in the manner described below with reference to FIG. 23 (stage 2228). If the user instead chooses to delete widget profiles from such current configuration (stage 2232), then a "Delete Widgets Page" is presented through which the deletion operation may be completed consistent with the approach described below with reference to FIG. 24 (stage 2236). Alternatively, the user may select another CHUMBY™ device profile to configure (stage 2240), or simply exit and return to the user's home page (stage 2244).

Figure 37:
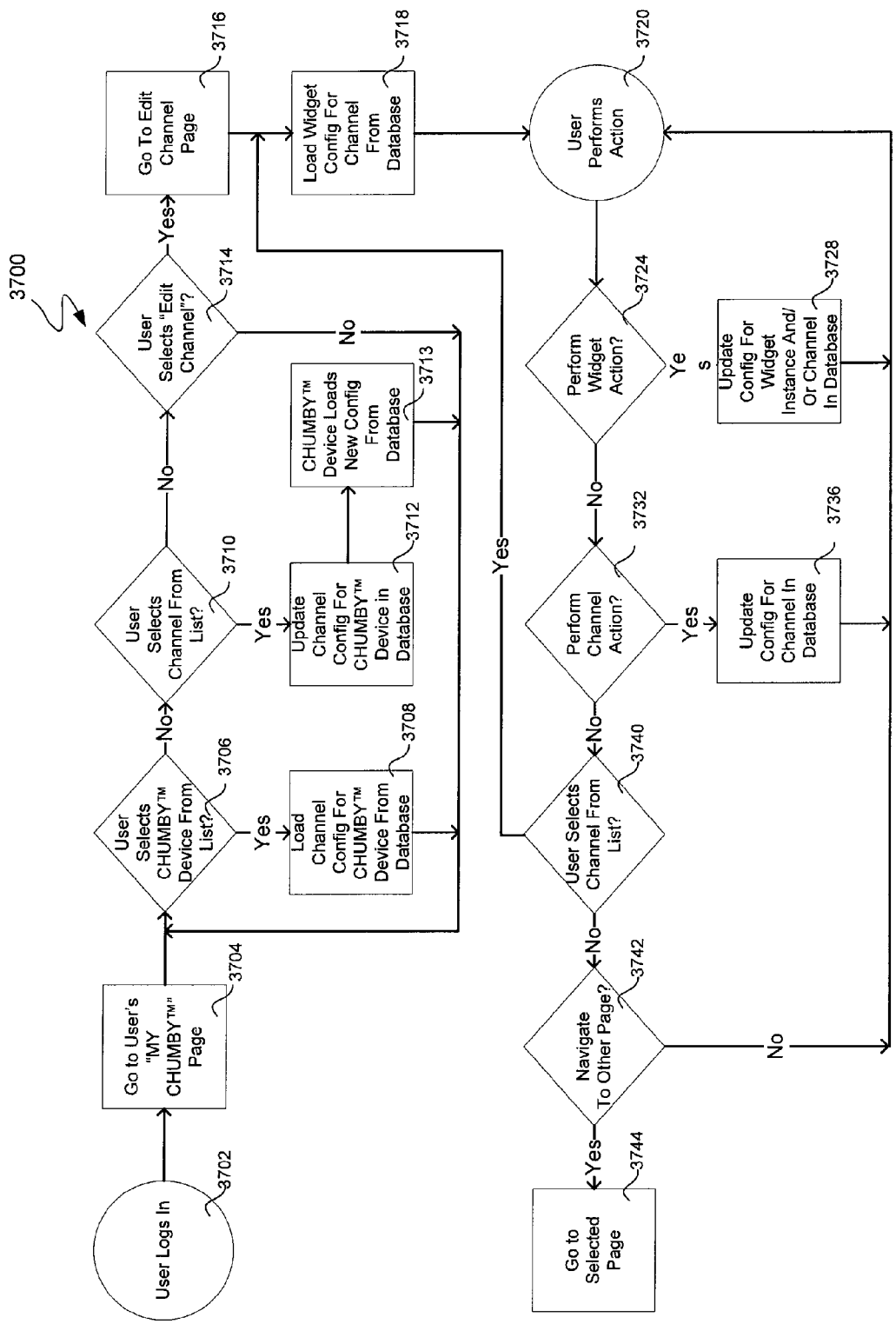
FIG. 37 is a top-level flowchart of exemplary Web-based interaction between a device user and the service provider with regard to adding, removing and configuring widget profiles relative to the user's CHUMBY™ device.

Turning now to FIG. 37, an alternate top-level flowchart 3700 is provided of exemplary Web-based interaction occurring between a device user and the service provider 106 with regard to adding, removing and configuring widget profiles relative to the user's CHUMBY™ device. Although a user may have the impression that a CHUMBY™ device itself is being configured through the process of FIG. 37, in the exemplary embodiment a profile currently assigned to the user's CHUMBY™ device is instead configured.

Figure 39A:
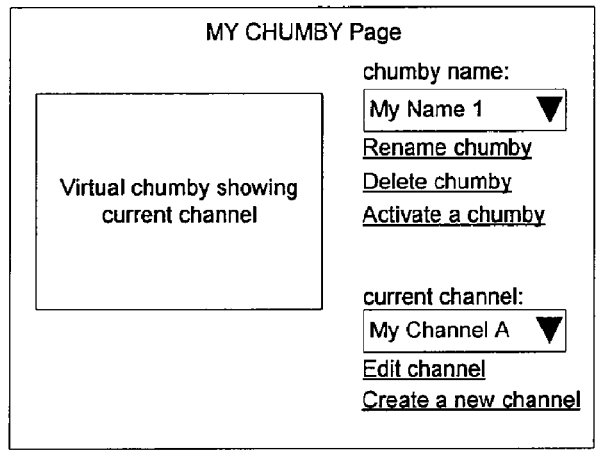
FIGS. 39A-39H are screen shots of exemplary user interfaces presented by a Web browser used to facilitate certain of the processes described by FIGS. 25 and 37-38.
Figure 39B:
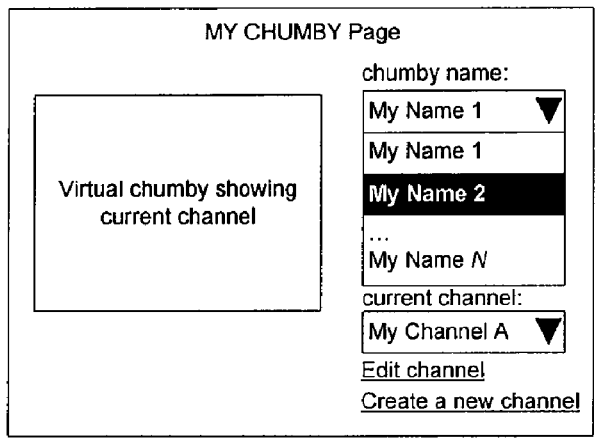
Figure 39C:
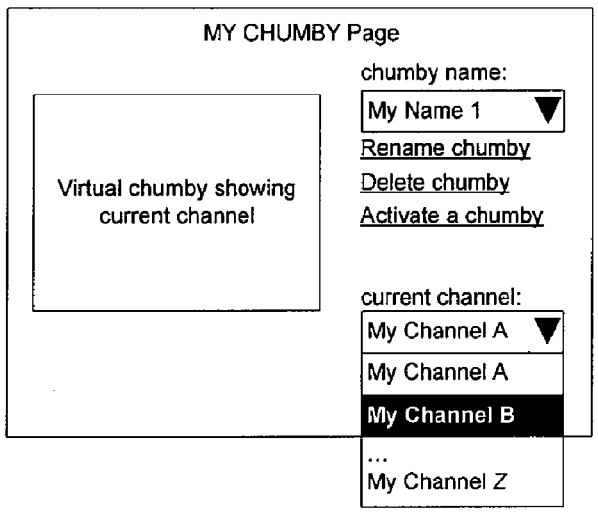
Figure 39D:
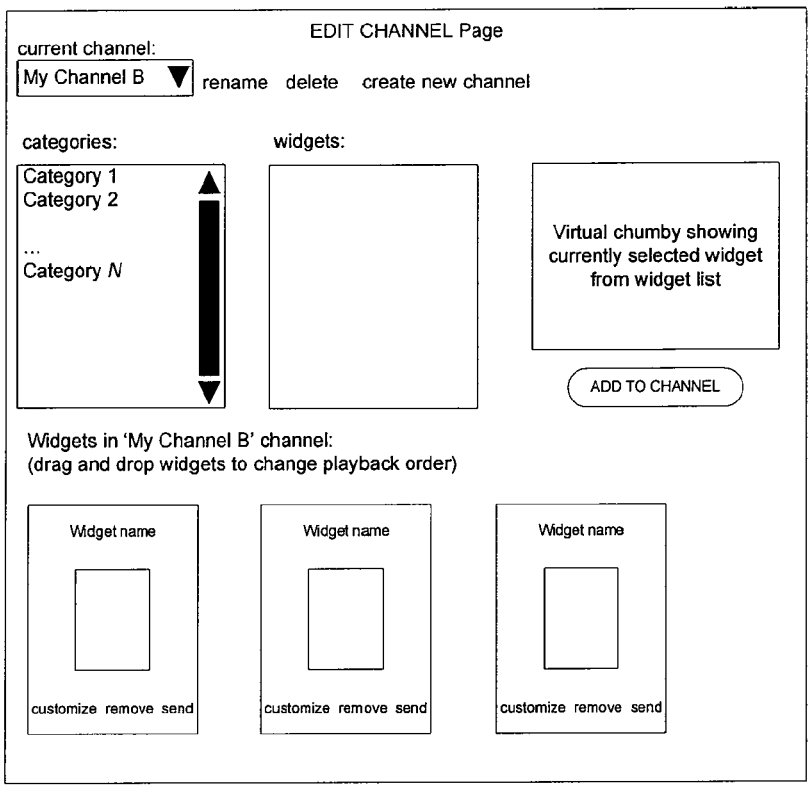

As shown in FIG. 37, the user logs in to the user's account maintained with the service provider 106 via a Web browser 122 (stage 3702) and proceeds to the user's "MY CHUMBY™ page" or the equivalent, as is illustrated by FIG. 39A (stage 3704). From this MY CHUMBY™ page the user optionally selects the CHUMBY™ device to be configured from a list or the like, as is illustrated by FIG. 39B (stage 3706) and the Web browser 122 loads the currently configured widget channel into the current page (stage 3708). The user then optionally selects the CHUMBY™ widget channel to be configured from a list or the like, as is illustrated by FIG. 39C (stage 3710). The current channel configuration for the selected CHUMBY™ device is then updated in the system database 712, loaded into the current page (stage 3712) and loaded by the currently selected CHUMBY™ device (stage 3713). At any point the user may select the "Edit Channel"

option (stage 3714), following which a "Edit Channel Page" is presented, as is illustrated by FIG. 39D (stage 3716), with the widget configuration for the selected channel is loaded into the page (stage 3718). Once this has occurred, the user may select an action to be performed (stage 3720). Such actions may include, for example, changing, renaming, deleting or creating new widget channels; adding widgets to, removing widgets from, changing playback order of widgets within or configuring widgets within the selected channel. If the user opts to perform a widget action (stage 3724), then the widget instance for the affected widget and/or the configuration for the selected channel within the system database 712 are updated, which subsequently effects a corresponding update to the local copy of the channel configuration of all CHUMBY™ devices currently "playing" the selected channel (stage 3728). If the user opts to perform a channel action (stage 3732), then the configuration for the selected channel within the system database 712 is updated which subsequently effects a corresponding update to the local copy of the channel configuration of all CHUMBY™ devices currently "playing" the selected channel (stage 3734). Alternatively, the user may select another channel to configure (stage 3740), or navigate to another page (stages 3742, 3744).

Adding Widgets

Figure 23:
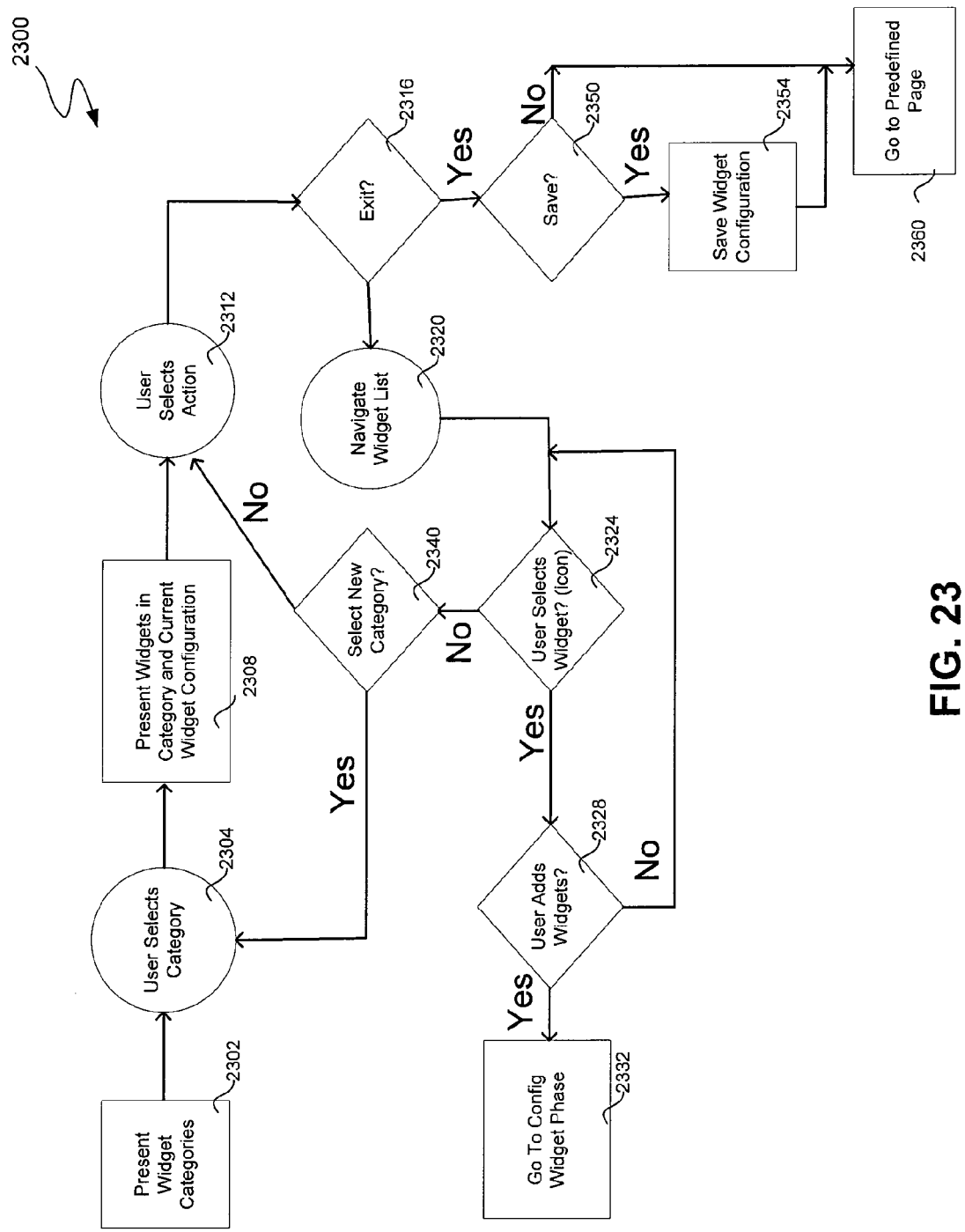
FIG. 23 is a flowchart representative of exemplary Web-based or CHUMBY™ device-based interaction between a device user and the service provider with respect to the addition of widgets to the current configuration of the user's CHUMBY™ device.

FIG. 23 is a flowchart 2300 representative of exemplary Web-based interaction occurring between a device user and the service provider 106 with respect to the addition of widgets to the current configuration of the user's CHUMBY™ device. Alternatively, this interaction between a device user and the service provider 106 may be effected through user interface screens presented by the user's CHUMBY™ device in lieu of the Web browser 122. In one embodiment the user is provided with the opportunity to choose, through an appropriate category selection page (see, e.g., FIG. 26B) presented by a Web browser 122, among various widget categories retrieved from the categories table of the system database 712 (stage 2302). After selecting a widget category (stage 2304), both the widgets included within the selected category and the current widget configuration of the applicable CHUMBY™ device are presented to the user (stage 2308). The user then selects an action to perform (stage 2312) including, for example, exiting the widget addition process (stage 2316) or navigating the list of widgets presented for the selected category (stage 2320). If the latter action is selected (see, e.g., FIGS. 26C-26D), the user then selects a widget to be added to the current configuration (e.g., by selecting a corresponding icon) and the service provider 106 constructs an instance of the selected widget (stage 2324). At this point the user may also opt to add yet more widgets to the current configuration (stage 2328). Once the user has indicated that no additional widgets are to be added, a widget configuration phase (stage 2332) may be entered (see, e.g., FIG. 26E). If the user declines to select a widget while navigating the list of widgets presented for a selected category during stage 2320, a new category of widgets may be selected (stage 2340).

If the user decides to exit the process of adding widgets to the current configuration, the user may perform one of several actions, including, but not limited to: select another CHUMBY™ device to configure; navigate to another page on the CHUMBY™ site; log out from the CHUMBY™ site; or close the applicable browser window (stage 2316). If the user instead chooses to save the current widget configuration for the applicable CHUMBY™ device (stage 2350), the user selects a "Submit", "Commit", "Ok" or similar button to cause any changes made to be recorded in the system database 712 (stage 2354). After either saving the current widget configuration or electing to exit the process, the user may be directed to a predefined page (stage 2360).

Figure 38:
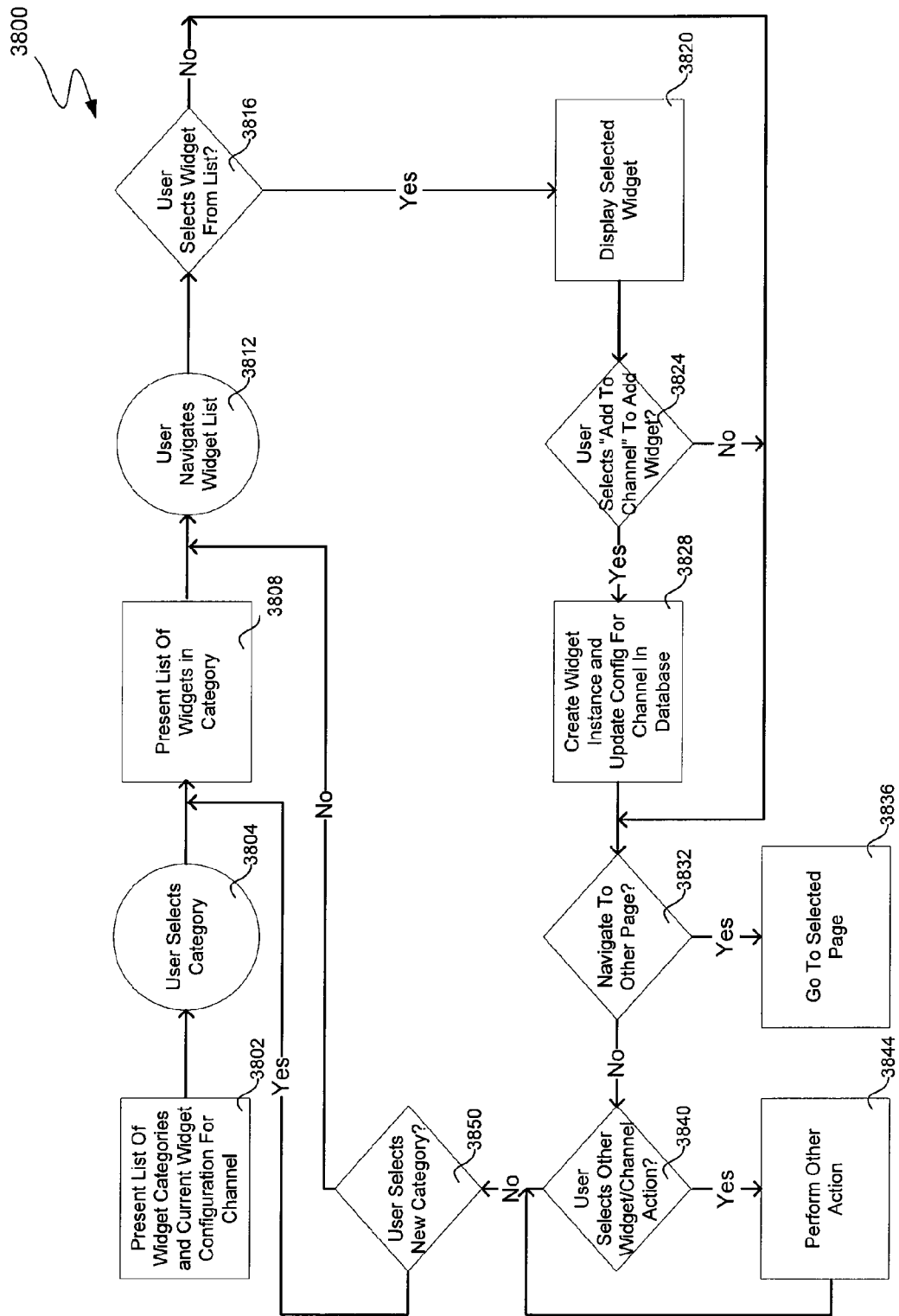
FIG. 38 is a flowchart representative of exemplary Web-based interaction between a device user and the service provider with respect to the addition of widgets to the current configuration of the user's CHUMBY™ device.

FIG. 38 is an alternate flowchart 3800 representative of exemplary Web-based interaction occurring between a device user and the service provider 106 with respect to the addition of widgets to a channel configuration. In one embodiment the user is provided with the opportunity to choose, through an appropriate category selection list on the EDIT CHANNEL Page (see, e.g., FIG. 39D) presented by a Web browser 122, among various widget categories retrieved from the categories table of the system database 712 (stage 3802). After selecting a widget category (stage 3804), the widgets included within the selected category are presented to the user, as is illustrated by FIG. 39F (stage 3808). The user then selects an action to perform including, for example, navigating to another page (stage 3832) or navigating the list of widgets presented for the selected category (stage 3812). If the latter action is selected (see, e.g., FIG. 39G), the user then selects a widget to be added to the current configuration by selecting a widget from the "widgets" list (stage 3816), which causes the selected widget to be displayed (stage 3820), and then selecting the ADD TO CHANNEL button (stage 3824), which causes the service provider 106 to construct an instance of the selected widget and update the configuration for the current channel in the system database 712 (stage 3828). At this point the user may also opt to iteratively navigate the widget list (stage 3812), select widgets (stage 3816) and add more widgets to the current configuration (stage 3824). At any time in this process, other widget and/or channel operations may be selected and/or executed by the user (stage 3840), including, but not limited to: configuring a widget instance (see, e.g., FIG. 39H), a widget deletion, altering widget playback ordering within the channel, renaming the current channel, deleting the current channel, creating a new channel and/or selecting a new category of widgets may be selected (stage 3850).

Figure 39E:
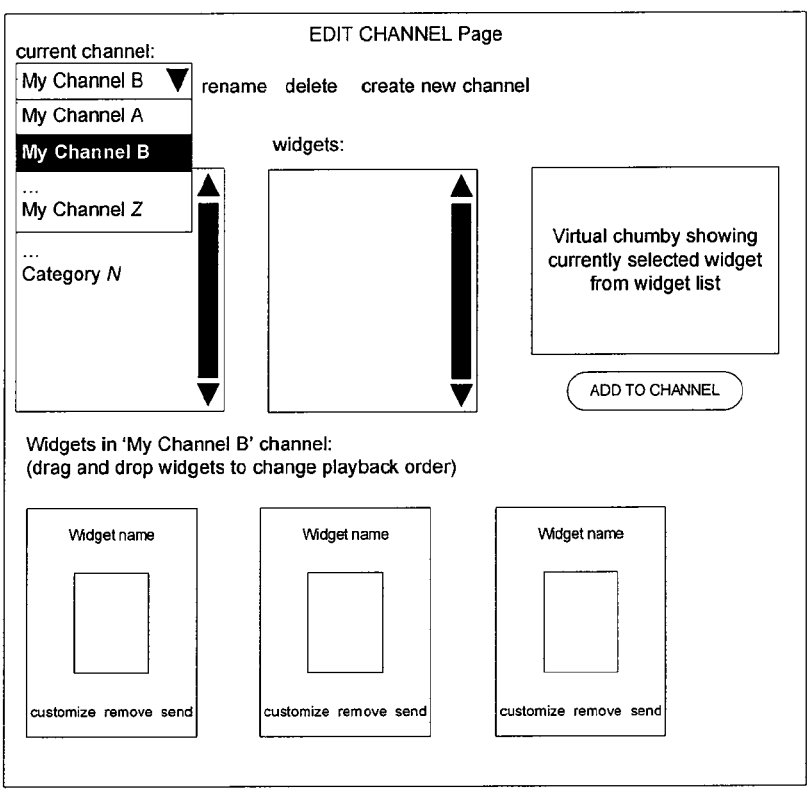
Figure 39F:
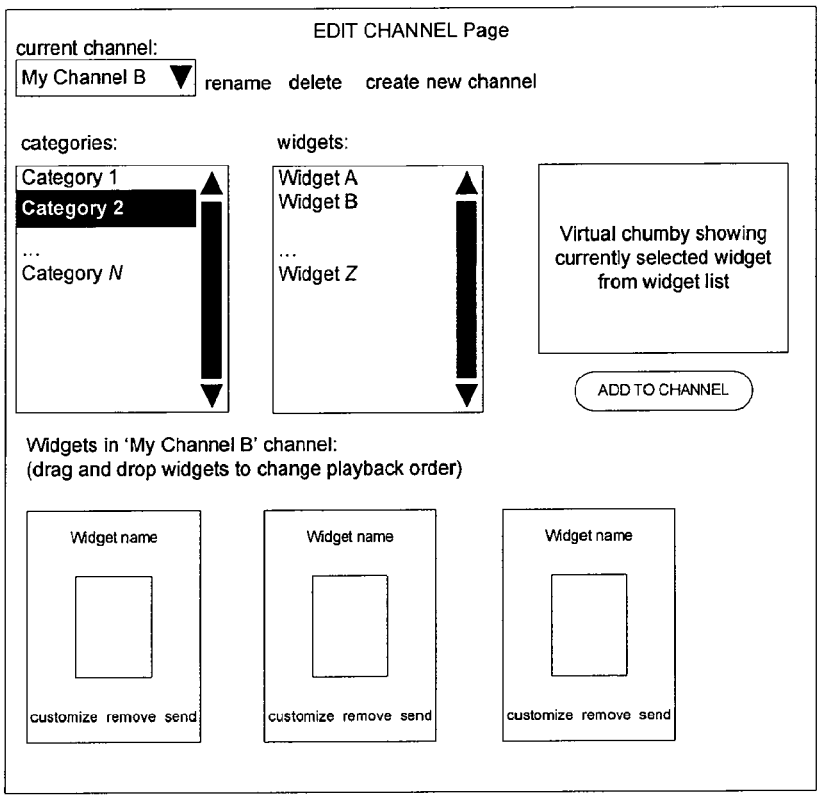
Figure 39G:
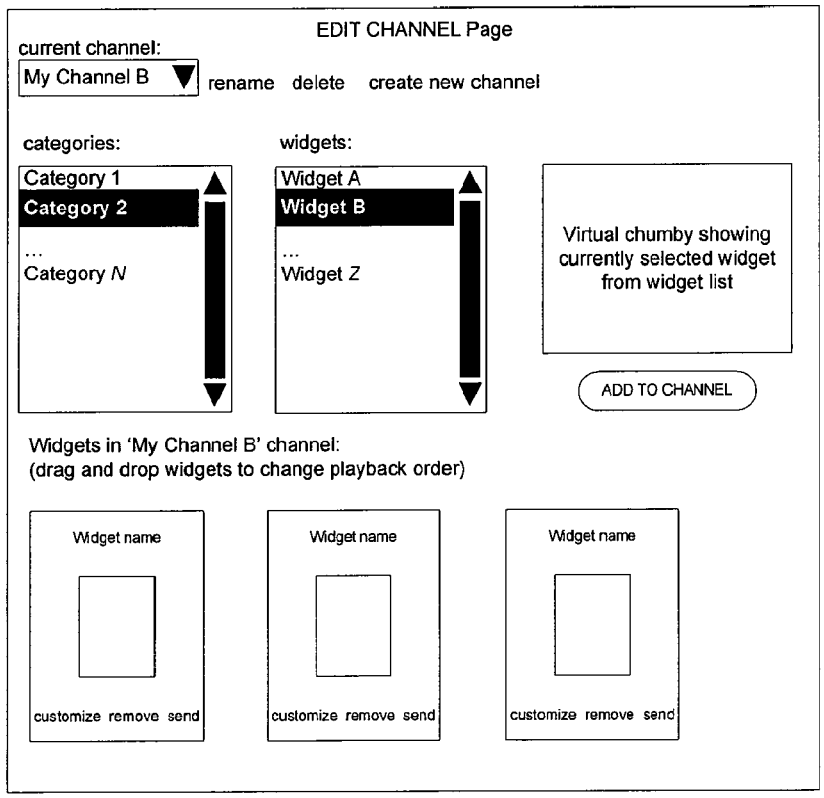

If the user decides to exit the process of adding widgets to the current configuration, the user may perform one of several actions, including, but not limited to: select another channel to configure, as is illustrated by FIG. 39E; navigate to another page on the CHUMBY™ site (stage 3832); log out from the CHUMBY™ site; or close the applicable browser window.

Widget Removal

Figure 24:
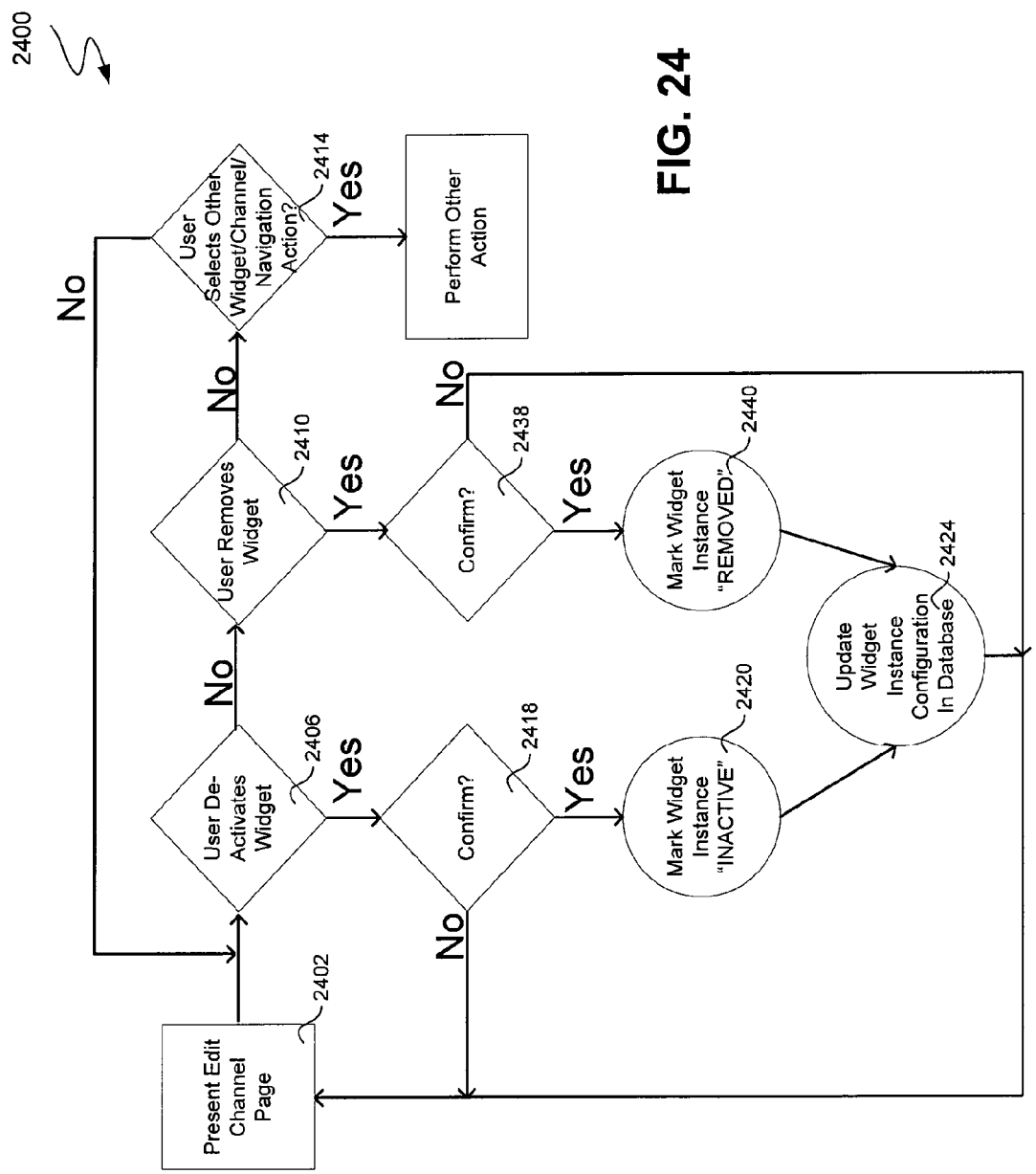
FIG. 24 is a flowchart representative of exemplary Web-based or CHUMBY™ device-based interaction between a device user and a service provider in connection with the removal of widgets from a channel, which may also be active on the user's CHUMBY™ device.

Referring now to FIG. 24, a flowchart 2400 is provided which is representative of exemplary Web-based interaction occurring between a device user and the service provider 106 in connection with the removal of widgets from the current configuration of the user's CHUMBY™ device. Alternatively, this interaction between a device user and the service provider 106 may be effected through user interface screens presented by the user's CHUMBY™ device in lieu of the Web browser 122. Upon being presented with the "EDIT CHANNEL Page", as is illustrated by FIG. 39D (stage 2402), the user may elect to either de-activate a selected widget (stage 2406), delete (or remove) a selected widget (stage 2410), or select some other widget, channel and/or page navigation operation (stage 2414). If widget de-activation is chosen, the user is prompted to confirm the choice (stage 2418). Once such confirmation has been provided the widget is marked as "inactive" on the page currently being rendered by the Web browser 122 (stage 2420). In addition, the widget instance configuration for the selected channel is updated within the system database 712 (stage 2424) and any CHUMBY™ devices currently displaying the selected channel are updated. Similarly, if it is instead chosen to delete the selected widget, the user is optionally prompted to confirm the choice (stage 2438). Once the widget is deleted or after optionally required confirmation has been provided, the widget is removed from the page currently being rendered by the Web browser 122 (stage 2440), the widget instance is "deleted" from the channel configuration in the system database 712 (stage 2424) and any CHUMBY™ devices currently displaying the selected channel are updated. If confirmation to de-activate or delete the selected widget is required, but not provided (stages 2418 and 2438), the operation is aborted.

Figure 40A:
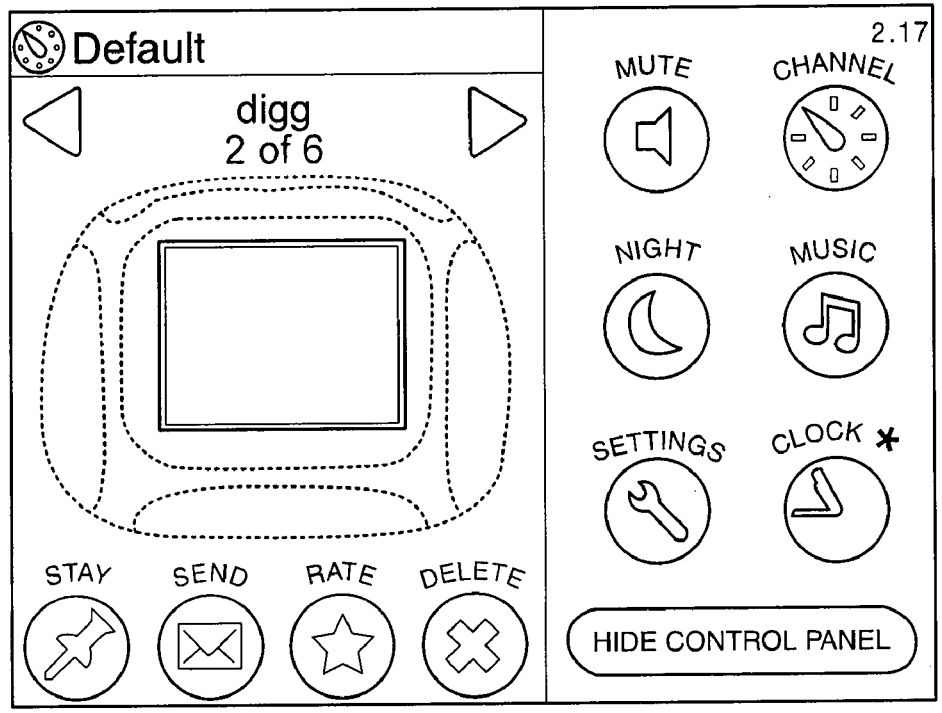
FIGS. 40A-40B are screen shots of exemplary user interfaces presented by a CHUMBY™ device used to facilitate certain of the processes described by FIG. 41.
Figure 40B:
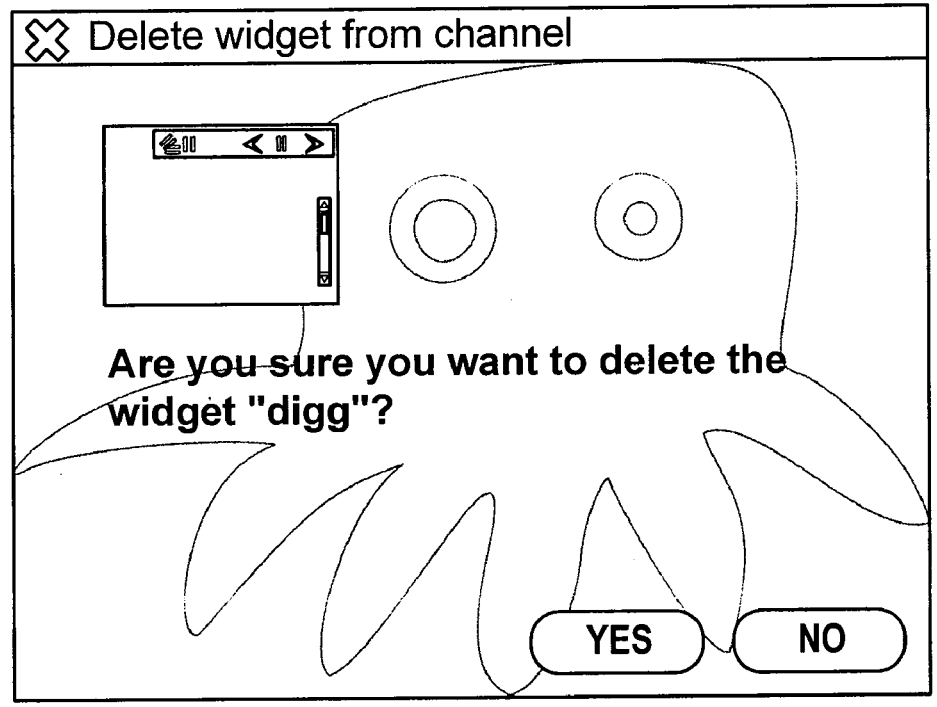
Figure 41:
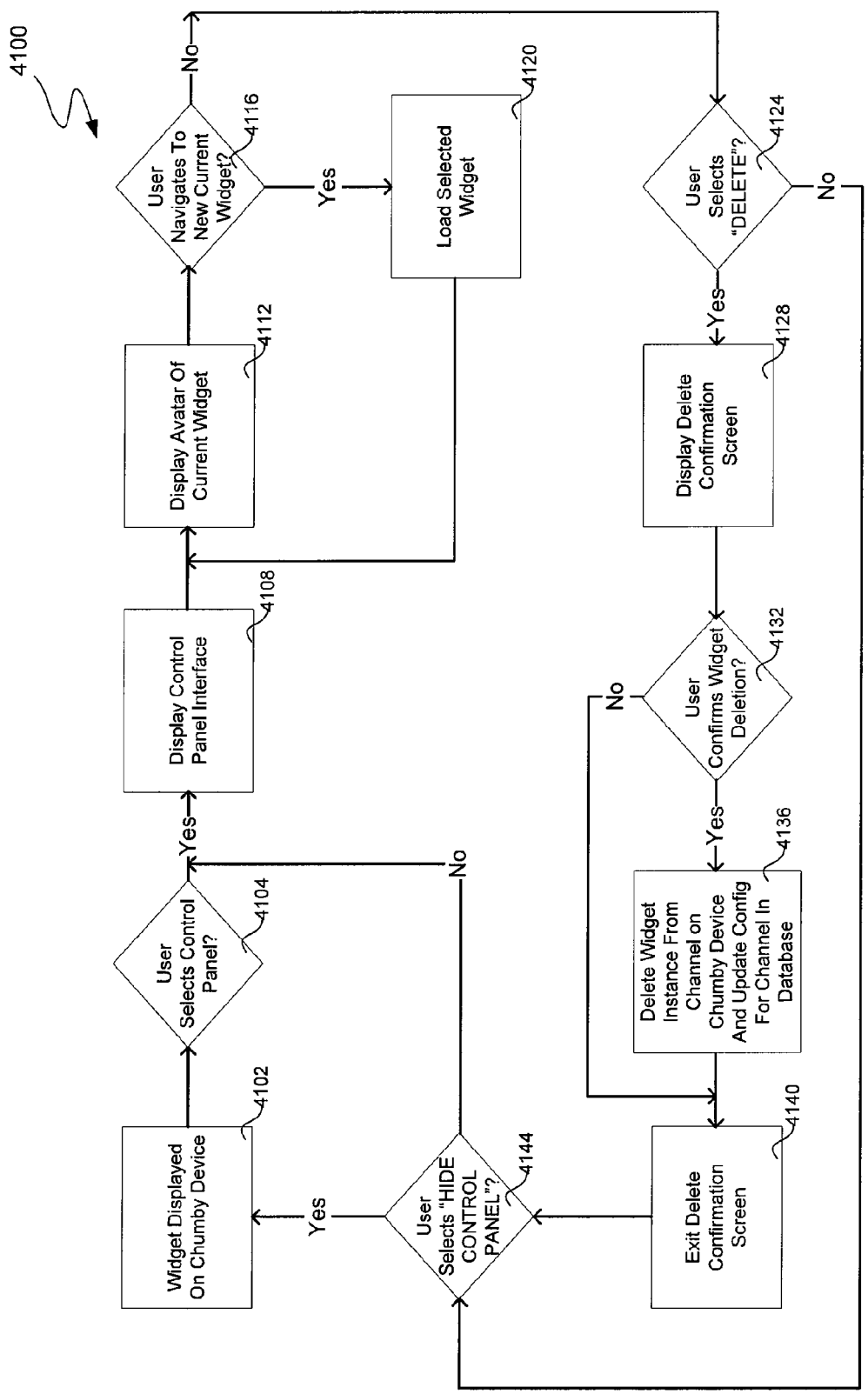
FIG. 41 is a flowchart representative of exemplary CHUMBY™ device-based interaction between a device user and a service provider in connection with the removal of widgets from the current channel of the user's CHUMBY™ device.

Referring now to FIG. 41, an alternate flowchart 4100 is provided which is representative of exemplary interaction occurring, via the CHUMBY™ device of a user, between such user and the service provider 106 in connection with the removal of widgets from the current configuration of the user's CHUMBY™ device. With a widget displayed on the screen 320 of the CHUMBY™ device (stage 4102), the user performs the gesture which selects the Control Panel (stage 4104). Upon being presented with the Control Panel, as is illustrated by FIG. 40A (stage 4108), which displays the avatar for the current widget (stage 4112), the user may optionally use the widget navigation controls to singly or iteratively select a new current widget (stage 4116), in which case the new current widget is loaded (stage 4120) and its avatar displayed (stage 4112). The user may then elect to delete (or remove) the current widget by selecting DELETE (stage 4124). If widget deletion is chosen, the user is prompted to confirm the choice, as is illustrated by FIG. 40B (stage 4128). If the user confirms the deletion (stage 4132), the widget instance is deleted from the channel on the CHUMBY™ device and the widget instance is "deleted" from the channel configuration in the system database 712 (stage 4136). If confirmation is not provided, the operation is aborted. At this point, the delete confirmation screen is exited (stage 4140) and the Control Panel is displayed. The user has the option to select HIDE CONTROL PANEL (stage 4144), which exits the control panel and resumes normal widget play.

Widget Configuration

Figure 25:
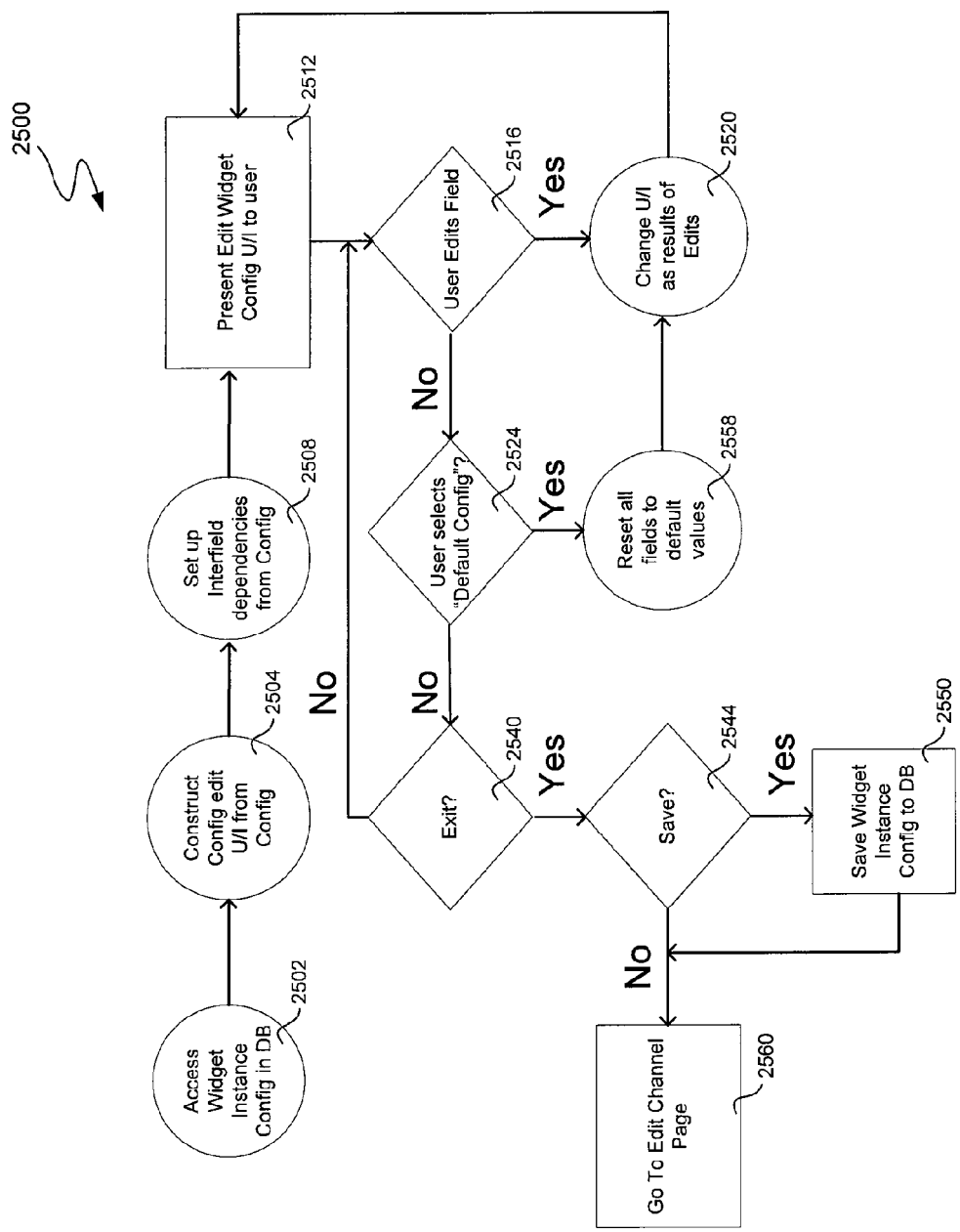
FIG. 25 is a flowchart depicting an exemplary set of operations involved in configuring parameters specific to of one or more widgets currently associated with a given CHUMBY™ device.
Figure 39H:
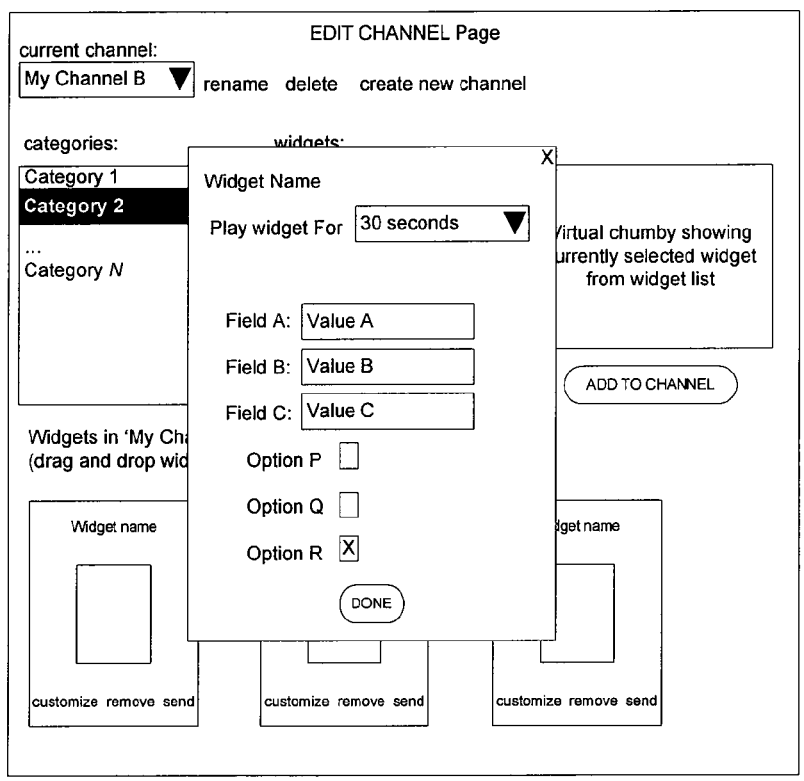

FIG. 25 is a flowchart 2500 depicting an exemplary set of operations involved in configuring parameters specific to of one or more widgets currently associated with a given CHUMBY™ device. The process is initiated by accessing the configuration of a selected widget instance maintained within the system database (stage 2502). An appropriate user interface through which the existing configuration of the selected widget may be edited is then generated based upon such existing configuration (stage 2504). This may involve, for example, establishing various inter-field dependencies based upon the existing configuration (stage 2508). Once the user interface has been generated it is presented to the user via a Web browser 122 in order to enable desired changes to the configuration to be made, as is illustrated by FIG. 39H (stage 2512). If a user elects to edit one or more fields presented by the interface (2516), the user interface defining the widget configuration is correspondingly changed (stage 2520). If a user elects to not edit any of these fields, the user is given the option of selecting a "default configuration" (stage 2524). To the extent this option is selected, all fields are reset to default values (stage 2528); otherwise, the user is given the option to exit the process or return to stage 2516 (stage 2540). When the process is exited, the user is given the option of saving the edited version of the configuration in the system database 712 (stage 2544). If this option is selected, the current widget configuration is saved to the database 712 (stage 2550). The "Edit Channel Page" is then presented to the user, irrespective of whether or not the user elected to save the widget configuration (stage 2560).

In an exemplary embodiment the service provider 106 populates a corresponding widget and parameters tables within the system database in accordance with the user's parameter selections. In this regard the widget table may include an XML-based "param_desc_xml" field containing instructions enabling the construction of associated records in parameters table. For example, for a "clock" widget the XML-based instructions could indicate that a time zone should be a valid parameter, and could also be utilized to create appropriate records in the parameters table.

Distribution of Electronic Greetings Among CHUMBY™ Devices

Users of CHUMBY™ devices will have the ability to send electronic greeting cards in the form of rich Flash animations. Upon visiting a predefined web site (e.g., 'http://greetings.chumby.com') and optionally being authenticated by presenting appropriate credentials, a user will be presented with a catalog of "CHUMBY™ Greetings". In one embodiment access to certain "CHUMBY™ Greetings" may be dependent on membership status. Any authenticated user, irrespective of the number of registered CHUMBY™ devices, will have the permission to send CHUMBY™ Greetings to one or more arbitrary email addresses or, alternatively, one or more users registered with the CHUMBY™ network. If a visitor to the web site is aware of the globally and temporally unique email address of an existing CHUMBY™ device, the account name in which the CHUMBY™ device is registered, or other means of identifying individual CHUMBY™ devices, they may specify CHUMBY™ Greetings to be forwarded directly to such a device using the existing widget transfer infrastructure of the service provider 106. Upon receipt at the CHUMBY™ device, the transferred CHUMBY™ Greetings will be added to the channel or profile in which the recipient has designated for receipt of widgets or other delivered content. Once the widget has been delivered to a channel or profile, the recipient will have the option of accepting or rejecting the delivered content. In the event that a user accepts the CHUMBY™, the CHUMBY™ Greeting will be added to the recipient's widget slideshow rotation in accordance with the applicable profile of the device. In one example, a visitor to the web site may choose to assign a certain level of priority to a CHUMBY™ Greeting such that it may be displayed by the recipient CHUMBY™ device immediately following actuation of the device's alarm function. Alternatively, a priority assigned to a CHUMBY™ Greeting may define the placement of the CHUMBY™ Greeting in the recipient's widget rotation.

CHUMBY™ Greetings sent to email addresses that are not bound to physical CHUMBY™ devices will be forwarded as an SMTP email message. This message will originate from, for example, "greetings@chumby.com" (or a user supplied email address), and will contain a URL or hyperlink pointing to a temporary web page hosting the Flash movie comprising the CHUMBY™ Greeting in addition to an optional user-defined message. Authenticated users will have the ability to select one or more peers from their CHUMBY™ "Buddy List" as recipients of a preconfigured CHUMBY™ Greeting. In one embodiment of CHUMBY™ Greetings, a subscription may be required for access to certain features such as CHUMBY™ Greetings. In such an embodiment, users subscribing to the CHUMBY™ Network will have access to "premium" CHUMBY™ Greetings. In one embodiment, CHUMBY™ may wish to elect a "pay-per-view" model where the use of a "premium" CHUMBY™ Greetings may be charged as a micro-transaction. In one embodiment, CHUMBY™ Greeting recipients that are not bound to physical CHUMBY™ devices will be presented with an option to forward the CHUMBY™ Greeting to alternate email addresses or physical CHUMBY™ devices.

Content Transfer from Personal Communication Device to CHUMBY™ Device

In one embodiment the infrastructure of the CHUMBY™ service provider will support a service capable of receiving an email message from a mobile communication device (e.g., a cellular phone) containing text and/or an image. The email would be addressed to a given user (e.g., 'user'@chumby.com) within the "chumby" domain; alternatively, a special email domain may be created for content from mobile devices in order to facilitate its detection (e.g., 'user'@chumby-mobile.com).

Figure 34:
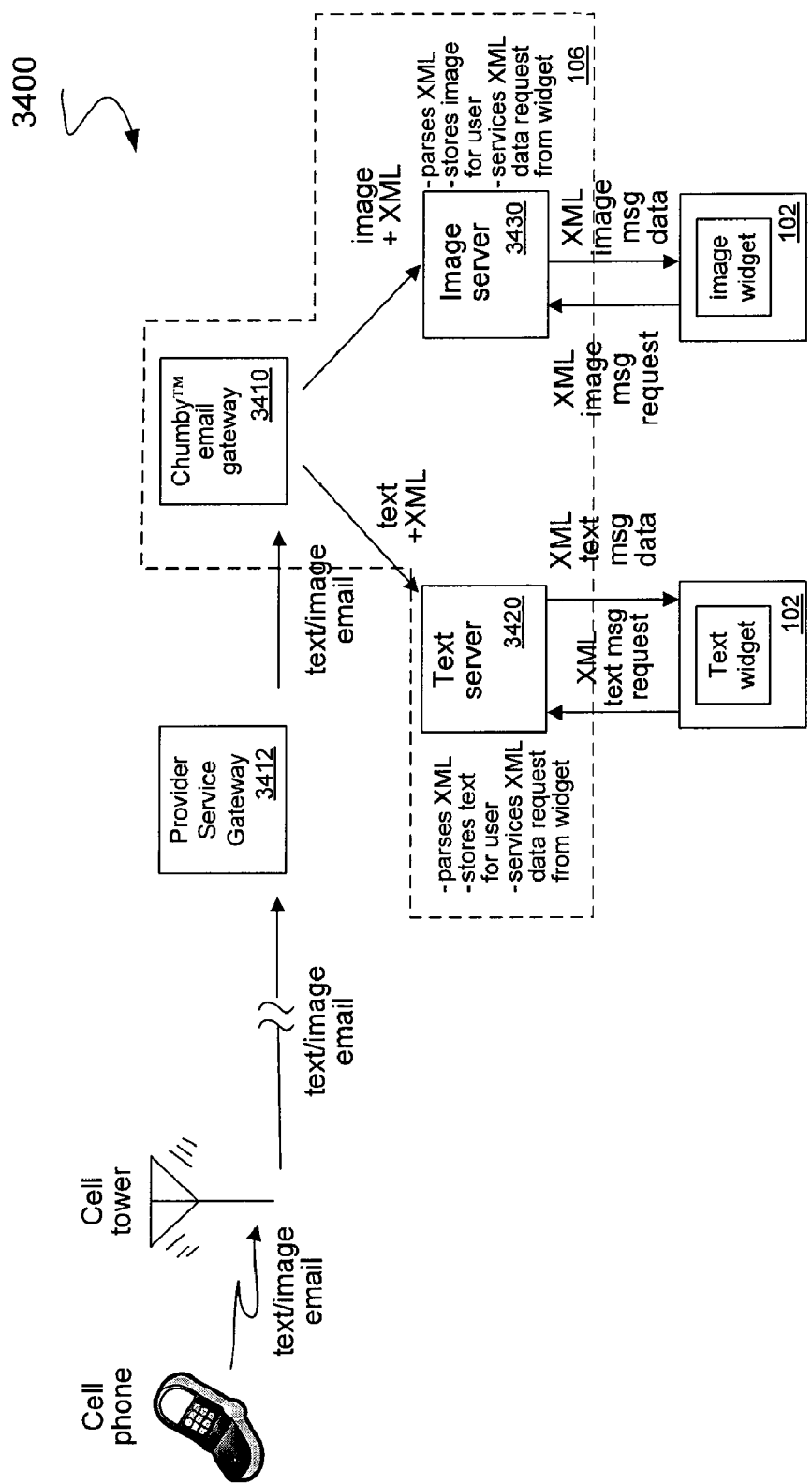
FIG. 34 is a process flow diagram of a text/image processing service within the infrastructure of CHUMBY™ service provider configured to parse e-mail messages from mobile devices and extract the relevant content.

Referring to the process flow diagram 3400 of FIG. 34, a text/image processing service within the infrastructure of the CHUMBY™ service provider 106 is configured to parse e-mail messages from mobile devices and extract the relevant content. As shown, the e-mail messages are provided to a CHUMBY™ e-mail gateway 3410 by provider service gateway 3412. The text/image processing service makes the content available to the appropriate widget (mobile text or mobile imaging) and optionally caches that content in a service in the infrastructure of the CHUMBY™ service provider 106. In the embodiment of FIG. 3400, such infrastructure includes a text server 3420 and an image server 3430 respectively operative to process textual and image information extracted from incoming e-mail messages by the CHUMBY™ e-mail gateway 3410. If the recipient user has the appropriate text or imaging widget configured to display on their CHUMBY™ device 102, then the subject text or image will be retrieved and displayed when the widget becomes active (after all previously queued text or images have been retrieved). If such a widget is not currently configured to run on the recipient user's CHUMBY™ device 102, the content will remain stored within the appropriate service's cache until such time that the widget is configured to run or a cache aging utility deletes it as unreferenced content.

Figure 35:
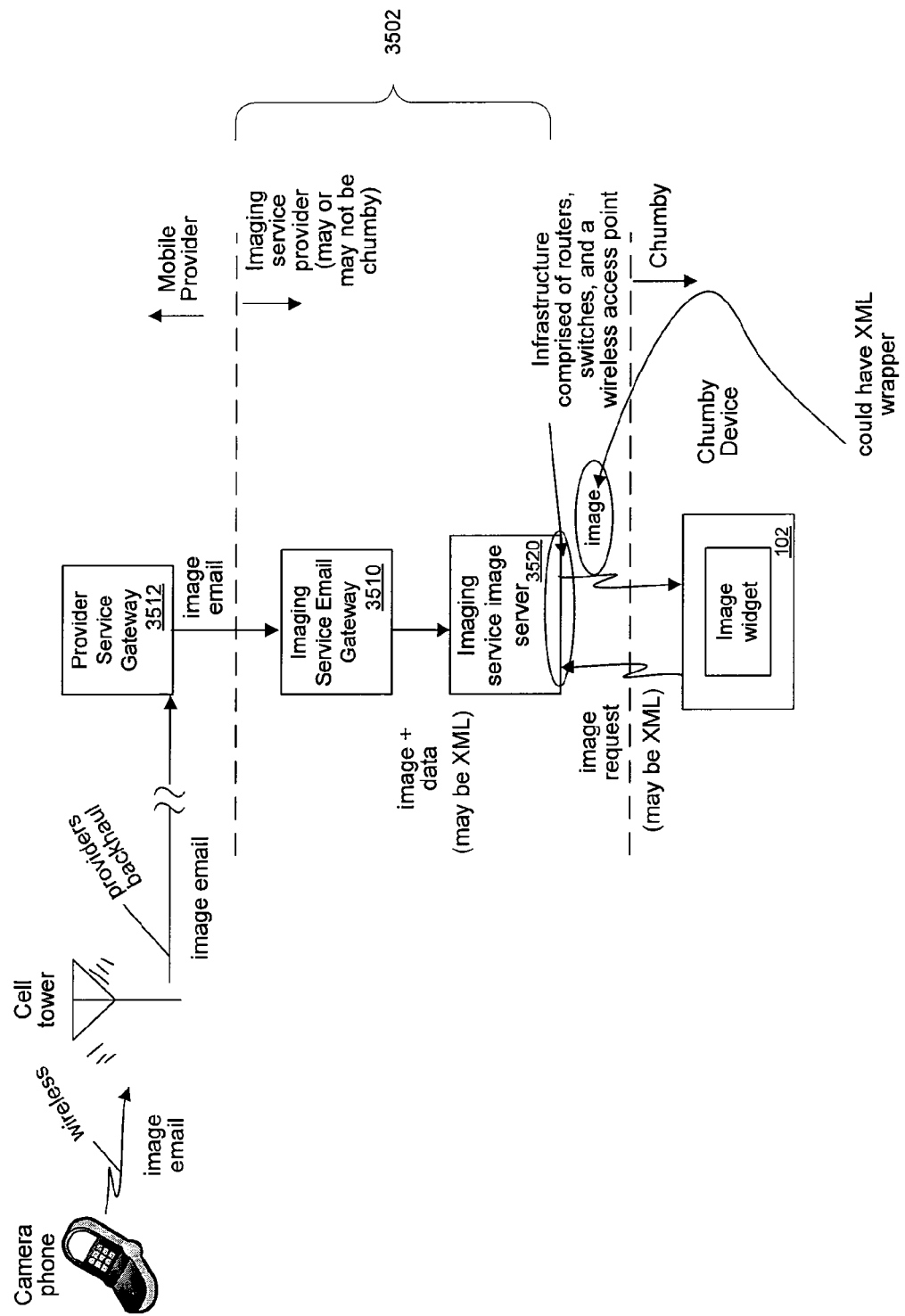
FIG. 35 is a process flow diagram illustrating an alternate implementation of an image processing service for CHUMBY™ devices.

FIG. 35 is a process flow diagram 3500 illustrating an alternate implementation of an image processing service for CHUMBY™ devices 102. As shown, in the implementation of FIG. 35 the image processing service may not be performed by the CHUMBY™ service provider 106, but is instead handled by an imaging service provider 3502. In particular, e-mail messages originating at mobile devices are provided to an imaging service e-mail gateway 3510 by provider service gateway 3512. The service provider 3502 also operates an image server 3520 that makes the extracted image content available to the appropriate image widget executing on the applicable CHUMBY™ device 102.

Internet-Based Automatic Updating of Software on CHUMBY™ Device

In one embodiment the CHUMBY™ service provider is configured to effect automatic updating of the software within each CHUMBY™ device over the Internet and via the applicable wireless LAN.

Figure 42A:
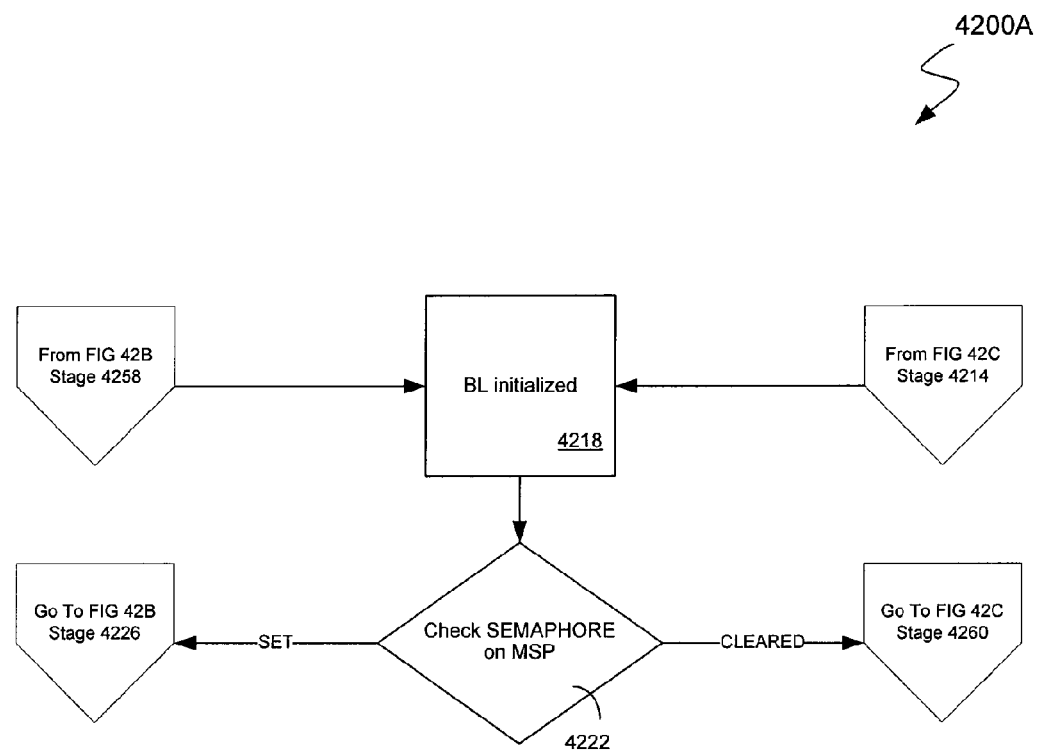
FIGS. 42A-C are flowcharts illustrating an exemplary sequence of operations performed to automatically update all or part of the software maintained within non-volatile memory of a CHUMBY™ device.
Figure 42B:
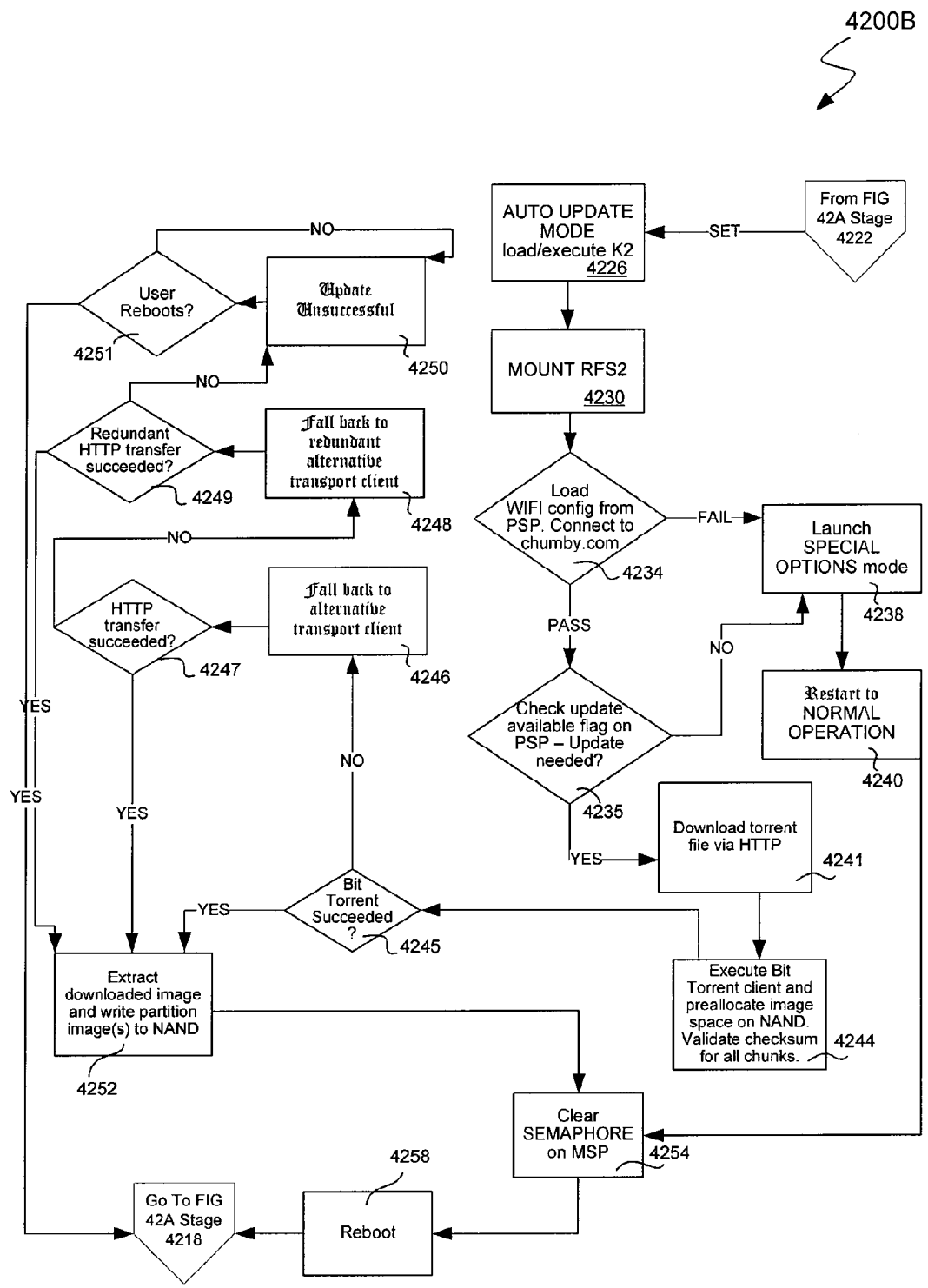
Figure 42C:
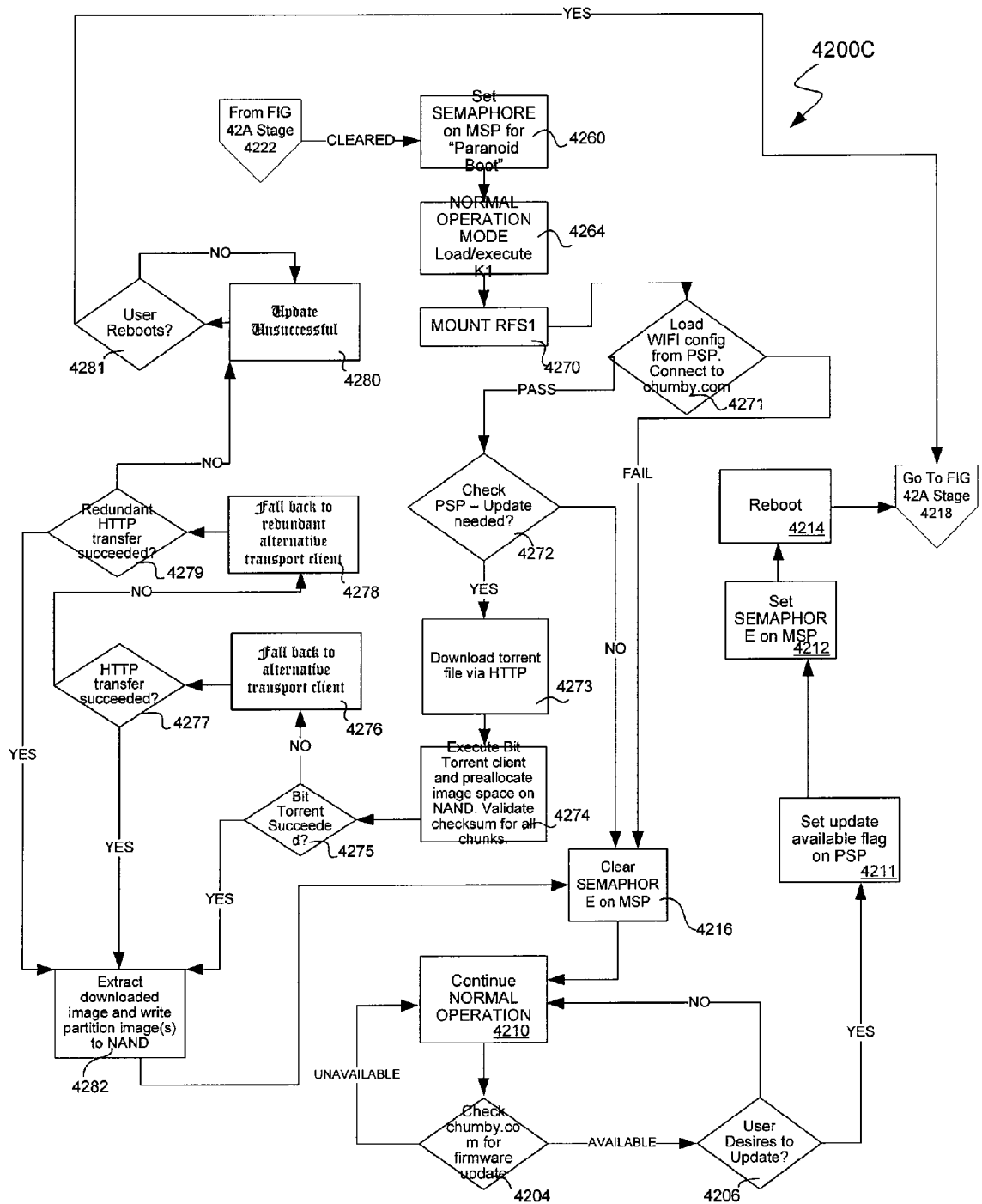

FIG. 42A, FIG. 42B, FIG. 42C are flowcharts 4200A, 4200B and 4200C illustrating an exemplary sequence of operations performed to automatically update all or part of the software maintained within non-volatile memory 310 of a CHUMBY™ device. Referring to FIG. 42C, the CHUMBY™ device being updated is informed by the CHUMBY™ service provider (upon being polled by the CHUMBY™ device) that a firmware update is available (stage 4204). In the exemplary embodiment both the CHUMBY™ device and the CHUMBY™ service provider are aware of the version of the firmware being used by the CHUMBY™ device. Accordingly, during stage 4204 the CHUMBY™ service provider sets a flag or provides some other indication to the CHUMBY™ device that a firmware update is available for the particular version being utilized by the device, where version may refer to a particular software version, hardware version, putative ID of the device, or a combination thereof. Upon receiving such an update indication, the CHUMBY™ device issues a prompt through the screen 320 inquiring as to whether the user desires to proceed with the auto update process (stage 4206). If not, normal operation is continued (stage 4210); if so, the CHUMBY™ device will set a flag on the Persistent Storage Partition (PSP), indicating that software update is available (stage 4211) and takes steps to reboot into an "auto update" mode during which the updated software will be received. In particular, the CHUMBY™ device sets a semaphore stored by a Mode Sense Page (MSP) maintained by the device (stage 4212). In the exemplary embodiment setting the MSP semaphore results in the CHUMBY™ device initiating operation in the "auto update" mode upon being rebooted, while clearing the MSP semaphore causes the CHUMBY™ device to initiate a normal mode of operation upon rebooting.

If the MSP semaphore is set pursuant to stage 4212, the CHUMBY™ device is rebooted (stage 4214). In the exemplary embodiment, as shown in FIG. 42A, this is effected by a bootloader, which upon being initialized (stage 4218) checks the status of the MSP semaphore (stage 4222) and begins the process of booting the CHUMBY™ device into the auto update mode as shown in FIG. 42B (stage 4226). In particular, the initial bootloader loads a kernel image used during the auto update process ("Kernel 2" or "K2") into SDRAM 306 from non-volatile memory 310 and begins execution of K2.

As shown in FIG. 42B, K2 mounts and initializes a root file system image ("RFS2") used during the auto update process (stage 4230). In the exemplary embodiment RFS2 will comprise a read-only cramfs file system such that any potential vulnerabilities exploited during the auto update process will typically not survive rebooting of the CHUMBY™ device, thereby enhancing security. The initialization script in RFS2 causes the CHUMBY™ device to attempt to establish a wireless connection with a wireless access point (WAP) in accordance with the configuration stored in a "Persistent Storage Partition" (PSP) (stage 4234). In one embodiment, if this attempt is unsuccessful, the user is prompted to enter a new WAP configuration or choose from an existing list of preconfigured networks via the touch screen 330. In such an embodiment this prompting may be effected by executing a Flash movie stored within the non-volatile memory 310. In the exemplary embodiment, if the network connection attempt is unsuccessful, a Special Options mode will be displayed (stage 4238) and the user will be prompted with an option to restart to normal operation (stage 4240). In such an embodiment, if the user chooses to 'restart to normal operation' via the touchscreen 330, the MSP semaphore is cleared (stage 4254) and the device is rebooted (stage 4258).

Once a successful wireless connection has been established, the CHUMBY™ device will check a flag on the PSP as to whether an update was previously determined to be available (stage 4235). If the flag exists, the CHUMBY™ device will optionally request the URL(s) for the torrent file(s) that represent an compressed binary firmware image and fetch the torrent file from a predefined network location (e.g., http://update.chumby.com/update.torrent) or a supplied URL (stage 4241); else the CHUMBY™ device will launch the Special Options mode (stage 4238). If multiple torrent URLs were supplied by the CHUMBY™ Network, the secondary torrent URL will be stored in a file on the PSP. A "torrent" file is a small metadata file—it does not contain the actual data, but rather information about the data, and information about the "tracker", which is a computer that coordinates the behavior of the sharing peers. The computer that provides the torrent file may or may not be the same computer that is the tracker, which may or may not be one of the computers that actually shares data. In the exemplary embodiment the CHUMBY™ device being updated will execute a locally-stored client operative in accordance with the BitTorrent™ protocol to receive the updated firmware for the device (stage 4244). Consistent with the BitTorrent™ protocol, the 'torrent' file will contain a pointer to a CHUMBY™ update torrent tracker and will specify chunk sizes and hashes associated with the various portions of the updated firmware to be received. When the 'torrent' file is loaded by the BitTorrent™ client (stage 4244), the full size of contiguous binary image will be optionally pre-allocated directly in non-volatile memory 310 (e.g., NAND flash). As the BitTorrent™ client downloads a given chunk of the updated firmware of the CHUMBY™ device, the chunk will be validated against a hash and written to the non-volatile memory 310; otherwise, the chunk is re-fetched. Once the BitTorrent™ client has exited, the exit code of the BitTorrent™ client is checked to determine whether the client was successful in downloading the firmware image (stage 4245). If the BitTorrent™ client exited with a non-zero exit code, the CHUMBY™ device will fall back to an alternative transport protocol such as HTTP, HTTPS or FTP, etc (stage 4246). Once the alternative transport client has exited, the exit code will be checked to determine if the image transfer was successful (stage 4247). If the alternative transport client exited with a non-zero exit code, the CHUMBY™ device will fall back to a redundant alternative transport client (stage 4248). Once the redundant alternative transport client has exited, the exit code will be checked to determine if the image transfer was successful (stage 4249). If the image transfer failed, a message indicating that the update was unsuccessful will be presented to the user on the screen 320 (stage 4250). At this point the user may choose to reboot the device (stage 4251). Once the optionally compressed binary image of the updated firmware has been completely downloaded by either the BitTorrent™ client (stage 4244), the alternative transport client (stage 4246) or the redundant alternative transport client (stage 4248) and optionally passes a checksum validation, the CHUMBY™ device being updated will optionally extract the downloaded image and write each applicable partition to the appropriate offset directly in non-volatile memory 310 (stage 4252). Once all of the available partition images (optionally extracted from the firmware binary image) have been written to the non-volatile memory, the CHUMBY™ device will clear the MSP semaphore (indicating that the CHUMBY™ device should boot into the "normal operation" mode) (stage 4254).

As shown in FIG. 42A, upon rebooting of the CHUMBY™ device (stage 4258), the bootloader will check the MSP semaphore (stage 4222) then set it as shown in FIG. 42C (stage 4260). The boot loader will boot the CHUMBY™ device into "normal operation" mode by loading the primary kernel image active during normal mode operation ("Kernel 1" or "K1") into SDRAM 306 and executing it (stage 2864). In this regard the MSP semaphore is set to ensure that a failed attempt to boot the CHUMBY™ device into normal mode operation will force the device to next be booted into the "auto update" mode, hence avoiding an indefinitely long sequence of failed attempts to boot the device into normal mode operation due to a corrupted kernel or file system, premature power loss, or other device failures. As indicated by FIG. 42C, "Kernel 1" mounts into SDRAM 306 and initializes a primary root file service image ("RFS1") active during normal mode operation (stage 4270). The initialization script in RFS1 causes the CHUMBY™ device to attempt to establish a wireless connection with a wireless access point (WAP) in accordance with the configuration stored in a "Persistent Storage Partition" (PSP) (stage 4271). In the exemplary embodiment, if the wireless connection attempt is unsuccessful, the MSP semaphore is cleared (stage 4216) and the user may optionally be prompted to enter a new WAP configuration or choose from an existing list of preconfigured networks via the touch screen 330. If the wireless connection attempt is successful, the CHUMBY™ device will check a file stored in the PSP to determine whether an update is required (stage 4272). The file stored in the PSP may optionally contain pointers one or more URLs which identify firmware binary images or a torrent file. If the file in PSP exists and references a torrent URL, the CHUMBY™ device will download the torrent file via a transport protocol such as HTTP, HTTPS or FTP, etc (stage 4273). In the exemplary embodiment the CHUMBY™ device being updated will execute a locally-stored client operative in accordance with the BitTorrent™ protocol to receive the updated firmware for the device (stage 4274). Consistent with the BitTorrent™ protocol, the 'torrent' file will contain a pointer to a CHUMBY™ update torrent tracker and will specify chunk sizes and hashes associated with the various portions of the updated firmware to be received. When the 'torrent' file is loaded by the BitTorrent™ client (stage 4274), the full size of contiguous binary image will be optionally pre-allocated directly in non-volatile memory 310 (e.g., NAND flash). As the BitTorrent™ client downloads a given chunk of the updated firmware of the CHUMBY™ device, the chunk will be validated against a hash and written to the non-volatile memory 310; otherwise, the chunk is re-fetched. Once the BitTorrent™ client has exited, the exit code of the BitTorrent™ client is checked to determine whether the client was successful in downloading the firmware image (stage 4275). If the BitTorrent™ client exited with a non-zero exit code, the CHUMBY™ device will fall back to an alternative transport protocol such as HTTP, HTTPS or FTP, etc (stage 4276). Once the alternative transport client has exited, the exit code will be checked to determine if the image transfer was successful (stage 4277). If the alternative transport client exited with a non-zero exit code, the CHUMBY™ device will fall back to a redundant alternative transport client (stage 4278). Once the redundant alternative transport client has exited, the exit code will be checked to determine if the image transfer was successful (stage 4279). If the image transfer failed, a message indicating that the update was unsuccessful will be presented to the user on the screen 320 (stage 4280). At this point the user may choose to reboot the device (stage 4281). Once the optionally compressed binary image of the updated firmware has been completely downloaded by either the BitTorrent™ client (stage 4274), the alternative transport client (stage 4276) or the redundant alternative transport client (4278) and optionally passes a checksum validation, the CHUMBY™ device being updated will optionally extract the downloaded image and write each applicable partition to the appropriate offset directly in non-volatile memory 310 (stage 4282). Once all of the available partition images (optionally extracted from the firmware binary image) have been written to the non-volatile memory, the CHUMBY™ device will clear the MSP semaphore (indicating that the CHUMBY™ device should boot into the "normal operation" mode) (stage 4216). Once the MSP semaphore is cleared, the CHUMBY™ device will continue into normal operation (stage 4210).

In one embodiment more than a single bootloader routine may be run to effect the process of booting the CHUMBY™ device. In particular, upon the CHUMBY™ device exiting a reset state, an initial bootloader (BL) may be executed from a predefined location in non-volatile memory 310 which initializes SDRAM 306, copies a second bootloader (2BL) to SDRAM 306, and executes a jump to the 2BL. The 2BL executes out of the SDRAM 306 and in such an embodiment performs at least the following functions:

(i) Clears screen frame buffer of the CHUMBY™ device.
(ii) Displays a logo screen
(iii) If BIST routines are implemented, and the manufacturing test pin is pulled up, copy a test partition (TST) into memory and jump to TST code.
(iv) Checks touchscreen 330 for touch. If the touchscreen 330 is being touched, then in an exemplary embodiment the following message is displayed: "Continue to hold touch screen to enter auto-update. Release screen to continue." After a predetermined number of seconds (e.g., 4), proceed to stage 4226 of FIG. 42B (i.e., AUTOUPDATE MODE load/execute K2) if touch screen 330 continues to be touched; otherwise proceed to stage 4222 (i.e., check MSP semaphore).

While the MSP partition needs to store just a single bit, the implementation of the MSP should reflect the limitations of the physical media device used to store the MSP. In this embodiment, a block-erase device with fault-tolerance mechanisms is employed (e.g., a NAND FLASH device). Since it is impossible to erase just a single bit on a block-erase device, the bit is actually implemented as several erase blocks. The partition is also located at the highest point in memory in order to prevent evolving bad blocks from causing the MSP offset to move unpredictably, as the bad block replacement strategy used in most NAND FLASH devices is to replace the logical block by shifting the offset of all the physical pages up by one. All of the erase blocks are programmed to the 1 or the 0 state to represent a set or a clear state. However, since the MSP is top-aligned, there is no space to do block replacement in case one block goes bad. Therefore, the MSP is actually implemented as a voting algorithm, where the entire set of storage blocks are read back regardless of the state of the bad block mark, and the number of 1's are compared against the number of 0's read, and the majority vote wins. The bad block markings can be ignored for this case because typically only a tiny fraction of a block will fail, leaving the majority of the data in the block pristine. Finally, due to the unpredictability of the bad block evolution in the hardware and the particular mechanism chosen to handle this, there is no filesystem structure written into the MSP. The MSP is mounted as a single binary partition and managed through low-level (e.g., direct binary write, read, and erase) operations.

Set forth below are exemplary partition specifications and an accompanying list of defined terminology applicable to the exemplary embodiment of the invention described with reference to FIG. 42.

TERMINOLOGY

K1—Primary kernel image, active during normal user operation

RFS1—Primary root file service (FS) image, active during normal user operation
K2—Kernel image used by the autoupdater
RFS2—Root FS image used by the autoupdater
BL—Initial bootloader (hardware init, copies boot sectors from FLASH and jumps to 2BL)
2BL—Second bootloader
PSP—Persistent storage partition
TST—Test partition
MSP—Mode sense page, used to store a semaphore passed between 2BL, K1, and K2 to set boot state of CHUMBY™ device. MSP semaphore clear→normal operation; set→autoupdate operation.
CFP—Flash player of CHUMBY™ device Exemplary Partition Specifications
PSP
Format: JFFS2
   wireless/WEP/WPA/static IP configuration
   time zone
   GID
   emulated SIM data, accessed by kernel
   crontabs
   boot flags
   volume/pan/mute controls
   touch screen settings
   automatic update flags
   hostname
   udev rules
MSP
Format: binary, in some embodiments accessed through /dev/msp driver in kernel mode, in other embodiments accessed via binary disk operations via the MTD interface from user mode, and through direct hardware calls in 2BL.
Reliably stores one bit, autoupdate or normal mode.
K2
Format: binary
Contains "golden" auto-update kernel, with hardware support for the following features:
   USB
   WiFi
   Display
   Touchscreen
   JFFS2
   cramfs
   MTD
   /dev/msp
   SDRAM memory disk for scratch storage
   console driver through UART
This kernel image is meant to be never overwritten
RFS2
Format: cramfs
This partition is read-only, so a CHUMBY™ device owned in auto-update mode cannot be corrupted. All temporary storage occurs through the SDRAM disk.
Contents:
   custom BitTorrent™ updater client (see below for specifications)
   BitTorrent™ config info
   Animations for relaying update progress and error messages to the user
   shalsum
   busybox binary with basic services
   autoupdate scripts that check for kernel, filesystem versions and initiate the proper update procedure based upon the freshness of the binaries.
K1
Format: binary This is the normal user-mode CHUMBY™ kernel. Autoupdating requires this kernel to support /dev/msp so the MSP semaphore can be set upon starting the Flash player of the CHUMBY™ device.
RFS1
Format: JFFS2
This is the normal user-mode CHUMBY™ file system
TST
Format: binary
See below section on TST partition.
BitTorrent™ Client
A conventional BitTorrent™ client used for updating a CHUMBY™ device is modified to support the following requirements:
    Exit upon completion of download
    Direct access to frame buffer for the purposes of displaying status messages and progress bars.
Library:
    http://www.rasterbar.com/products/libtorrent.html
TST Partition
The TST partition is a statically-linked binary file that operates in absence of any kernel or drivers.
The hardware provides the following test visibility points:
    Pogo pin test points for the following:
    All DC regulator voltages
    Status LED output
    Touchscreen IRQ
    Serial UART interface
    Reset button
    Clock and hsync, vsync to LCD
    Chumbilical™
The test program run by the tester checks the following parameters:
0. Asserts reset and test enable test point
1. Voltages within tolerance
2. Current draw from Chumbilical™ within reset spec
3. Releases reset
4. Current draw from Chumbilical™ within operational spec
5. Status LED toggle by BL
6. Checks for serial output from UART interface
7. Electrically checks for test tone on Chumbilical™ audio output
8. Checks for integrity of LCD timings
9. Checks for correct TS IRQ polarity
10. Checks for and records final test status from TST program
Thus, the TST program performs the following operations:
    Relay proper information through UART to tester
    Configure CODEC and play test tone
    Configure LCD and display test image
    Configure touchscreen
    Tests SDRAM by writing patterns to memory
    (optional) reads FLASH and checks ECC across all blocks for FLASH integrity
    Relay all test results to UART The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method for automatically updating software executed by an electronic device, the software to be updated being of a type that enables selection, download and execution of widgets by the electronic device, the method comprising:
    receiving, at the electronic device, an update indication from a server that updated software is available for the electronic device;
    modifying, in response to the update indication, a boot state of the electronic device, said modification comprising setting a semaphore that controls selection of a kernal image by a bootloader during rebooting of the electronic device;
    initiating operation of the electronic device in an update mode;
    receiving, during operation in the update mode, the updated software at the electronic device; and
    initiating, upon determining the updated software has been correctly received, operation of the electronic device in a normal mode.

2. The method of claim 1 further including clearing the semaphore upon the determining the updated software has been correctly received.

3. The method of claim 1 wherein the initiating of the operation of the electronic device in the normal mode is preceded by rebooting of the electronic device and wherein the initiating of the operation of the electronic device in the update mode is preceded by rebooting of the electronic device.

4. The method of claim 1 wherein the update indication is specific to a particular version of the software currently being executed by the electronic device.

5. The method of claim 1 further including establishing a wireless connection between the electronic device and a wireless access point and subsequently fetching an update file from the server.

6. The method of claim 5 further including establishing network connections with a plurality of network sources in accordance with the update file.

7. The method of claim 6 wherein the receiving of the updated software includes receiving portions of the updated software from corresponding network sources.

8. The method of claim 7 wherein the portions of the updated software are received by a downloading client executed by the electronic device.

9. The method of claim 8 wherein the downloading client operates based upon the BitTorrent™ protocol.

10. The method of claim 1 further including initiating, following crashing of the electronic device, operation of the electronic device in the update mode.

11. The method of claim 5 wherein the establishing the wireless connection includes:
    attempting to establish an initial wireless connection in accordance with a configuration stored within the electronic device;
    receiving, through a user interface of the electronic device, alternate configuration information;
    using the alternate configuration information to establish the wireless connection.

12. A machine-readable medium having instructions stored thereon for execution by a processor of an electronic device, the electronic device comprising, software to be updated, said software being of a type that enables selection, download and execution of widgets by the electronic device, wherein, when executed by the processor, the set of instructions cause the processor to perform a method comprising:

receiving, at the electronic device, an update indication from a server that updated software is available for the electronic device;

modifying, in response to the update indication, a boot state of the electronic device, said modification comprising setting a semaphore that controls selection of a kernal image by a bootloader during rebooting of the electronic device;

initiating operation of the electronic device in an update mode;

receiving, during operation in the update mode, the updated software at the electronic device; and initiating, upon determining the updated software has been correctly received, operation of the electronic device in a normal mode.

13. The machine-readable medium of claim 12 wherein the initiating of the operation of the electronic device in the update mode is preceded by rebooting of the electronic device.

14. The machine-readable medium of claim 12 further including clearing the semaphore upon the determining that the updated software has been correctly received.

15. The method of claim 14 wherein the initiating of the operation of the electronic device in the normal mode is also preceded by clearing of the semaphore.

\* \* \* \* \*